US010340838B2

(12) United States Patent
Schuit et al.

(10) Patent No.: US 10,340,838 B2
(45) Date of Patent: Jul. 2, 2019

(54) HYBRID SOLAR PANEL MOUNTING ASSEMBLY WITH A TILTED LEDGE

(71) Applicant: Unirac Inc., Albuquerque, NM (US)

(72) Inventors: Nathan Schuit, Edgewood, NM (US); Jason Mayfield, Albuquerque, NM (US); Ernest Gallegos, Albuquerque, NM (US)

(73) Assignee: Unirac Inc., Albuquerque, NM (US)

( * ) Notice: Subject to any disclaimer, the term of this patent is extended or adjusted under 35 U.S.C. 154(b) by 205 days.

(21) Appl. No.: 15/352,489

(22) Filed: Nov. 15, 2016

(65) Prior Publication Data

US 2017/0155356 A1  Jun. 1, 2017

Related U.S. Application Data

(63) Continuation-in-part of application No. 15/138,030, filed on Apr. 25, 2016.

(60) Provisional application No. 62/217,580, filed on Sep. 11, 2015, provisional application No. 62/200,262, filed on Aug. 3, 2015.

(51) Int. Cl.
| | |
|---|---|
| *F24S 25/35* | (2018.01) |
| *F24S 25/65* | (2018.01) |
| *F24S 25/67* | (2018.01) |
| *F24S 25/632* | (2018.01) |
| *F24S 25/636* | (2018.01) |
| *H02S 20/23* | (2014.01) |
| *F24S 25/00* | (2018.01) |
| *H02S 30/10* | (2014.01) |

(52) U.S. Cl.
CPC .............. *H02S 20/23* (2014.12); *F24S 25/35* (2018.05); *F24S 25/632* (2018.05); *F24S 25/636* (2018.05); *F24S 25/65* (2018.05); *F24S 25/67* (2018.05); *H02S 30/10* (2014.12); *F24S 2025/801* (2018.05); *Y02B 10/12* (2013.01); *Y02B 10/20* (2013.01); *Y02E 10/47* (2013.01)

(58) Field of Classification Search
CPC . F24S 25/634; F24S 2025/6004; H02S 20/22; H02S 20/23; H02S 20/24; Y02E 10/47
See application file for complete search history.

(56) References Cited

U.S. PATENT DOCUMENTS

| | | |
|---|---|---|
| D30,898 S | 5/1899 | Paine |
| 3,042,068 A | 7/1962 | Smith |
| 3,269,228 A | 8/1966 | Mack |

(Continued)

FOREIGN PATENT DOCUMENTS

| | | | |
|---|---|---|---|
| JP | 2000-345664 A | 12/2000 | |
| WO | WO-2013033404 A2 * | 3/2013 | ............... F16B 2/20 |

OTHER PUBLICATIONS

U.S. Appl. No. 15/352,494, "Height Adjustable Solar Panel Mounting Assembly With an Asymmetric Lower Bracket", filed Nov. 15, 2016, Inventor Nathan Schuit et al.

(Continued)

*Primary Examiner* — Christine T Cajilig
(74) *Attorney, Agent, or Firm* — Lee & Hayes, P.C.

(57) ABSTRACT

A trim-rail for use in a solar panel mounting assembly is disclosed. The trim-rail includes a tilted spring support ledge on a side of the trim-rail. A photovoltaic module is elastically supportable on the tilted spring support ledge when the photovoltaic module is installed on the tilted spring support ledge.

19 Claims, 66 Drawing Sheets

(56) References Cited

U.S. PATENT DOCUMENTS

| | | | |
|---|---|---|---|
| 4,436,005 A | 3/1984 | Hanson | |
| D276,879 S | 12/1984 | Bell | |
| 4,822,223 A | 4/1989 | Williams | |
| 5,728,136 A | 3/1998 | Thal | |
| 5,820,092 A | 10/1998 | Thaler | |
| 5,927,921 A | 7/1999 | Hukari | |
| 6,361,258 B1 | 3/2002 | Heesch | |
| 6,367,258 B1 | 4/2002 | Wen et al. | |
| 6,387,129 B2 | 5/2002 | Rieser et al. | |
| 6,457,923 B1 | 10/2002 | Grossman | |
| 6,478,518 B1 | 11/2002 | Hwang | |
| 6,540,750 B2 | 4/2003 | Burkhart | |
| D588,893 S | 3/2009 | Radich | |
| D613,594 S | 4/2010 | Huang | |
| D613,595 S | 4/2010 | Huang | |
| 7,981,143 B2 | 7/2011 | Doubler et al. | |
| 8,109,048 B2 | 2/2012 | West et al. | |
| 8,272,174 B2 | 9/2012 | Stearns et al. | |
| 8,353,650 B2 | 1/2013 | Wiley et al. | |
| 8,375,645 B2 | 2/2013 | Iwauchi et al. | |
| D691,033 S | 10/2013 | Allman | |
| 8,567,154 B2* | 10/2013 | Babineau, Jr. | H02S 20/23 52/747.1 |
| 8,622,677 B2 | 1/2014 | Wu et al. | |
| D698,637 S | 2/2014 | Su | |
| 8,683,761 B2 | 4/2014 | Danning | |
| 8,752,338 B2 | 6/2014 | Schaefer et al. | |
| 8,806,813 B2 | 8/2014 | Plaisted et al. | |
| D713,243 S | 9/2014 | Hsu | |
| 8,919,053 B2 | 12/2014 | West | |
| D721,423 S | 1/2015 | Jacques et al. | |
| 8,935,893 B2 | 1/2015 | Liu et al. | |
| 8,938,932 B1 | 1/2015 | Wentworth et al. | |
| 8,943,765 B2 | 2/2015 | Danning et al. | |
| 9,004,836 B2 | 4/2015 | Wells et al. | |
| 9,010,041 B2 | 4/2015 | Danning | |
| 9,076,899 B2 | 7/2015 | Schrock | |
| 9,080,792 B2 | 7/2015 | Patton et al. | |
| 9,097,443 B2 | 8/2015 | Liu et al. | |
| D740,866 S | 10/2015 | Herrmann et al. | |
| 9,166,524 B2 | 10/2015 | West et al. | |
| D759,464 S | 6/2016 | West | |
| 9,413,286 B2 | 8/2016 | Danning | |
| 9,431,953 B2 | 8/2016 | Stearns et al. | |
| 9,455,662 B2 | 9/2016 | Meine | |
| 9,473,066 B2 | 10/2016 | Stephan et al. | |
| D779,308 S | 2/2017 | West et al. | |
| 9,647,433 B2 | 5/2017 | Meine et al. | |
| D788,574 S | 6/2017 | Baiz et al. | |
| 9,698,724 B2 | 7/2017 | West et al. | |
| 9,712,106 B2 | 7/2017 | Wentworth et al. | |
| 9,755,572 B2 | 9/2017 | Wentworth et al. | |
| D800,544 S | 10/2017 | Schuit et al. | |
| 9,800,199 B2 | 10/2017 | Meine et al. | |
| D803,664 S | 11/2017 | West et al. | |
| 9,813,012 B2 | 11/2017 | Wentworth et al. | |
| 9,825,581 B2 | 11/2017 | Wildes | |
| D807,419 S | 1/2018 | Herrmann et al. | |
| 2006/0039775 A1 | 2/2006 | Mizuno et al. | |
| 2008/0053517 A1 | 3/2008 | Plaisted et al. | |
| 2008/0067808 A1 | 3/2008 | Poddar | |
| 2010/0192505 A1 | 8/2010 | Schaefer et al. | |
| 2011/0000519 A1 | 1/2011 | West | |
| 2011/0000544 A1 | 1/2011 | West | |
| 2011/0203637 A1* | 8/2011 | Patton | F24S 25/61 136/244 |
| 2011/0260027 A1 | 10/2011 | Farnham, Jr. | |
| 2012/0102854 A1* | 5/2012 | Meier | F24S 25/33 52/173.3 |
| 2012/0192926 A1 | 8/2012 | Kambara et al. | |
| 2012/0234378 A1 | 9/2012 | West et al. | |
| 2012/0298817 A1 | 11/2012 | West et al. | |
| 2012/0301661 A1 | 11/2012 | West et al. | |
| 2013/0048815 A1 | 2/2013 | Wagner et al. | |
| 2013/0048816 A1 | 2/2013 | Wentworth et al. | |
| 2014/0109954 A1* | 4/2014 | Kanbara | H01L 31/042 136/251 |
| 2014/0158184 A1 | 6/2014 | West et al. | |
| 2014/0175244 A1 | 6/2014 | West et al. | |
| 2015/0013237 A1 | 1/2015 | Schaefer et al. | |
| 2015/0034355 A1 | 2/2015 | Patton et al. | |
| 2015/0068590 A1 | 3/2015 | West et al. | |
| 2015/0129517 A1* | 5/2015 | Wildes | H02S 20/23 211/41.1 |
| 2015/0168021 A1 | 6/2015 | Wentworth et al. | |
| 2015/0188483 A1* | 7/2015 | Nishio | H02S 20/23 136/259 |
| 2015/0204583 A1 | 7/2015 | Stephan et al. | |
| 2015/0204853 A1 | 7/2015 | Moss et al. | |
| 2015/0244308 A1 | 8/2015 | Patton et al. | |
| 2015/0280638 A1 | 10/2015 | Stephan et al. | |
| 2015/0288320 A1* | 10/2015 | Stearns | H02S 20/23 52/173.3 |
| 2016/0111996 A1* | 4/2016 | Stephan | F16B 5/0028 248/316.6 |
| 2016/0218661 A1 | 7/2016 | Meine | |
| 2016/0268958 A1* | 9/2016 | Wildes | H02S 20/23 |
| 2016/0268959 A1* | 9/2016 | Meine | H02S 40/36 |
| 2016/0344334 A1 | 11/2016 | Danning | |
| 2017/0040931 A1 | 2/2017 | Schuit et al. | |
| 2017/0063300 A1 | 3/2017 | Ash | |
| 2017/0299102 A1 | 10/2017 | Ash et al. | |

OTHER PUBLICATIONS http://www.bing.com/images/search?q=tri+drive+nut&view=detailv2 &&id=80C4DD6253315F30F57D66911B90DC49F0400179&selec tedIndex=31&ccid=cbD7XbBT&simid=608041072270839485&thid= OIP.M71b0fb5db053c5ecc513da6b6e2490f0o0&ajaxhist=0, 1 page, retrieved Apr. 1, 2016.

http://www.bing.com/images/search?q=tri+drive+nut&view=detailv2 &id=8022FC13E71E8912BE827148288920389F6F6CD8&selecte dIndex=20&ccid=BOZcykR9&simid=608049022255629007&thid= OIP.M04e65cca447d644c88e172521a2b3aafo0&mode=overlay &first=1, 1 page, retrieved Apr. 1, 2016.

http://www.bing.com/images/search?q=tri+drive+screw&view= detailv2&&id=DD12BF8073DE720B323056059182C6D86E91F9 69&selectedIndex=30&ccid=j57ZZKxh&simid=607989846202122750 &thid=IOP.M8f9ed964ac61774bd32abaf184c076cdo0&ajaxhist= 0, 1 page, retrieved Apr. 1, 2016.

http://www.bing.com/images/search?q=tri-drive+socket&view= detailv2&&id=6FAC151036BABE696377D989C28380E64C9C21 A2&selectedIndex=121&ccid=nm2PL70D&simid= 608022930330814765&thid=OIP. M9e6d8f2fbd03832c834a197be6934bf1o0&ajaxhist=0, 1 page, retrieved Apr. 1, 2016.

http://www.bing.com/images/search?q=square+socket&view=detailv2 &&id=1D509F9A8DFC7BBB4B007C1E258779F74779A67B&sel ectedIndex=146&ccid=TlaND%2fol&simid=608049464641849402 &thid=OIP.M4e568d0ffa089a0070579d68bf010e9bo0&ajaxhist=0, 1 page, retrieved Apr. 1, 2016.

http://www.bing.com/images/search?q=security+nut&view=detailv2 &&id=4C2424531230A169ADC4DAE0F4EB8EC124253035&sel ectedIndex=0&ccid=ZLH08zqK&simid=608029617595547726 &thid=OIP.M64b1f4f33a8aedc8c63521a0138a6f19o0&ajaxhist=0, 1 page, retrieved Apr. 1, 2016.

International Preliminary Report on Patentability issued in PCT Application No. PCT/US2016/045150 dated Feb. 6, 2018 including English translation of document C2 (Japanese-language Written Opinion (PCT/ISA/327 previously filed on (Jan. 4, 2017)) 11 pages.

Non Final Office Action dated Feb. 6, 2019 for U.S. Appl. No. 15/352,494 "Height Adjustable Solor Panel Mounting Assembly with an Assymetric Lower Bracket" Schuit, 12 pages.

PCT Search Report for corresponding PCT Application No. PCT/ US16/45150 dated Dec. 16, 2016, enclosing Written Opinion of the International Searching Authority, 15 pages.

* cited by examiner

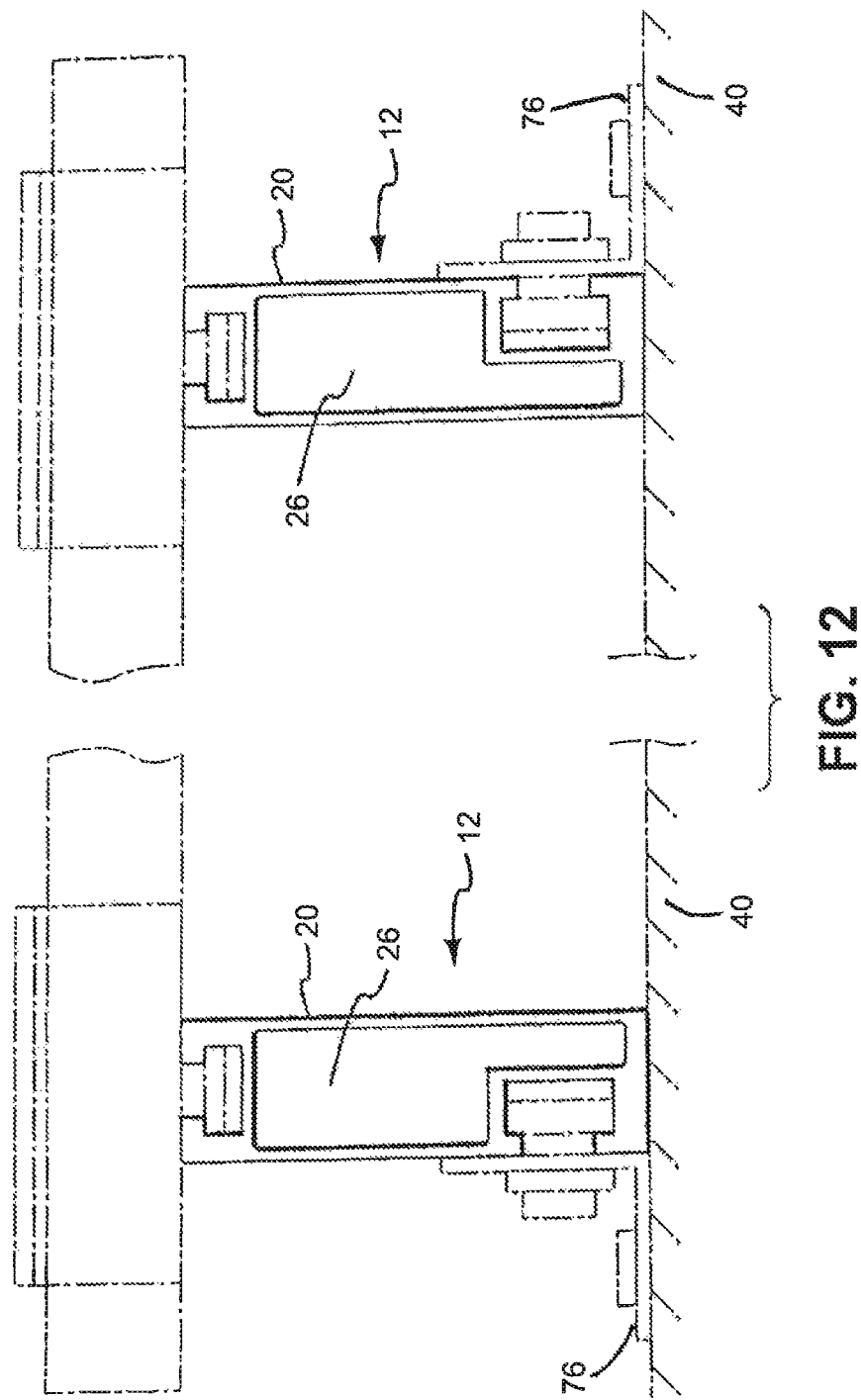

HYBRID SOLAR PANEL MOUNTING ASSEMBLY WITH A TILTED LEDGE

This application is a continuation-in-part of application Ser. No. 15/138,030 filed Apr. 25, 2016, which claims the benefit of U.S. Provisional Application No. 62/200,262, filed Aug. 3, 2015, and U.S. Provisional Application No. 62/217,580, filed Sep. 11, 2015, the disclosures of which are expressly incorporated by reference herein.

BACKGROUND OF THE INVENTION

The solar industry is growing world-wide and, as a result, more-efficient structures are desirable for mounting photovoltaic modules to a structure, such as a roof of a home or other building. Whereas many different structures are known, there is a desire to reduce the complexity of such structures, and improve the efficiency of such structures.

Therefore, there is a need for an improved apparatus for mounting photovoltaic modules.

BRIEF DESCRIPTION OF THE DRAWINGS

FIG. 12 shows additional end views of a rail in accordance with the present invention;

DETAILED DESCRIPTION OF THE DRAWINGS

Figure 1:
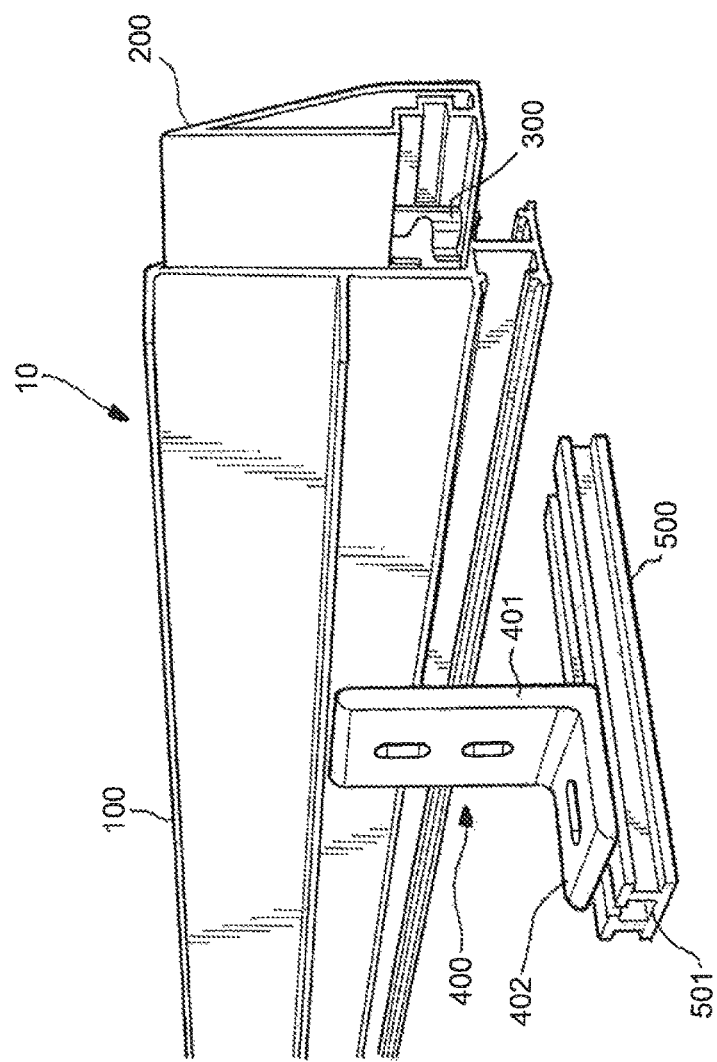
FIG. 1 illustrates a first embodiment of a trim-rail assembly in accordance with the principles of the present invention.

Briefly, the present invention, amongst other features, provides a hybrid assembly for removably and adjustably mounting solar panels on a surface.

Before particularly discussing the hybrid assembly itself, components of the hybrid assembly will first be discussed. Generally, the hybrid assembly consists of components of a "rail-based" system and components of a "rail-less" or "non-rail based" system.

A rail-based system generally includes at least one rail that extends an entire length or width of at least one solar panel of a plurality of solar panels that are utilized in a solar panel array. The rail mounts the solar panel(s) to a surface, such as the roof of a home or building. The rail may also be referred to as a continuous mounting beam. As will be further discussed below, such rails may be either a trim-rail, a single rail, or a shared rail. However, the present invention is not limited to these particular types of rails.

A rail-less or non-rail-based system generally includes a component that does not extend the entire length or width of a solar panel, but rather, is a mounting structure that only attaches to a discrete portion of a solar panel, or discrete portions of adjacent solar panels, for example, at the adjacent corners of four adjacent solar panels arranged in a 2 by 2 orientation with two adjacent solar panels in a first row and two adjacent solar panels in a second row directly above or below the first row. Such a component may also be referred to as a micro-rail. A short micro-rail only attaches to a discrete portion of a solar panel, or to discrete portions of at-most two adjacent solar panels.

Thus, in a rail-less or non-rail-based system, each component that can support a solar panel connects together only immediate next-door neighbor solar panels. As described above and as will be further described below, these immediate next-door neighbor solar panels are a maximum of four when a micro-rail is used, and three in an installation where the micro-rail is used around an obstacle in the mounting surface, and two when a short micro-rail is used.

In contrast, in a rail-based system, the component that can support a solar panel, i.e., the rail, can also connect together remote panels. Remote panels are not immediate next-door neighbors to each of the connected panels. Thus, connected remote panels have one or more intermediate panels separating them.

As will be further discussed below, utilizing a rail-based system component, e.g., a rail, in the front row of a solar panel array provides a benchmark or baseline to construct the remaining solar array with the modules being in a more stable position and it is easier to align and square the array and the modules. Also, having the first (lower-most) structure mounted to the roof being a structurally stiff and strong piece of racking (i.e., a rail, which may be a trim-rail), makes it safer for the installer to stand on a steeply pitched roof.

By also using rail-less or non-rail-based system components in the rest of the array, this allows the installer the flexibility to work around obstructions, e.g., vents, skylights, etc., without needing to cut/modify a rail. This also allows for mixing of the orientation of the solar panel modules within a row.

Thus, in the hybrid solar panel mounting assembly of the present invention, a combination of rail-based system components and rail-less system components are used to mount a plurality of solar panels in a solar panel array to a surface.

Below is provided exemplary embodiments of components of rail-based systems and non-rail-based systems that may be utilized in the hybrid solar panel mounting system of the present invention. However, the present invention is not limited to these particular embodiments of components of rail-based systems and non-rail-based systems.

Rail-Based System Components

Trim-Rail Assembly

FIG. 1 illustrates a trim-rail assembly 10 in accordance with the principles of the present invention. The trim-rail assembly 10 includes a trim-rail 100, a splice 200, a connector 300, a mounting bracket, or footer, 400, and a track 500.

Figure 2:
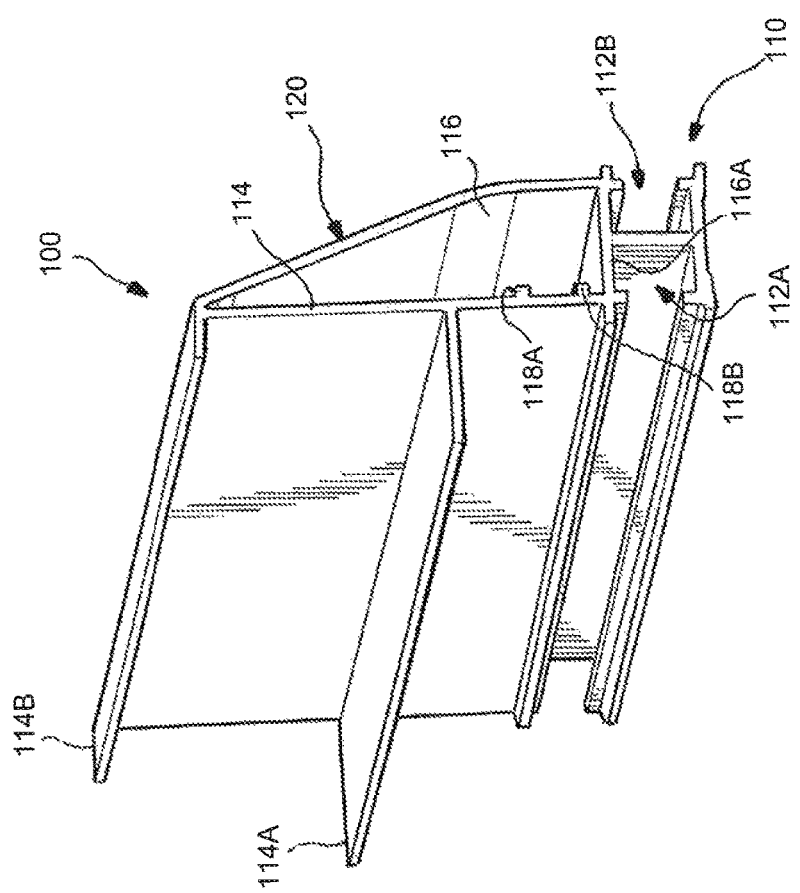
FIG. 2 illustrates a trim-rail of the trim-rail assembly of FIG. 1.

The trim-rail 100 can be further seen in FIG. 2. Trim-rail 100 includes both a rail 110 and a trim 120, where the rail 110 and trim 120 are integrated as a single, monolithic structure. Thus, the trim-rail 100 includes a rail 110 that extends an entire length or width of at least one solar panel of a plurality of solar panels that are utilized in a solar panel array. The rail 110 of the trim-rail 100 mounts the solar panel(s) to a surface, such as the roof of a home or building. Since the rail 110 extends the entire length or width of at least one solar panel of a plurality of solar panels that are utilized in a solar panel array, so does the trim 120. Rail 110 can have an "I-beam" shape in cross-section.

In FIG. 2, trim 120 has a generally curved surface which extends downwardly and outwardly from the top of the trim-rail 100 to a lower portion of the trim-rail 100 and then downwardly to a lowest-most portion of the trim-rail 100. Trim-rail 100 can be an extruded product.

Thus, in FIG. 2, the trim 120 can provide for an aesthetically-pleasing front surface for the trim-rail 100 when the trim-rail 100 is used as the front-most rail in the hybrid solar panel mounting assembly of the present invention. Additionally, the trim-rail 100 can also assist in providing for a fire protection mechanism by further restricting the flow of air under the trim-rail 100, and thus under the photovoltaic module(s) that are mounted on the trim-rail 100.

Thus, in FIG. 2, because the rail 110 and the trim 120 of the trim-rail 100 are a single, monolithic integrated structure, there is no need to mount the trim 120 on a separate rail. The integrated structure of the trim-rail 100 provides for both mounting a solar panel(s) to a surface by the rail 110 and providing a trim 120 for the rail. Further yet because the trim 120 and the rail 110 are a single integrated structure, the trim 120 is part the rigid structure of the trim-rail 100, and thus, it is also a rigid structure itself. As such, the trim 120 also directly supports the solar panel modules. In some embodiments, the wall thickness of trim 120 can be the same as the wall thickness of rail 110.

In FIG. 2, the rail 110 includes a first track 112A and a second track 112B at a bottom of the rail 110. The bottom of the rail is the portion of the rail that is closest to the mounting surface. As will be further discussed below, the tracks 112A, 112B are able to receive within them mounting hardware that is used to mount the rail 110, and thus trim-rail 100, on the footer 400. The tracks are provided on both sides of the rail 110 so that the footer 400 may be mounted on either side of the rail 110.

In FIG. 2, a vertical wall 114, i.e., vertical with respect to the surface on which the trim-rail 100 is mounted, is provided extending from the bottom of the rail 110. Extending perpendicularly from the vertical wall 114 are lower ledge 114A and upper ledge 114B. Lower ledge 114A extends further from wall 114 than upper ledge 114B. An edge of a solar panel(s) that is mounted on trim-rail 100 is positioned on trim-rail 100 between ledges 114A, 114B. The bottom of the solar panel is supported on lower ledge 114A and the top of the solar panel is disposed under, and in engagement with, upper ledge 114B. Thus, the edge of the solar panel is secured on trim-rail 100 between lower ledge 114A and upper edge 114B of rail 110.

In FIG. 2, trim-rail 100 also defines a hollow chamber 116 which is bounded by trim 120, vertical wall 114, and a bottom wall 116A.

Figure 3:
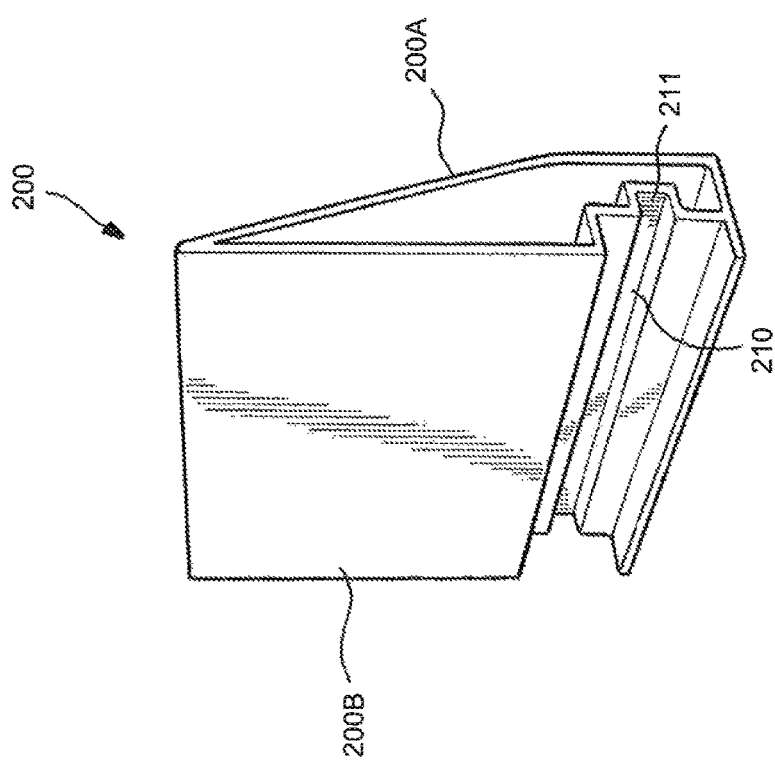
FIG. 3 illustrates a splice of the trim-rail assembly of FIG. 1.

FIG. 3 further illustrates an embodiment of splice 200. Splice 200 is used to splice together two adjacent trim-rails 100. As can be understood, and as can be seen in FIG. 1, a first end of the splice 200 is received within hollow chamber 116 of a first adjacent trim-rail 100. A second end of the splice 200 would be received within a hollow chamber 116 of a second adjacent trim-rail 100. Thus, the splice 200 rigidly joins a first trim-rail to a second adjacent trim-rail.

In FIG. 3, the splice 200 has a structure that is complementary to the trim-rail 100. Thus, the splice 200 has a trim-like portion 200A that has a contour that is complementary to trim 120 of trim-rail 100. Thus, when splice 200 is received within hollow chamber 116 of a trim-rail 100, the trim-like portion 200A of splice 200 generally engages with the inside wall of trim 120 of trim-rail 100.

Similarly, in FIG. 3, the splice 200 has a vertical wall 200B. Thus, when splice 200 is received within hollow chamber 116 of a trim-rail 100, the vertical wall 200B of splice 200 generally engages with the inside wall of vertical wall 114 of trim-rail 100.

Thus, in FIG. 3, the splice 200 is firmly engaged within respective hollow chambers 116 of adjacent trim-rails 100.

Figure 4:
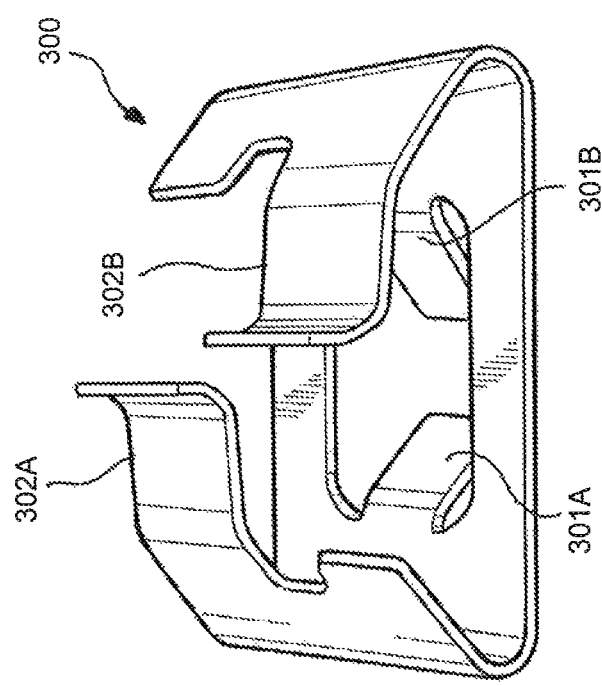
FIG. 4 illustrates a connector of the trim-rail assembly of FIG. 1.

Although not required, in FIG. 4, splice 200 can be further secured within the adjacent trim-rails 100 by use of respective connector 300. As such, splice 200 also has a structure 210 that receives within it a portion of connector 300, which can also be further seen in FIG. 4. Structure 210 includes slot 211. Connector 300 includes two straps 301A and 301B. The two straps 301A and 301B are bent such that they are received with slot 211 and engage into splice 200 to secure connector 300 on splice 200.

In FIG. 2, trim-rail 100 also includes upper flange 118A and lower flange 118B on vertical wall 114 and connector 300 includes an upper strap 302A and a lower strap 302B. Upper strap 302A engages with upper flange 118A to prevent the connector 300 from being slipped any further into trim-rail 100. Lower strap 302B then engages with the outer edge of wall 114 and lower flange 118B.

In FIG. 1, at least portions of connector 300 engage into both trim-rail 100 and splice 200 to electrically bond the trim-rail 100 to the splice 200. These portions can be the respective straps 301A, 301B.

As mentioned above, FIG. 1 shows an embodiment of footer 400 and track 500. The footer 400 is variably positionable on the trim-rail 100 along either slot 112A or 112B. The footer 400 is generally L-shaped with a first, upright leg 401 and a second, flat leg 402. The upright leg 401 is "upright" in the sense that it extends perpendicularly to the surface on which the footer 400 is mounted. The flat leg 402 is "flat" in the sense that it extends parallel to the surface on which the footer 400 is mounted. The upright leg 401 contains at least one aperture, through which a securement mechanism, which may be a bolt and a nut, extends. As shown in FIG. 1, two, or more, apertures may be provided, such that the position of the trim-rail 100 with respect to the upright leg 401 of the footer 400 may be adjusted by use of the securement mechanism in the different apertures. The shaft of the bolt extends through an aperture of the upright leg 401 and the nut, or other structure, of the securement mechanism is disposed within the slot 112A of trim-rail 100, or slot 112B if the footer 400 is placed on the opposing side of the trim-rail 100. As the bolt is threaded down on the nut, the footer 400 is secured at a position on the trim-rail 100 along the slot 112A. The flat leg 402 of the footer also contains an aperture, and an additional securement mechanism, which may be a lag bolt, extends through the aperture and into a slot 501 of the track 500, in the same manner as discussed above with respect to the slot of the trim-rail 100, such that the footer 400 is also variably positionable on the track 500 along the slot 501 of the track.

Thus, as discussed above in FIG. 1, the footer 400 is variably positionable on both the trim-rail 100 along a slot, and the track 500 along a slot, via the respective securement mechanisms that are disposed through the footer 400 and are received in the respective slots. By loosening the nuts on the bolts, while the nuts remain in the slots, the footer and securement mechanisms may be moved and positioned anywhere along the longitudinal length of the trim-rail and the track, and then tightened to secure the footer 400 on the trim-rail 100 and track 500 at a desired positioned. This provides a benefit since, as will be further discussed later in this specification, the footer is not constrained to a single position on the trim-rail or track, but rather, it can be variably positioned on the trim-rail and track.

Figure 5:
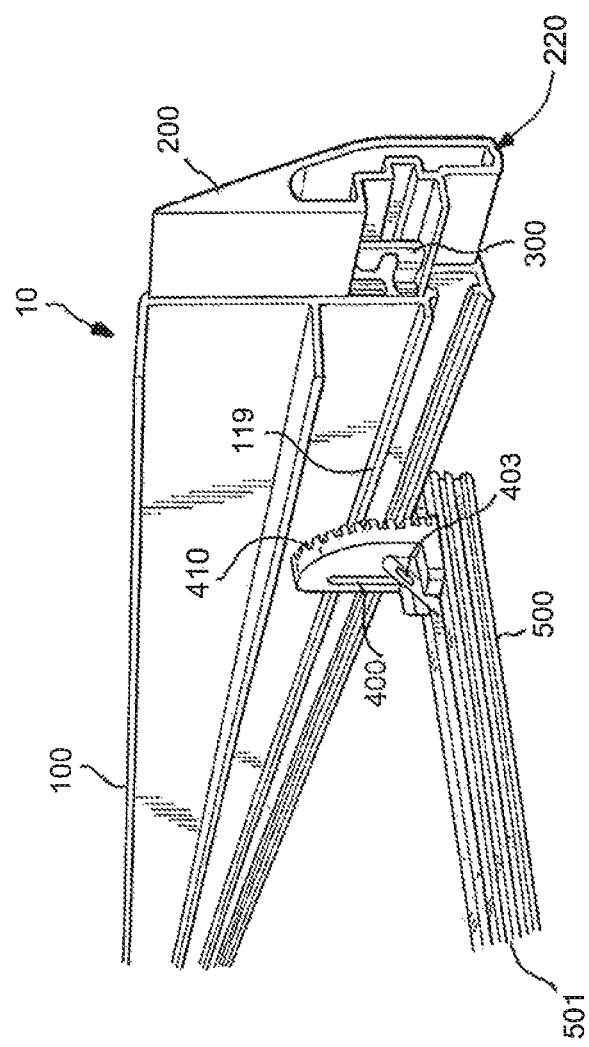
FIG. 5 illustrates a second embodiment of a trim-rail assembly in accordance with the principles of the present invention.

FIG. 5 provides another embodiment for the trim-rail assembly 10 of the present invention. This embodiment also includes a trim-rail 100, splice 200, connector 300, and track 500, as in the embodiment of FIG. 1.

As can be seen in FIG. 5, the footer 400 has a different configuration. Footer 400 of the embodiment of FIG. 5 includes slots 410 that mate with a tab(s) 119 in the trim-rail 100 in a tongue-and-groove type mating configuration. The horizontal slots are positioned one above the other vertically on the footer and may extend the entire length of the upright leg. As such, the vertical position of the trim-rail 100 with respect to the footer 400 can be variably adjusted by engaging the tab 119 of the trim-rail 100 in different slots 410 of the footer 400. Further, the mating of the slots and the tab(s) can provide for a stronger structural connection between the footer and the trim-rail. As discussed above, a single tab can be received within a slot or multiple tabs can be received within multiple slots.

Further, in FIG. 5, the footer 400 does not have to include an aperture in the flat leg to receive a securement mechanism, which may be a lag bolt, to extend through the aperture and into the slot of the track. The footer may have an aperture defined by a separate structure 403 that is integrated between the upright leg and flat leg, as can be seen in FIG. 5. The structure 403 has a diagonal surface that extends (e.g., at 45 degrees) from the upright leg in a direction down to the flat leg.

Additionally, in the embodiment of FIG. 5, the splice 200 has an extension 220 of the body at the lower end of the splice. This extension is received with a track of the trim-rail 100. This can provide for a stronger structural connection between the splice and the trim-rail. Extension 220 also covers slot 112B from direct view.

Dual Track Rail and Triple Track Rail Rail-Based Systems

This embodiment of a rail-based system includes one or more dual track rails, which can be also referred to as a single rail, and one or more unique clamps that may be interconnected to a footing grid. This embodiment is also disclosed in U.S. Pat. No. 8,128,044, the disclosure of which is expressly incorporated by reference herein.

Figure 6:
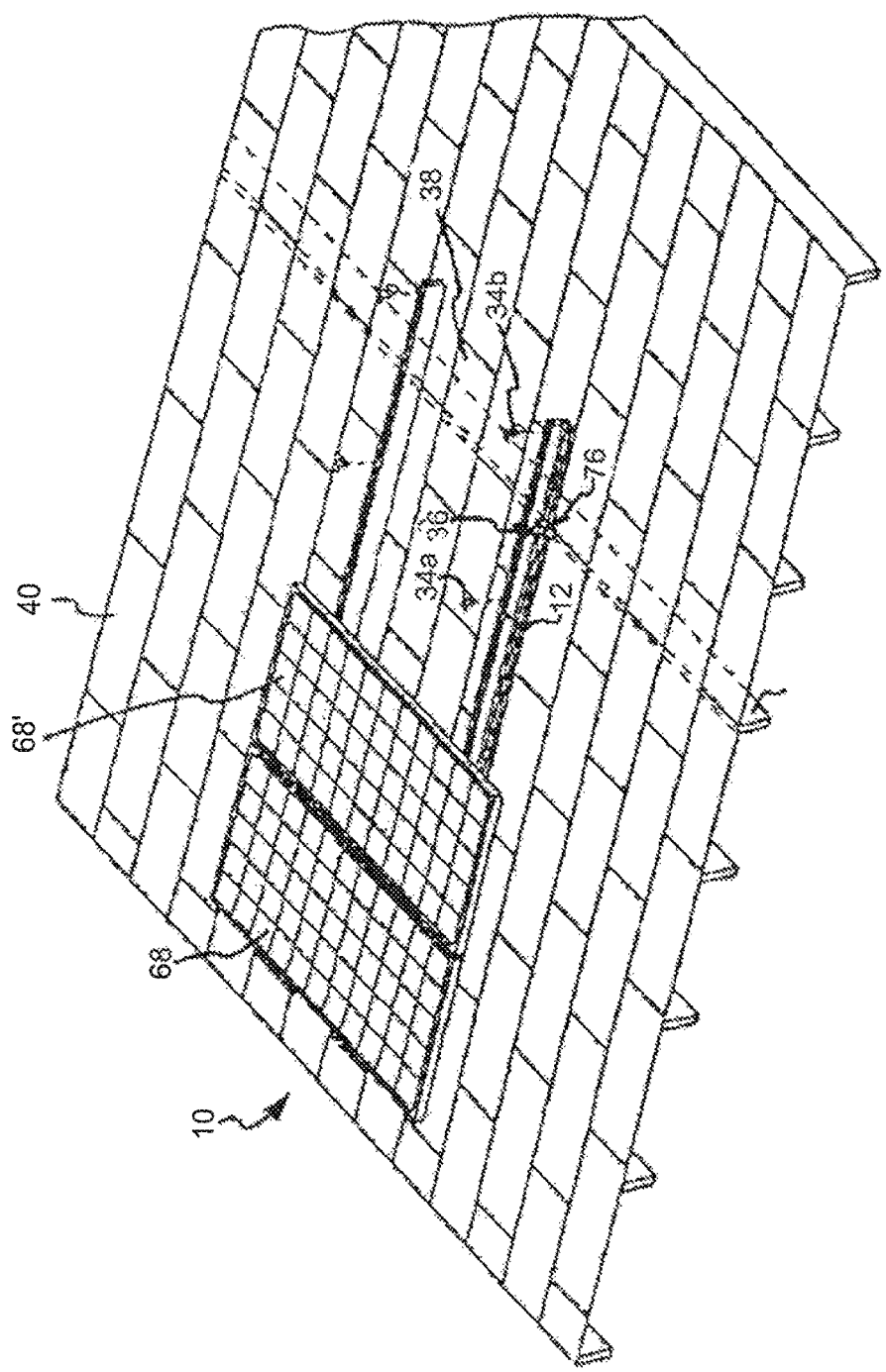
FIG. 6 is a perspective view of the system for removably and adjustably mounting a device on a surface in an operative environment as an apparatus for removably and adjustably mounting one or more photovoltaic modules on a surface such as a roof as shown.
Figure 8:
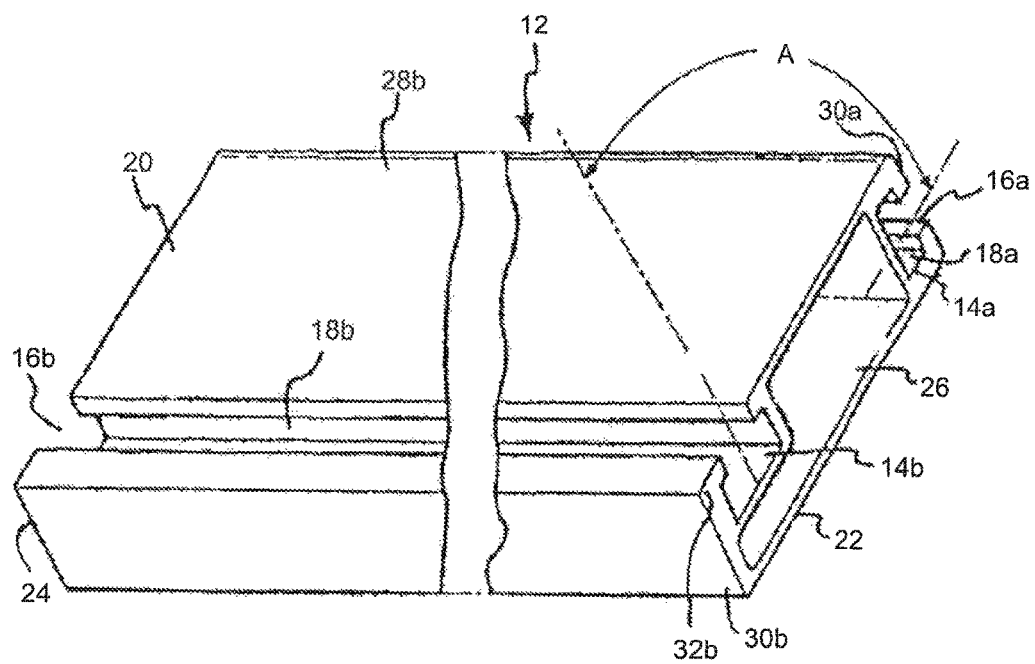
FIG. 8 is a perspective view of a rail in accordance with the present invention.
Figure 10:
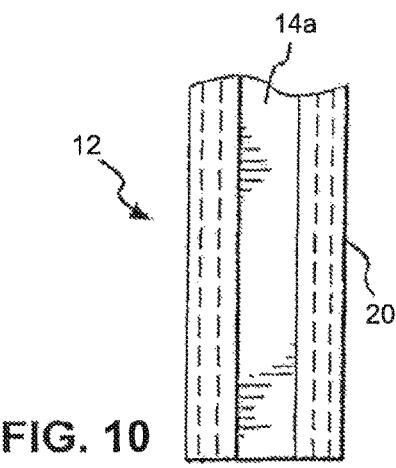
FIG. 10 is a top view of a rail in accordance with the present invention.
Figure 11:
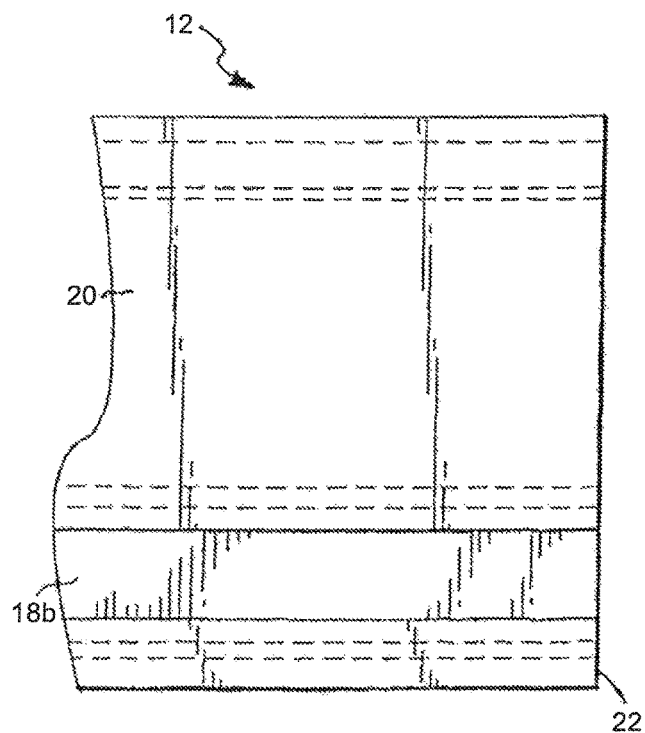
FIG. 11 is a side view of a rail in accordance with the present invention.
Figure 9:
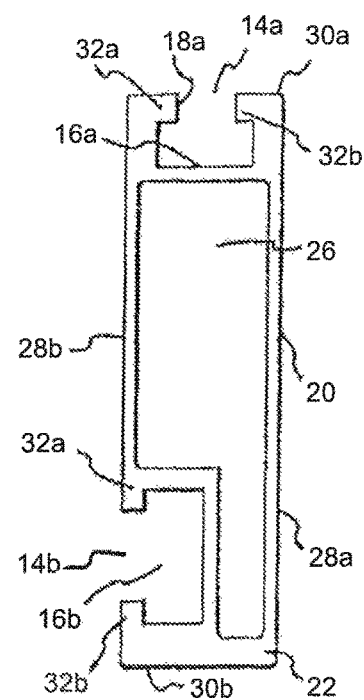
FIG. 9 is an end view of a rail in accordance with the present invention.
Figure 13:
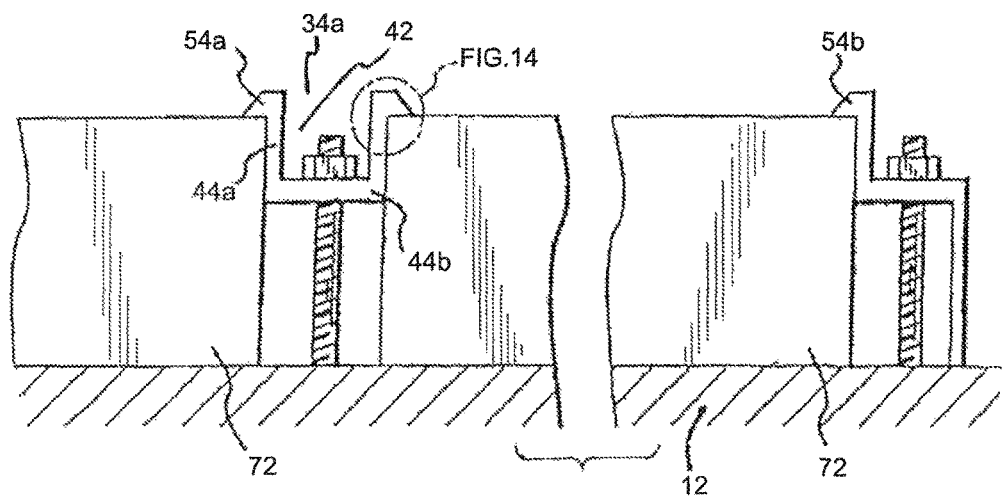
FIG. 13 shows a front view of clamps in accordance with the present invention.

FIG. 6 illustrates the rail-based system for removably and adjustably mounting a device on a surface in an operative environment. As shown, the system is an apparatus for removably and adjustably mounting one or more photovoltaic modules on a surface such as a roof. Referring initially to FIG. 6, the system for removably and adjustably mounting a device on a surface is shown and generally designated 10. The system for removably and adjustably mounting a device on a surface 10 includes at least one rail 12. In a preferred embodiment, at least one rail 12 is formed of extruded aluminum, but the material used is not a material consideration to the invention. As shown perhaps best by cross-reference between FIGS. 8-12, at least one rail 12 is formed with at least two tracks 14a,b, i.e., it is a dual track rail. Both of at least two tracks 14a,b include a channel 16a,b, perhaps best shown in FIGS. 8 and 9, extending the length of at least one rail 12 substantially coincident with the longitudinal axis of at least one rail 12. Each channel 16a,b in at least two tracks 14a,b is formed with a slot 18a,b. Slots 18a,b extend the length of at least one rail 12 substantially coincident with the longitudinal axis of at least one rail 12. In addition, slot 18a in channel 16a of at least one rail 12 is formed substantially at a right angle A to slot 18b in any other of at least two tracks 14a,b, as shown diagrammatically in FIG. 8. As shown in FIGS. 8, 9 and 12, at least one rail 12 is formed with a body 20. Body has a proximal end 22, a distal end 24, and a hollow chamber 26 between proximal end 22 and distal end 24 of body 20. Hollow chamber 26 contributes to the light weight yet structural rigidity of at least one rail, and therefore to its ease of handling during installation of system for removably and adjustably mounting a device on a surface 10. In a preferred embodiment, at least one rail 12 also is formed with opposing sides 28a,b and opposing shoulders 30a,b.

As further shown in FIG. 8, body 20 includes channel 16b formed in opposing side 28b for slidably engaging the rail on hardware described below. Channel 16b is formed with slot 18b extending along the longitudinal axis of at least one rail 12. In a preferred embodiment, slot 18a,b also includes opposing jaws 32a,b monolithically protruding from slot 18a,b substantially along the longitudinal axis of the channel 16a,b. Body 20 further includes channel 16a. Channel 16a is formed in opposing shoulder 30a as shown in FIGS. 8 and 9. Channel 16a also contributes, in combination with channel 16b, to making at least one rail 12 slidably engageable with the one or more footings 36. As will be apparent to a person skilled in the art, channel 16a and channel 16b enable at least one rail 12 to be slidable engageable with one or more footings 36.

As also shown by cross-reference among FIGS. 13-16, a system for removably and adjustably mounting a device on a surface 10 also includes one or more clamps 34a,b. As shown best by reference to FIGS. 13 and 15, one or more clamps 34a are formed as a duct 42. Duct 42 includes at least two opposing flanges 44a,b. Opposing flanges 44a,b of one or more clamps 34a are substantially perpendicular to one another. One or more clamps 34a may also be described as formed with a plate 46 and monolithic opposing side walls 48 extending substantially in the same direction at substantially right angles B from plate 46. Opposing side walls 48 include a lower inner edge 50 and an upper face 52. A fin 54 extends from upper face 52 substantially along the longitudinal axis of one or more clamps 34a,b. One or more clamps 34a also includes at least one hole 56 through plate 46 for securing one or more clamps 34a as described below.

Figure 16:
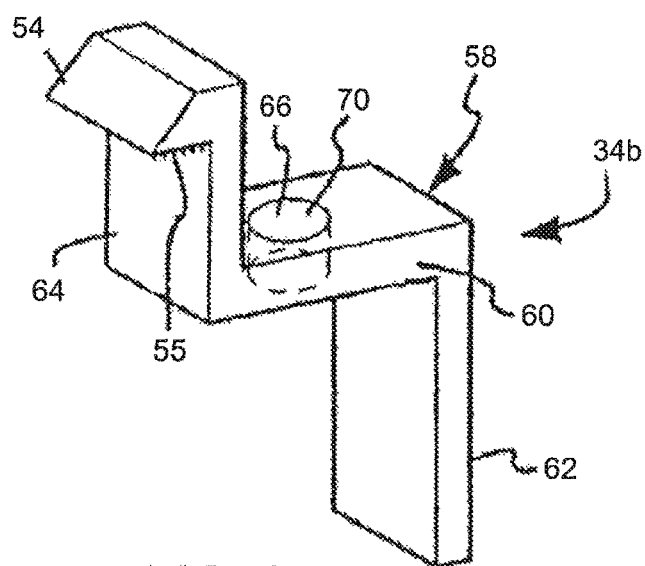
FIG. 16 is a perspective view of yet another embodiment of the clamp.

In an alternative embodiment of one or more clamps, one or more clamps 34b is formed with a leg 58 having a base 60 as shown best in FIG. 16. From base 60 of leg 58 a descending member 62 monolithically extends from base 60. In addition, from base 60 of leg 58 an ascending member 64 monolithically extends from base 60 in a direction substantially opposite the direction of descending member 62. As also shown in FIG. 16, one or more clamps 34b include means 66 for connecting base 60 to at least one rail 12. One or more clamps 34b also includes means 70 for variably positioning one or more clamps 34b in channel 16a of at least one rail 12.

Figure 7:
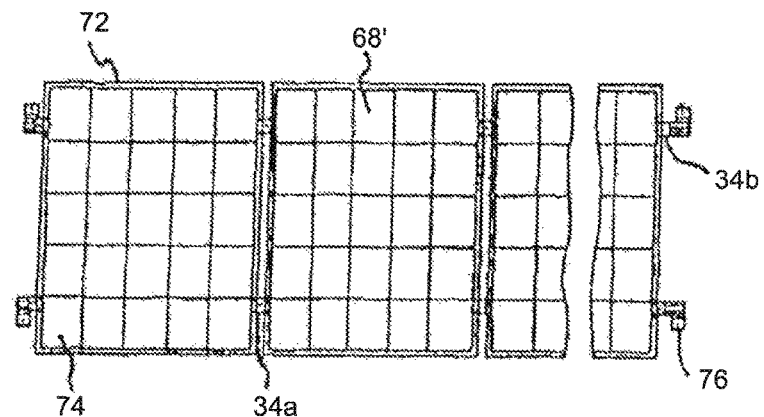
FIG. 7 is a top view of a module installed on a surface.

FIG. 6 also shows a device 68 that may be mounted on surface 40 using the rail-based system. In a preferred embodiment of the present invention, device 68 is a photovoltaic module 68', also shown in FIG. 7. Photovoltaic module 68' is formed with an edge 72. In a photovoltaic environment for application of the rail-based system, edge 72 holds one or more photovoltaic panels 74. As also shown best in FIGS. 6 and 7, footing grid 38 includes one or more footings 36. In combination, the one or more footings 36 compose a network of keepers 76. In the preferred embodiment, each of the network of keepers 76 is L-shaped and constructed of metal. Neither the shape nor material of the keepers 76 is a material limitation of the system. Each of keepers 76 may be fastened to surface 40. If surface 40 is a roof of a building, keepers 76 may be attached to surface 40 by inserting lag bolts (not shown) through keepers 76 into rafters 78 beneath surface 40. Once installed, keepers 76 form a grid, as shown in FIG. 1, on which at least one rail 12 of the present invention is removably connectable.

Figure 14:
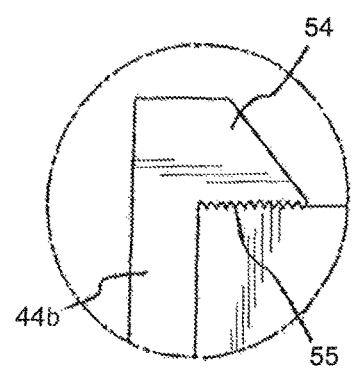
FIG. 14 shows a blown up view of the fin of a clamp as noted in FIG. 13.
Figure 15:
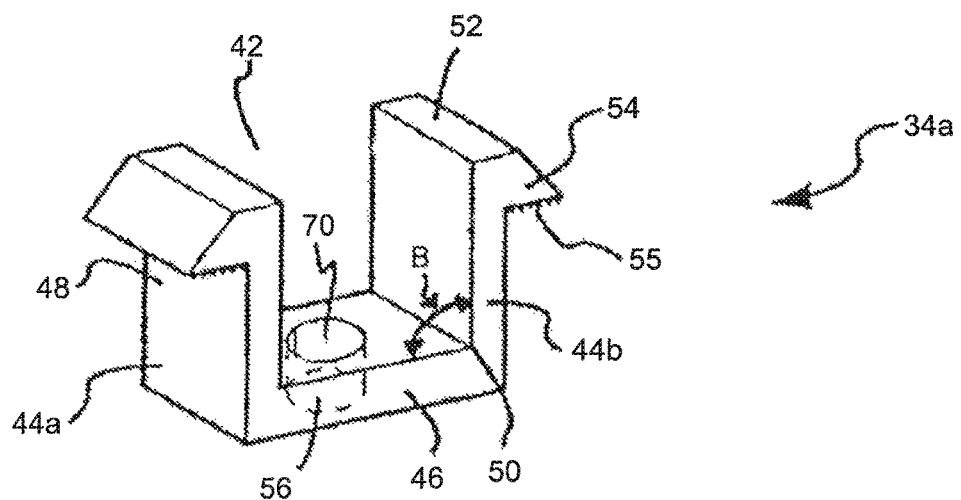
FIG. 15 is a perspective view of one embodiment of the clamp.

Using the principal embodiment of the system, in operation one or more clamps 34a,b are variably positionable not only on at least one rail 12, but also on footing grid 38 for demountably securing module 68' to footing grid 38, as shown by reference to FIG. 6. As shown in FIG. 14, a preferred embodiment of fin 54a,b includes a serrated surface 55 that grips edge 72 of module 68' with significant torsional rigidity, but because of the use of conventional hardware for attaching one or more clamps 34a,b to edge 72 of module 68', one or more clamps 34a,b are quickly and safely repositionable. As further shown by cross-reference between FIGS. 6 and 9, channel 16a, during installation, may be slidably engaged with at least one rail 12 and to footing grid 38. As shown in FIG. 9, slot 18a includes opposing jaws 32a,b monolithically protruding from slot 18a substantially along the longitudinal axis of channel 16a. Jaws 32a,b contribute to making one or more clamps 34a,b slidable and removably engageable, and therefore allow the system to be not only mounted, but reconfigured on surface 40. Channel 16b also contributes, in combination with first channel 16a, to making at least one rail 12 slidably engageable, and repositionable, with one or more clamps 34a,b. As will be apparent to a person skilled in the art, channel 16a and channel 16b enable at least one rail 12 to be slidable engageable with not only one or more clamps 34a,b, but also with footers 36 comprising footing grid 38.

While the system for removably and adjustably mounting a device on a surface 10 as shown in drawing FIGS. 6 through 16 is one embodiment of the rail-based system, it is only one such embodiment, it is not intended to be exclusive, and is not a limitation of the system. The particular system for removably and adjustably mounting a device on a surface as shown and disclosed in detail in this instrument is fully capable of obtaining the objects and providing the advantages stated, but this disclosure is merely illustrative of the presently preferred embodiments of this system invention, and no limitations are intended in connection with the details of construction, design or composition.

Further optimizations in connection with the system are achieved by including features and elements desirable for increasing the range and variety of different applications and environments in which the system may be used. In at least one such additional optimization of the system, an apparatus and method for positioning a module on an object is provided. The rail-based system includes one or more rails having at least three rails (a "triple track rail" or "triple track rails") used in combination with at least one connector bracket.

Figure 17:
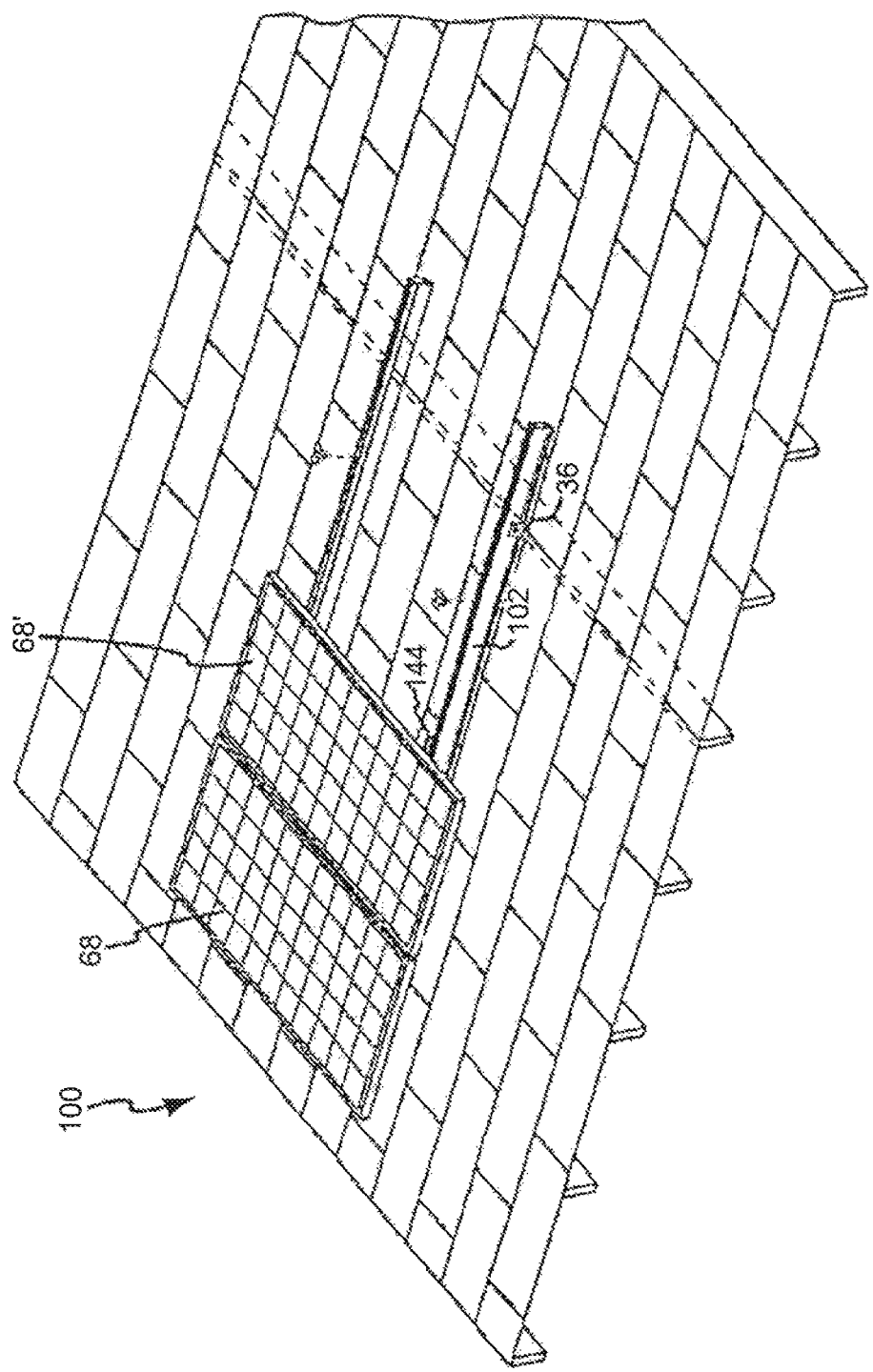
FIG. 17 is a perspective view of the apparatus and method for positioning a module on an object in an operative environment.

FIG. 17 illustrates the apparatus for positioning a module on an object in an operative environment. As shown, the system includes an apparatus for removably and adjustably mounting one or more photovoltaic modules on an object such as a pole or roof. Referring initially to FIG. 17, the apparatus for positioning a module on an object is shown and generally designated 100. The apparatus 100 for positioning a module 68' on an object includes at least one rail 102. In a preferred embodiment, at least one rail 102 is formed of extruded aluminum, but neither the materials used nor the extrusion method of manufacture is material to the system.

Figure 18:
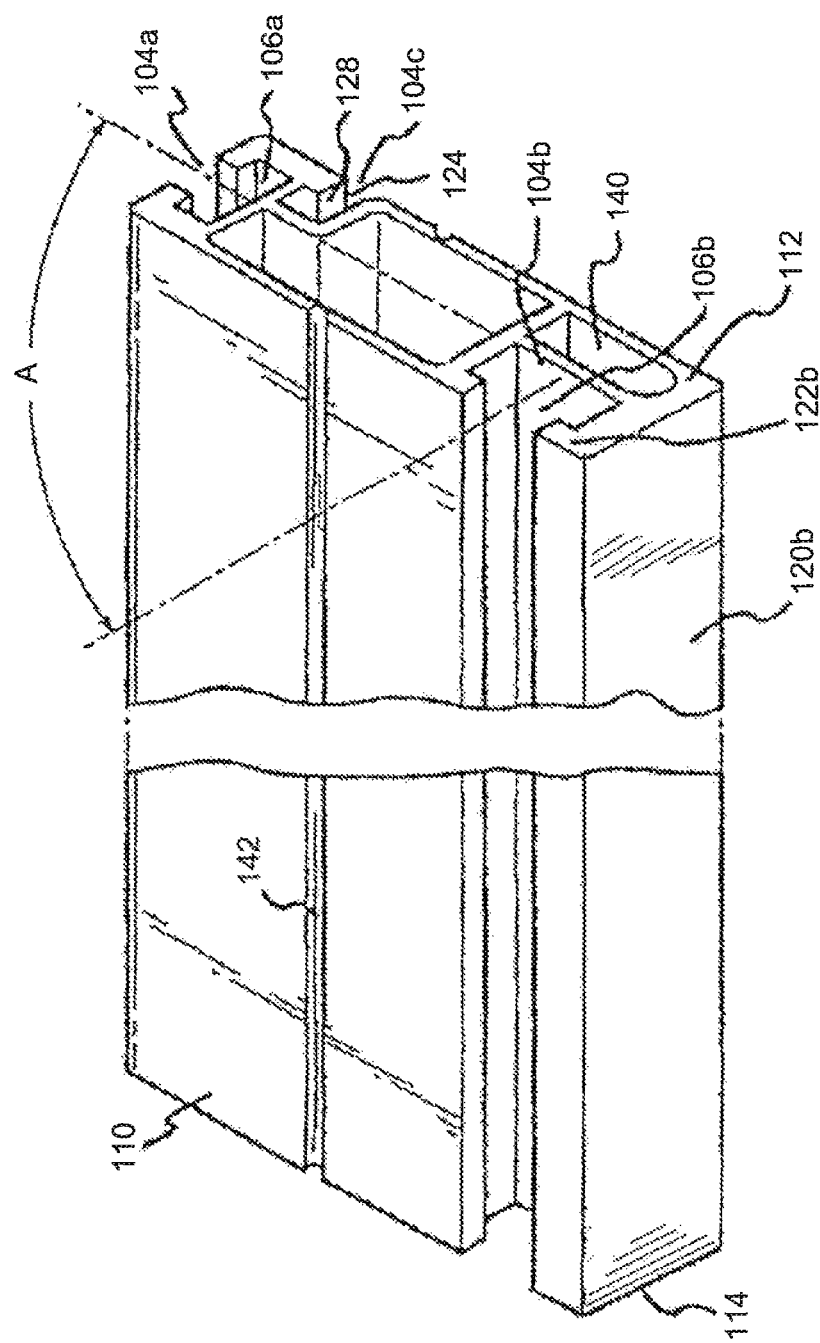
FIG. 18 is a perspective view of the triple track rail in accordance with the present invention.
Figure 19:
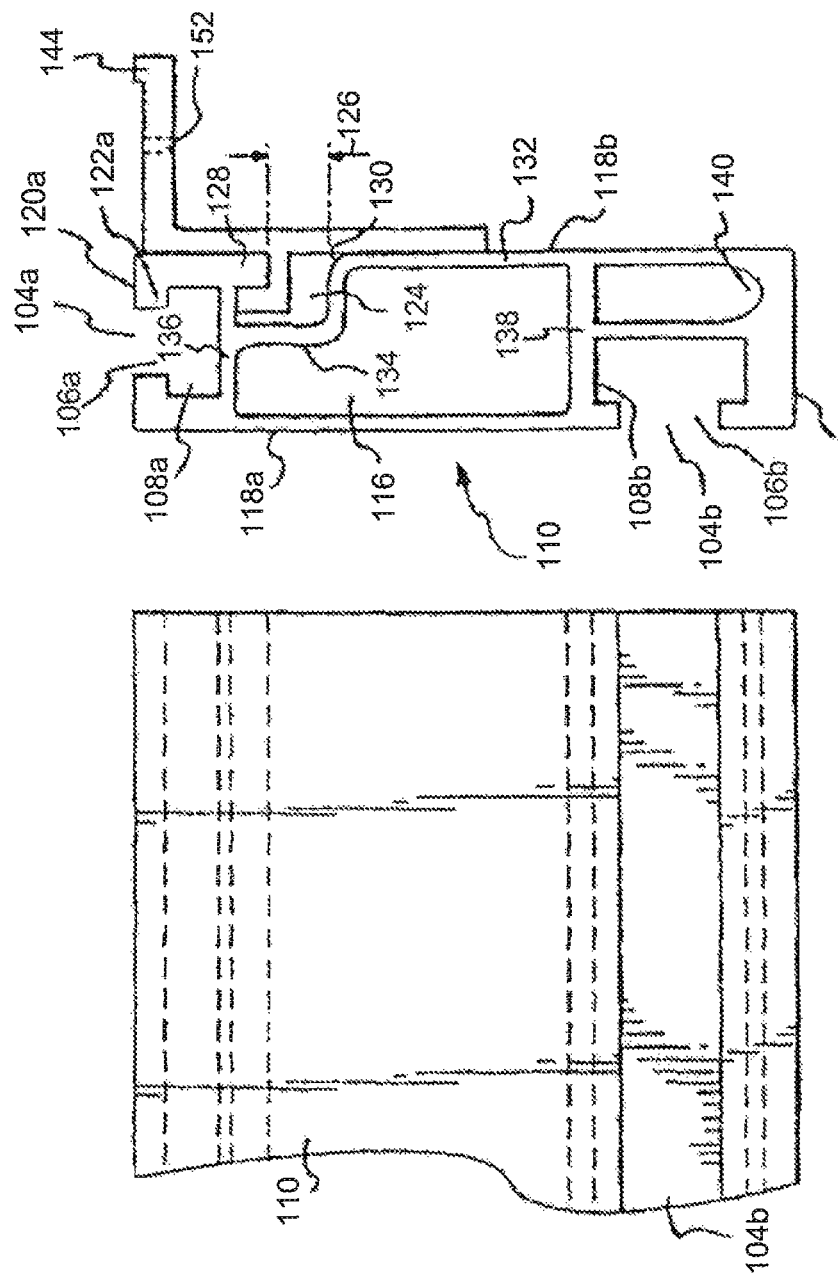
FIG. 19A is a side view of the triple track rail.
FIG. 19B is an end view of the triple track rail.

As shown perhaps best by cross-reference among FIGS. 18, 19A and 19B, at least one rail 102 is formed with at least three tracks 104a,b,c, i.e., it is a triple track rail which can be also referred to as a single rail. Two of at least three tracks 104a,b,c include a channel 106a,b. For illustrative purposes, as best shown by cross-reference among FIGS. 18, 19A and 19B, two of the at least three tracks 104a,b,c are shown with channels 106a,b extending the length of at least one rail 102 substantially parallel to the longitudinal axis of at least one rail 102. Each channel 106a,b in at least two tracks 104a,b is formed with a slot 108a,b that for illustrative purposes are shown as slots 108a,b. Slot 108a,b extends the length of at least one rail 102 substantially parallel to the longitudinal axis of at least one rail 102. In addition, slot 108a in channel 106a of at least one rail 102 is formed substantially at a right angle A to slot 108b as shown diagrammatically in FIG. 19B.

As shown in FIGS. 18, 19A and 19B, at least one rail 102 also is formed with a body 110. Body 110 has a proximal end 112, a distal end 114 as best shown in FIG. 18, and a hollow chamber 116 between proximal end 112 and distal end 114 of body 110 as best shown in FIG. 19B. Hollow chamber 116 contributes to the light weight yet structural rigidity of at least one rail, and therefore to its ease of handling during installation of apparatus while positioning a module 68' on an object. In a preferred embodiment, as best shown in FIGS. 18 and 19B, at least one rail 102 also is formed with opposing sides 118a,b and opposing shoulders 120a,b. In operation, as further shown in FIGS. 19B and 20, tracks 104a,b permit at least one rail 102 to be slidably engageable on hardware described below.

In a preferred embodiment, as shown by cross-reference between FIGS. 18 and 19B, slot 108a,b also includes opposing jaws 122a,b monolithically protruding from slot 108a,b substantially along the longitudinal axis of channel 106a,b. Channel 106a is formed in opposing shoulder 120a as shown in FIG. 19B. Channel 106a also contributes, in combination with channel 106b, to making at least one rail 102 slidably engageable with the one or more footers 36.

Apparatus for positioning a module on an object 100, as shown by cross-reference between FIGS. 18 and 19B, also includes a cavity 124 formed in body 110 of at least one rail 102. Cavity 124 is formed through at least one opposing side 118a,b, and for illustrative purposes is shown in FIG. 19B as being formed through at least one opposing side 118b. As also shown in FIG. 19B, an opening 126 is formed in opposing side 118b. Opening 126 in opposing side 118b is defined by a boss 128 also formed in opposing side 118b as well as by a shelf 130. In a preferred embodiment, shelf 130 is formed monolithically from edge 132 in opposing side 118b that is opposite boss 128. Shelf 130 also extends monolithically into hollow chamber 116 to form a partition 134 that is best shown in FIG. 19B. Partition 134 merges monolithically into beam 136 in slot 108a, as best shown in FIG. 19B.

In addition, as also shown in FIG. 19B, a beam 138 extends through hollow chamber 116 between opposing sides 118a,b of rail 102. In operation, beam 138 resists compressive and similar forces applied against rail 102, thus enhancing the rigidity and longevity of apparatus for positioning a module on an object 100 when installed. Also in a preferred embodiment, hollow chamber 116 is formed with a substantially semicircular passage 140, as best shown in FIGS. 18 and 19B. In operation, use of semicircular passage 140 instead of, for example, a passage having a rectangular shaped cross-section, also contributes to resisting compressive and other forces on apparatus for positioning a module on an object 100 after installation and mounting of rail 102 on module 68'. In a preferred embodiment, at least one semicircular groove 142 is formed in at least one of the opposing sides 118a,b as shown in FIG. 18, for assisting an installer in drilling one or more additional holes (not shown) through opposing sides 118a,b for securing a mounting device (not shown) in which electrical or other lines may be secured.

Figure 20:
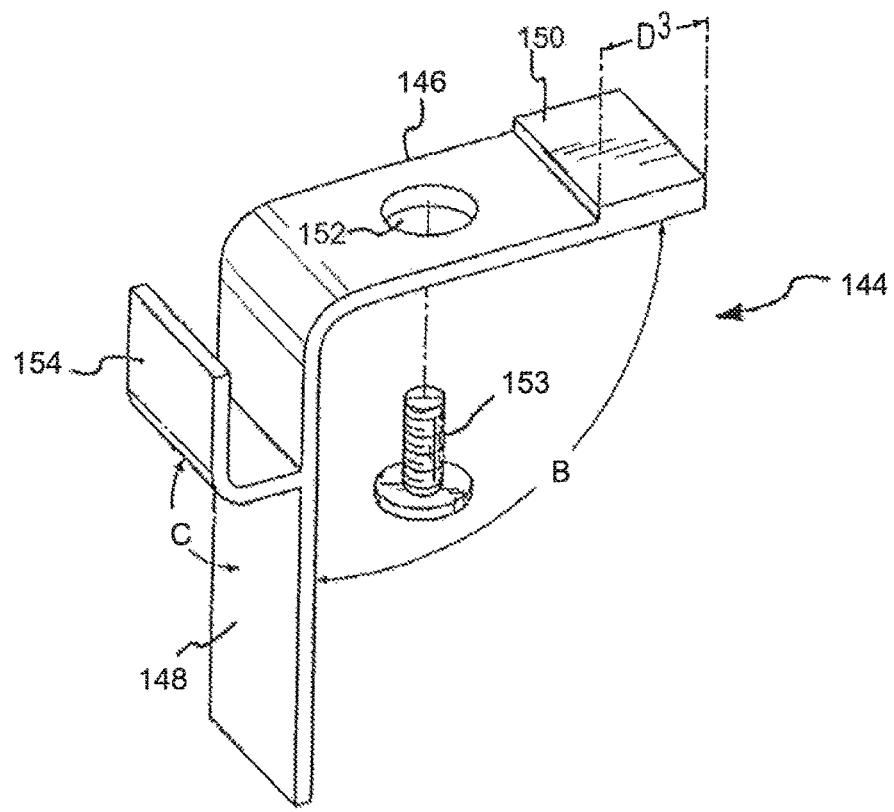
FIG. 20 is a perspective view of the connector bracket in accordance with the present invention.

Also included in the rail-based system for positioning a module on an object 100 are one or more connector brackets 144, as shown by cross-reference between FIGS. 19B and 20. One or more connector brackets 144 is formed to be demountably attachable to at least one rail 102 and to device 68 or module 68'. To achieve that object, one or more connector brackets 144 is monolithically formed with a first flange 146 and a second flange 148 substantially at a right angle as shown diagrammatically as Angle B in FIG. 20. First flange 146 is formed with a lip 150. In addition, first flange 146 is formed with a bore 152. In operation, bore 152 is provided for insertion of a fastener 153 through bore 152 to secure connector bracket 144 to device 68 or module 68'. In a preferred embodiment, one or more connector brackets 144 further comprises an elbow 154. Elbow 154 is substantially L-shaped, and extends monolithically at substantially a right angle from second flange 148 as shown diagrammatically as Angle C in FIG. 20. Elbow 154 is shaped and configured for detachable engagement with cavity 124 formed in hollow chamber 116 of body 110. As shown best in FIG. 19B, elbow 154 is engageable with boss 128 as well as beam 136.

Figure 21:
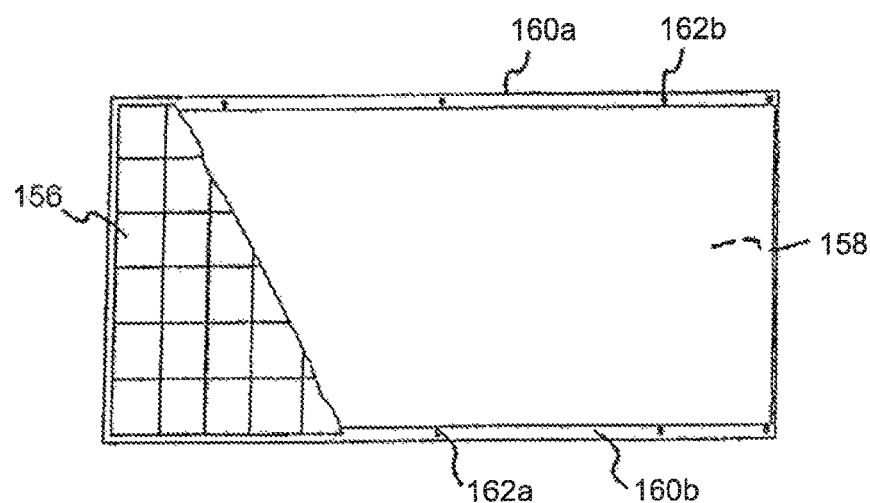
FIG. 21 is a top partially cut away view of a module.

In operation, with respect to FIGS. 17-21, as will be evident to one skilled in the art, the unique combination of one or more connector brackets 144, cavity 124, and three tracks 104 formed in at least one rail 110 (collectively, the "combined components") permits installation of apparatus for positioning a module on an object 100 in a wide variety of alternative ways. For example, as shown in FIG. 21, module 68' is typically formed with a collector side 156 and a back side 158. The term "collector side" refers generally to that side of module 68' that collects solar energy radiation from the sun. The term "back side" refers generally to that side of module 68' that does not collect solar energy radiation from the sun. The combined components permit an installer to select module 68' having at least collector side 156 and back side 158, constructed with at least two opposing edges 160a,b having a plurality of holes 162a,b. The combined components permit an installer to position module 68' collector side 156 down, mount at least one rail 102 on the back side 158 of module 68', and reposition the combined components collector side 156 up to install the combined components on the object 68. Alternatively, the combined components allow an installer to install the components either top down or bottom up.

Low Profile Rail Rail-Based System

This embodiment of a rail-based system includes a low profile, shared rail. This embodiment is also disclosed in U.S. Pat. No. 7,600,349, the disclosure of which is expressly incorporated by reference herein.

As shown in FIGS. 22 through 34, a low profile mounting system is provided that in its broadest context includes at least one rail 12, which can be a shared rail. At least one track 14 is formed in rail 12 with opposing jaws 16a b. Opposing jaws 16a,b define a slot 18. Opposing jaws 16a,b are disposed in rail 12 asymmetrically to the longitudinal axis of rail 12 and to each other. At least one ledge 20 monolithically extends from rail 12 for holding an object such as the frame 22 of a solar panel 24. A coupler 26 is provided for demountably connecting solar panel 24 to rail 12. A cleat 28 also is provided for attaching the low profile mounting system to a surface 30. A connector connects rail 12 to cleat 28.

Figure 22:
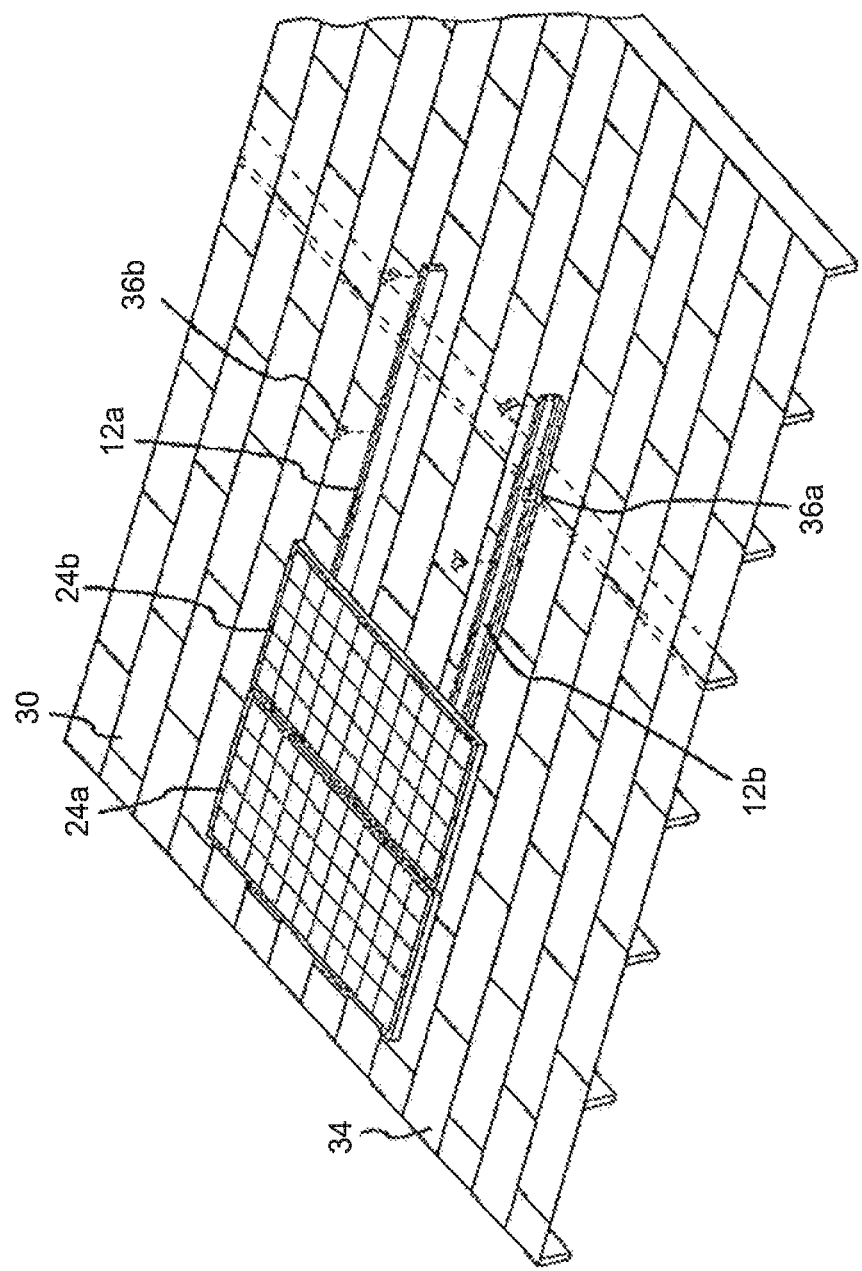
FIG. 22 of the drawing is a perspective view of a mounting system located on a roof.

As shown in FIG. 22, rails 12a, b are mounted on a surface 30. Surface 30 is a roof 34. FIG. 22 also shows solar panels 24a, b bounded by frames 22a, b. During installation frames 22a, b are connected to rails 12a, b. Rails 12a, b are secured to roof 34. In general, rails 12a, b are secured to roof 34 in part using footers or footings (in this document, a "footing 36"). A number of footings 36a, b traditionally have been used to secure rails 12a, b to roof 34. Footings 36a, b may be L-shaped and constructed of metal or other materials. Footings 36a, b may be attached to roof 34 by inserting lag bolts (not shown) through passages (not shown) in footings 34a, b into rafters 38 beneath roof 34.

As also shown in FIG. 22, in a conventional mounting configuration, solar panels 24a, b are mounted top-down onto rails 12a, b. This may present an aesthetically displeasing appearance because solar panels 24a, b and rails 12a, b present an undesirably excessive elevation. What is desirable is to easily, quickly, and securely mount solar panels 24a, b on a surface 30 that produces a low profile that is comparatively inconspicuous and as indiscernible as possible.

Low profile mounting system 10, as shown in different embodiments in FIGS. 23 through 34, allows an installer to achieve a low profile that is comparatively inconspicuous and as indiscernible as possible.

Figure 23:
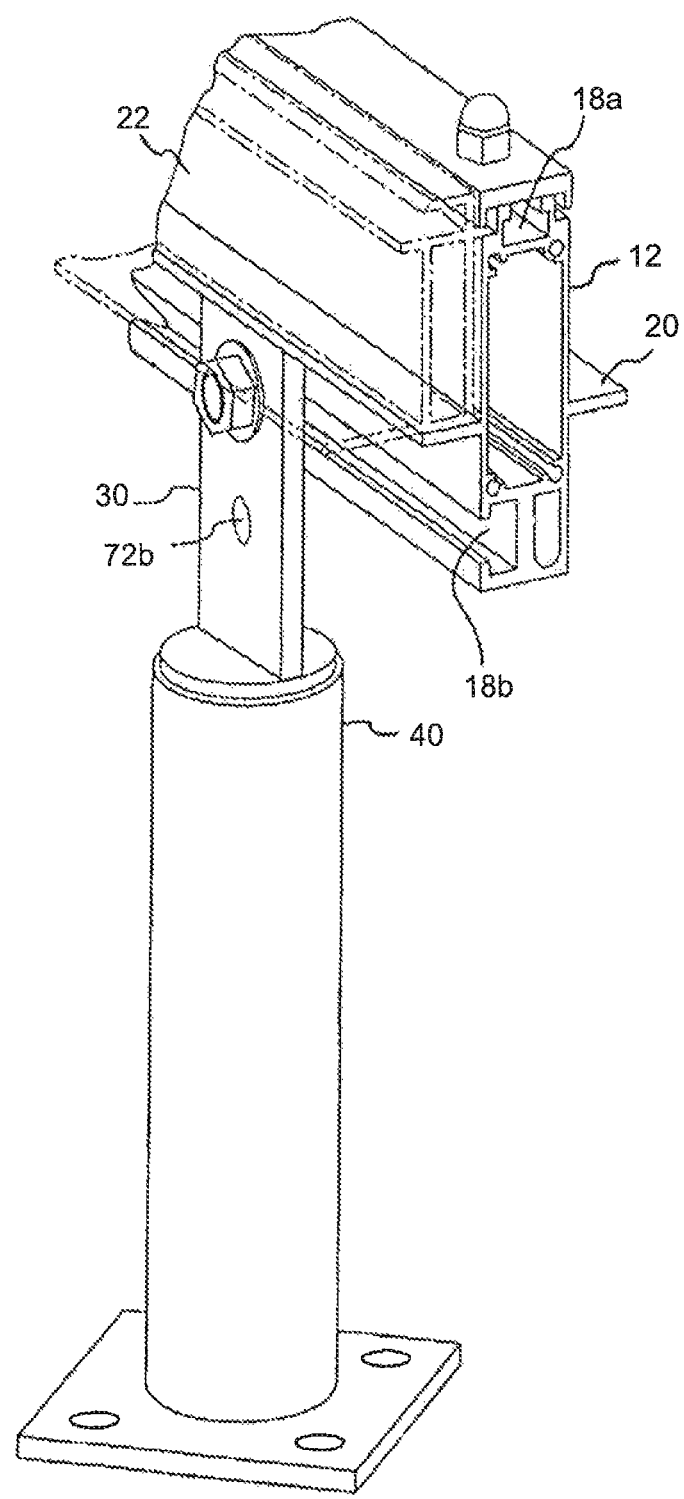
FIG. 23 is a perspective view of a first embodiment of the low profile mounting system in an operative environment.
Figure 24:
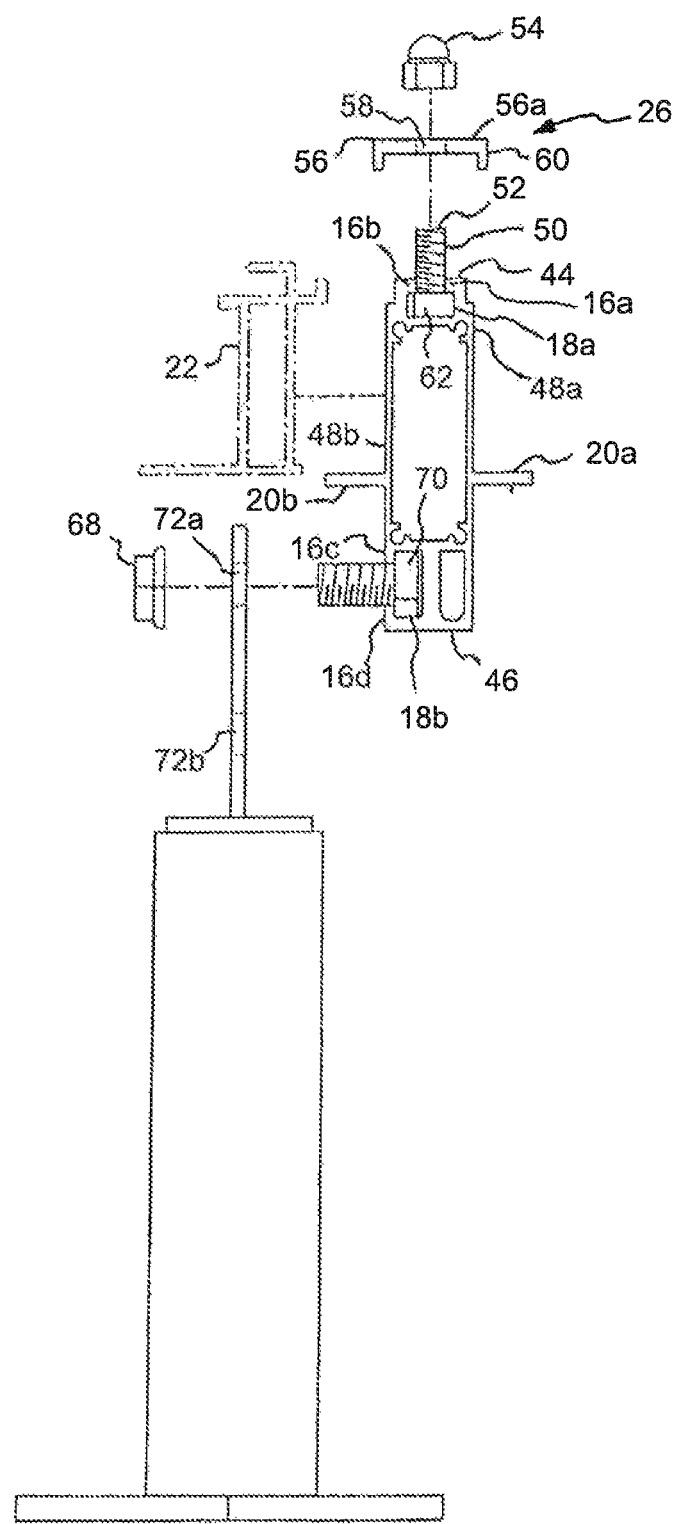
FIG. 24 is an exploded end view of the first embodiment of the first embodiment of the low profile mounting system.

In the embodiment of low profile mounting system 10 illustrated by cross-reference between FIGS. 23 and 24, rail 12 is shown to be mountable on a surface 30 known as a stanchion or stand-off (in this document, a "stanchion 40") rather than on roof 34. Stanchion 40 is useful because of the aforementioned variety of materials used to manufacture a roof 34 and coverings for roof 34. For example, if the covering for roof 34 is made of tile, bolting a rail 12 directly to a tile on roof 34, through a tile (not shown), is undesirable because the tiles may crack or break. To avoid that problem, one or more tiles are removed, stanchion 40 is installed on roof 34, and solar panel 24 is attached to stanchion 40.

To achieve a lower profile than conventional installation apparatus allow, in the embodiment of low profile mounting system illustrated by cross-reference between FIGS. 23 and 24, rail 12 is shown to include at least one ledge 20. As shown, rail 12 is formed with an upper surface 44, a lower surface 46, and opposing walls 48a,b monolithically connected to upper surface 44 and lower surface 46. At least one ledge 20 extends at a substantially right angle from opposing walls 48a,b in opposite directions from the longitudinal axis through rail 12. Rather than mount solar panel 24 top-down, thus raising the total elevation of an installed mounting system, at least one ledge 20b allows installation of frame 22 of solar panel 24 closer to surface 30.

As also shown in the embodiment shown in FIGS. 23 and 24, rail 12 includes plurality of tracks 14a, b. Plurality of tracks 14a, b is formed in rail 12 with opposing jaws 16a-d defining slots 18a, b. In addition, in the embodiment shown in FIGS. 23 and 24, opposing jaws 16a, b and opposing jaws 16c, d are disposed in rail 12 asymmetrically to each other and to the longitudinal axis of rail 12. The term "asymmetrically" as used in this document means that slot 18a is directionally disposed differently than slot 18b. As indicated, at least one coupler 26 is provided. Coupler 26 includes an attachment device 50. In the embodiment shown in FIGS. 23 and 24, attachment device 50 is a first bolt 52 and a first nut 54. Coupler 26 also includes a clamp 56. Clamp 56, as shown in FIGS. 23 and 24, is substantially a U-shaped gutter 56a formed with an orifice 58 and opposing fins 60. The head 62 of first bolt 52 is slidably insertable into slot 18a of track 14 to extend through opposing jaws 16a, b and, by deploying first nut 54 on first bolt 52, U-shaped gutter 56a may be clamped into ducts 64a, b formed on a conventional frame 22 of solar panel 24. Clamp 56 as shown in all embodiments of low profile mounting system 10 may be a short segment, or may extend the entire length of rail 12 to enhance the aesthetic appearance of an installed low profile mounting system 10, and to aid in resisting wind and rain penetration into the components of low profile mounting system 10.

FIGS. 23 and 24 also show that a second bolt 66 and a second nut 68 are included. Head 70 of second bolt 66 is slidably insertable into track 14b to extend through slot 18b. An opening 72 is provided in an extension 74 of stanchion 40. Second bolt 66 is inserted through opening 72, second nut 68 is inserted on second bolt 66, and the embodiment of low profile mounting system 10 as shown in FIGS. 23 and 24 is securely attached to stanchion 40, which in turn has been attached to roof 34. Solar panel 24 thus provides a low visual profile.

Figure 25:
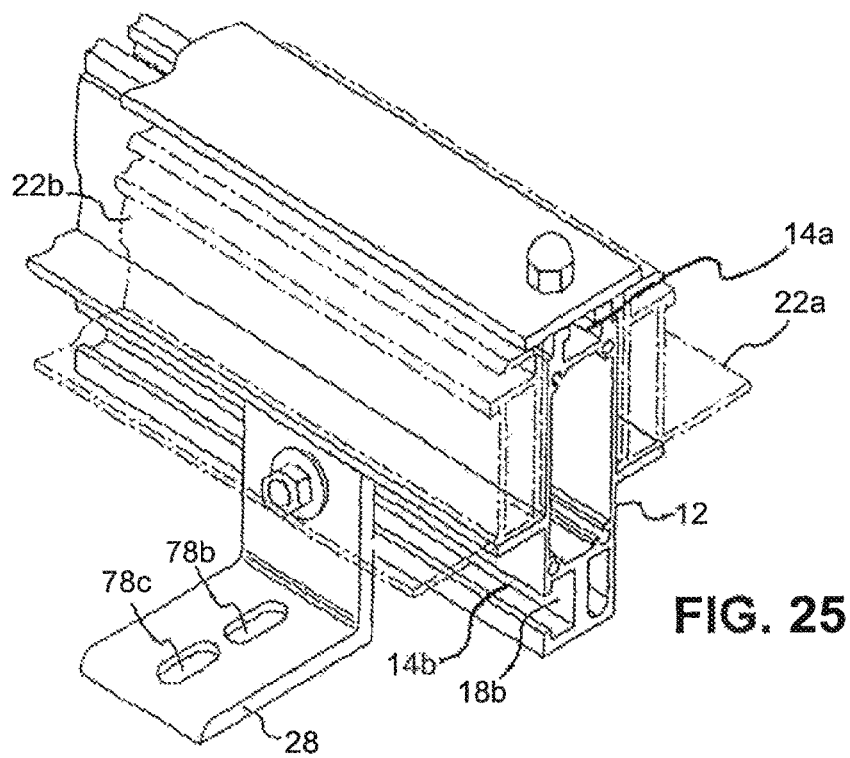
FIG. 25 is a perspective view of a second embodiment of the low profile mounting system in an operative environment.
Figure 26:
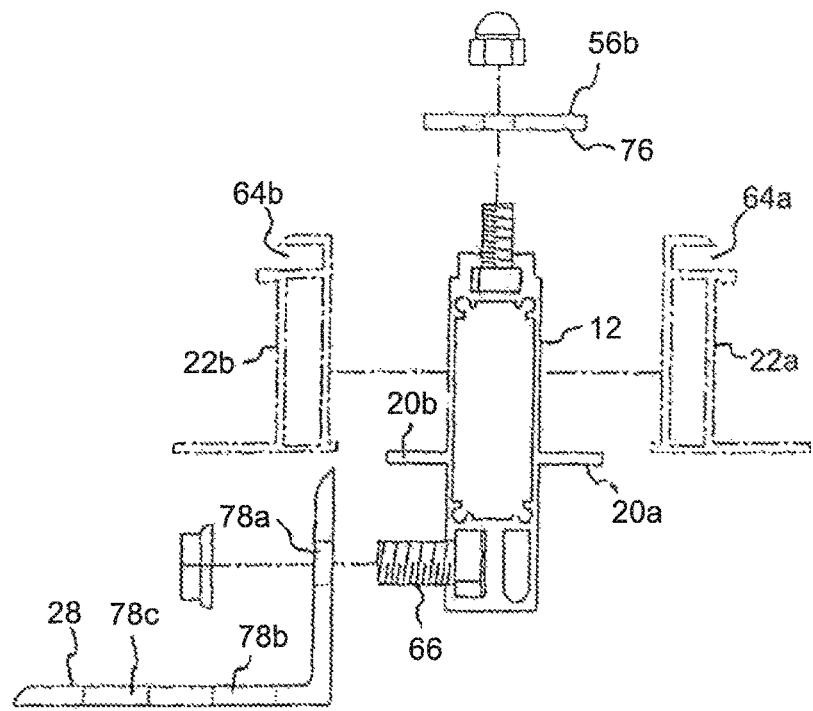
FIG. 26 is an exploded end view of a second embodiment of the low profile mounting system.

In the embodiment low profile mounting system 10 illustrated by cross-reference to FIGS. 25 and 26, low profile mounting system 10 is shown to include a plurality of ledges 20a, b on rail 12 for holding a pair of solar panels 22a and 22b. In this sense, mounting system 10 is a "shared" rail system. FIGS. 25 and 26 also show an embodiment of low profile mounting system 10 that includes at least one cleat 28. Further, the embodiment shown in FIGS. 25 and 26 shows a clamp 56b in the form of a substantially flat planar surface or plate 76. Clamp 56b is another embodiment of clamp 56 useful in providing a pleasing configuration to an assembled low profile mounting system 10 and for securing ducts 64a, b of a plurality of frames 22a, b on plurality of ledges 20a, b on rail 12. Further, cleat 28 includes at least one hole 78. As shown, cleat 28 includes holes 78a, b, c. Holes 78a, b are used to attach cleat 28 to roof 34 using lag bolts or similar connectors. Hole 78a is used to attach cleat 28 to rail 12 by inserting second bolt 66 into slot 18b and through hole 78c, and attaching second nut 68 to second bolt 66. As a result, a secure, easily installable, and aesthetically pleasing installation of low profile mounting system 10 is achieved.

Figure 27:
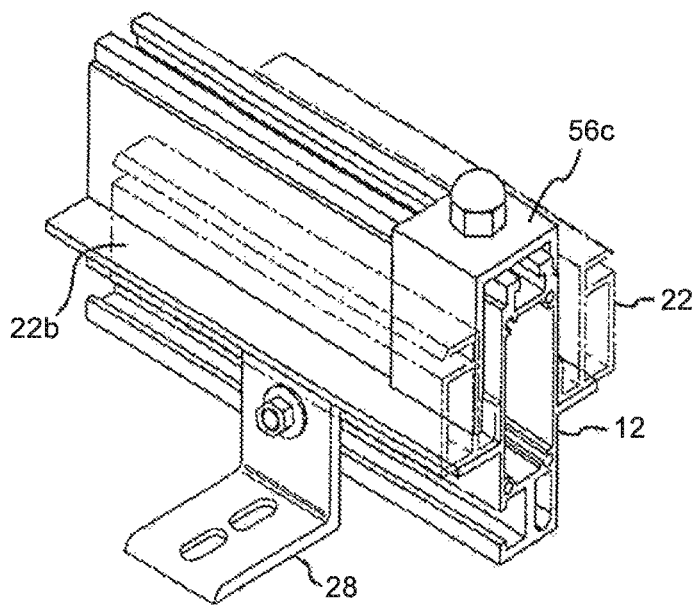
FIG. 27 is a perspective view of a third embodiment of the low profile mounting system in an operative environment.
Figure 28:
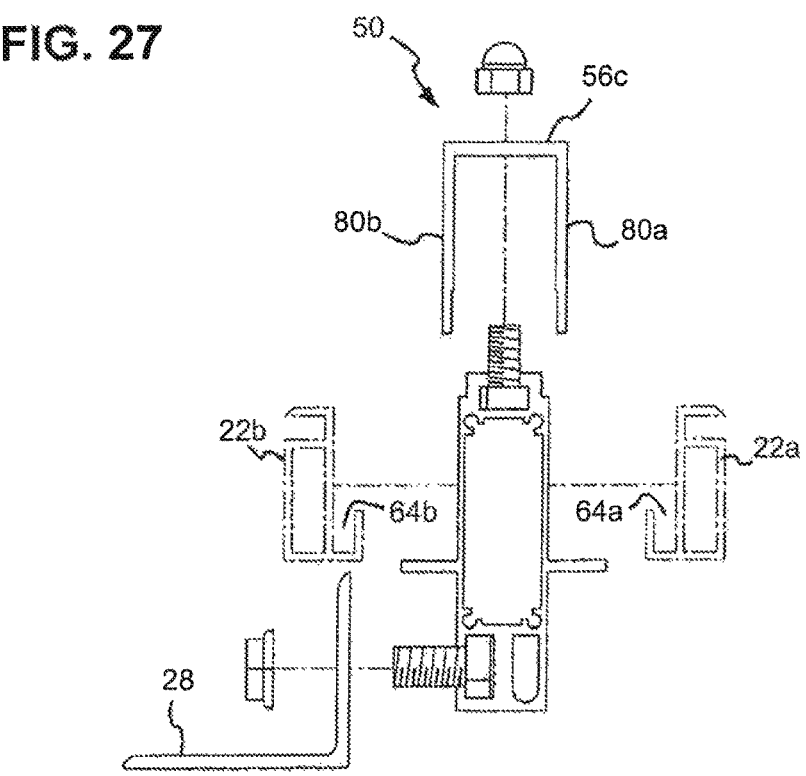
FIG. 28 is an exploded end view of the third embodiment of the low profile mounting system.

In another embodiment of low profile mounting system 10, as shown in FIGS. 27 and 28, an alternative clamp 56 is provided as clamp 56c. Clamp 56c is useful in connection with variations of frame 22 formed with a plurality of ducts 64a, b as shown best in FIG. 28. Clamp 56c also is formed as a gutter, but with opposing arms 80a, b long enough to be removably insertable into ducts 64a, b to hold frame 22 of solar panel 24 tightly against ledge 20a, b when locked into position using attachment device 50.

Figure 29:
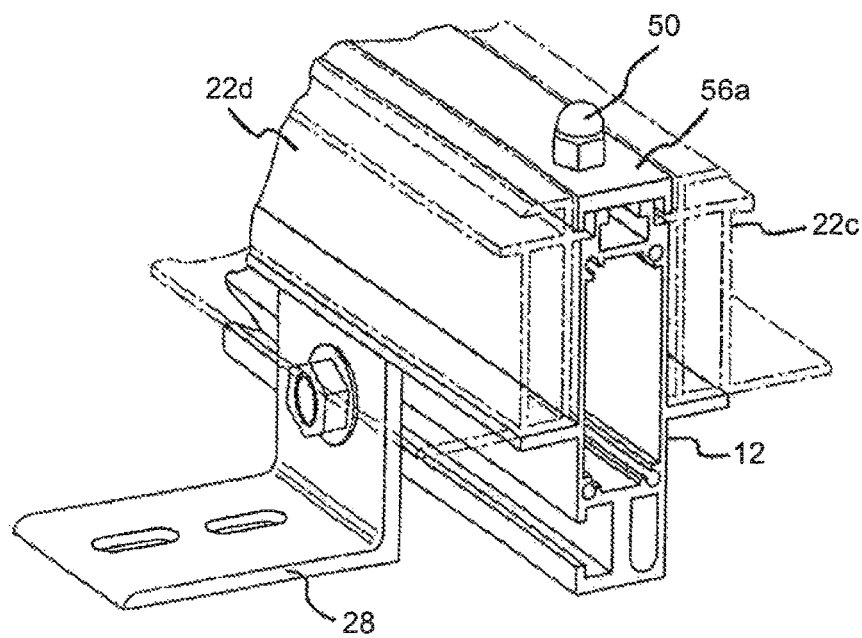
FIG. 29 is a perspective view of a fourth embodiment of the low profile mounting system in an operative environment.
Figure 30:
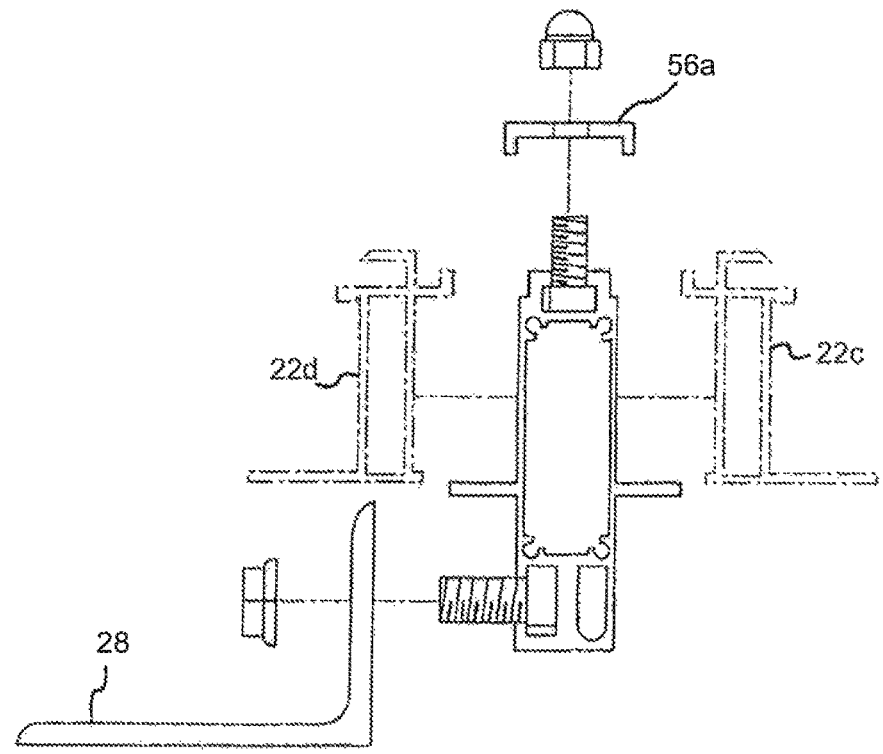
FIG. 30 is an exploded end view of the fourth embodiment of the low profile mounting system.

In the embodiment of low profile mounting system 10 illustrated in FIGS. 29 and 30, clamp 56a, as shown by cross-reference between FIGS. 23 and 24 in connection with a single frame 22 of solar panel 24 being attached to stanchion 40, is shown to be equally useful when disposed in a configuration in which a plurality of opposing frames 22c, d are mounted on a rail 12 that in turn is mounted on cleat 28 for attachment to roof 34.

Figure 31:
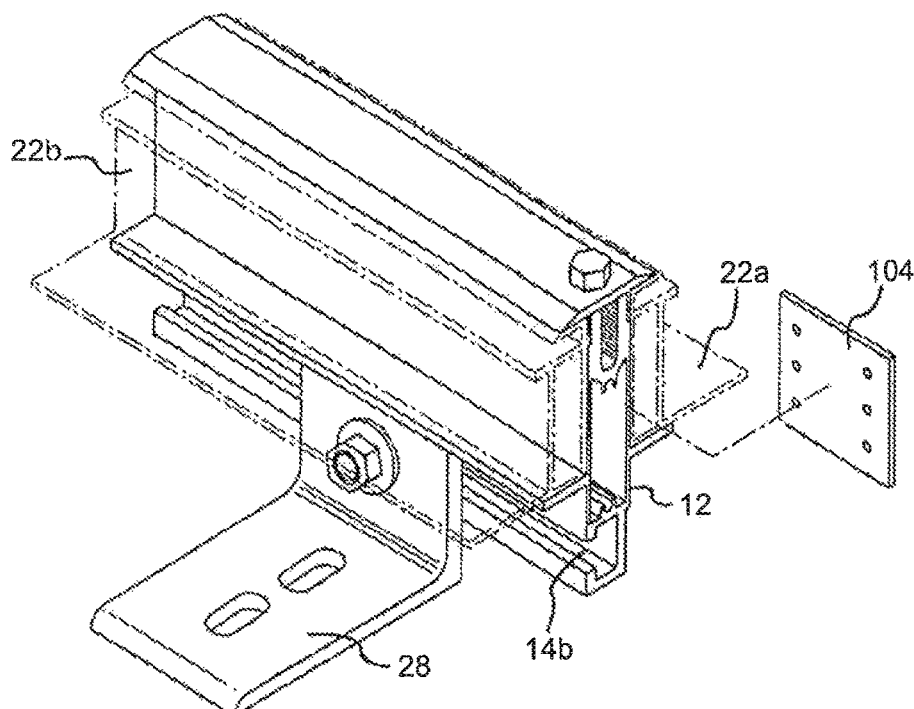
FIG. 31 is a perspective view of a fifth embodiment of the low profile mounting system in an operative environment.
Figure 32:
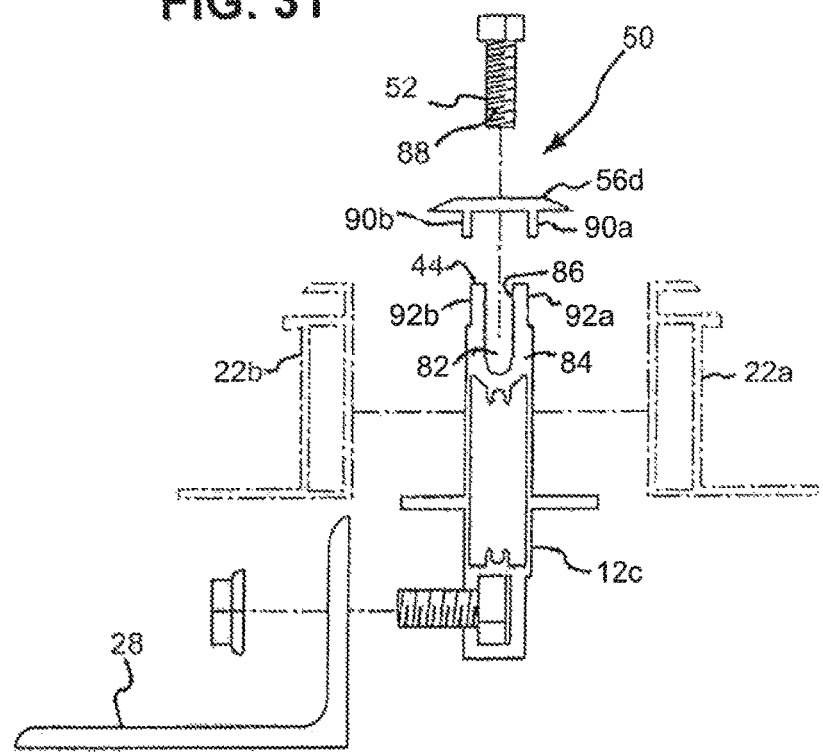
FIG. 32 is an exploded end view of the fifth embodiment of the low profile mounting system.

In another embodiment of low profile mounting system 10, as shown by cross-reference between FIGS. 31 and 32, rail 12 is shown with a track 14b and a longitudinal cavity 82 formed in upper surface 44 of rail 12c. As shown, longitudinal cavity 82 is shaped to receive an attachment device 50. Attachment device 50, as shown in FIG. 32, includes first bolt 52. A receptor body 84 also is monolithically formed adjacent longitudinal cavity 82. As shown in FIG. 32, first threads 86 are formed in receptor body 84 for matable connection with second threads 88 formed on first bolt 52. Further, as also shown in FIG. 32, clamp 56d is formed with a contoured cross-sectional configuration for both aesthetics and for gripping frame 22 of solar panel 24a, b, and includes parallel nubs 90a, b. Parallel nubs 90a, b are designed to fit tightly along exterior surfaces 92a, b of longitudinal cavity 82.

Figure 33:
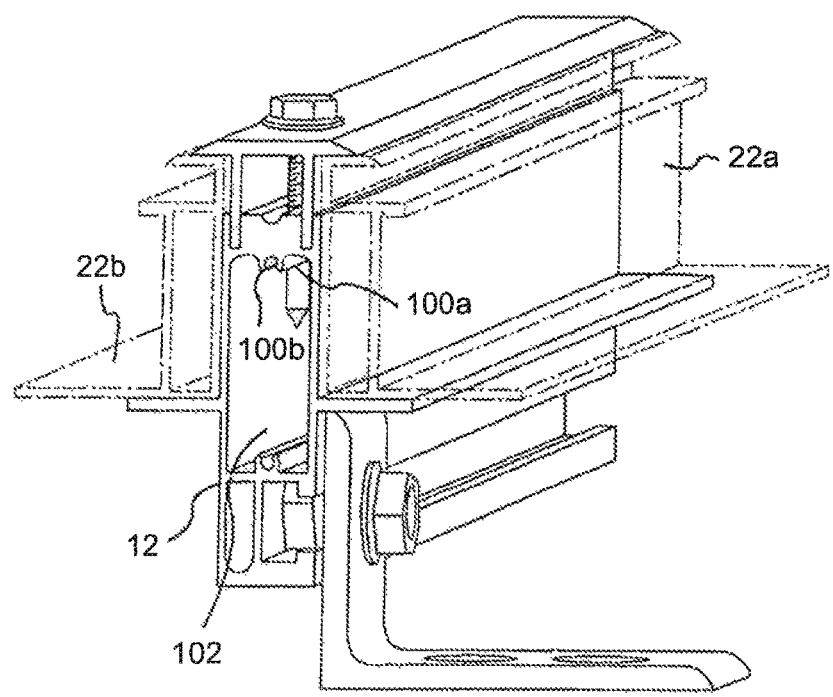
FIG. 33 is a perspective view of a sixth embodiment of the low profile mounting system in an operative environment.
Figure 34:
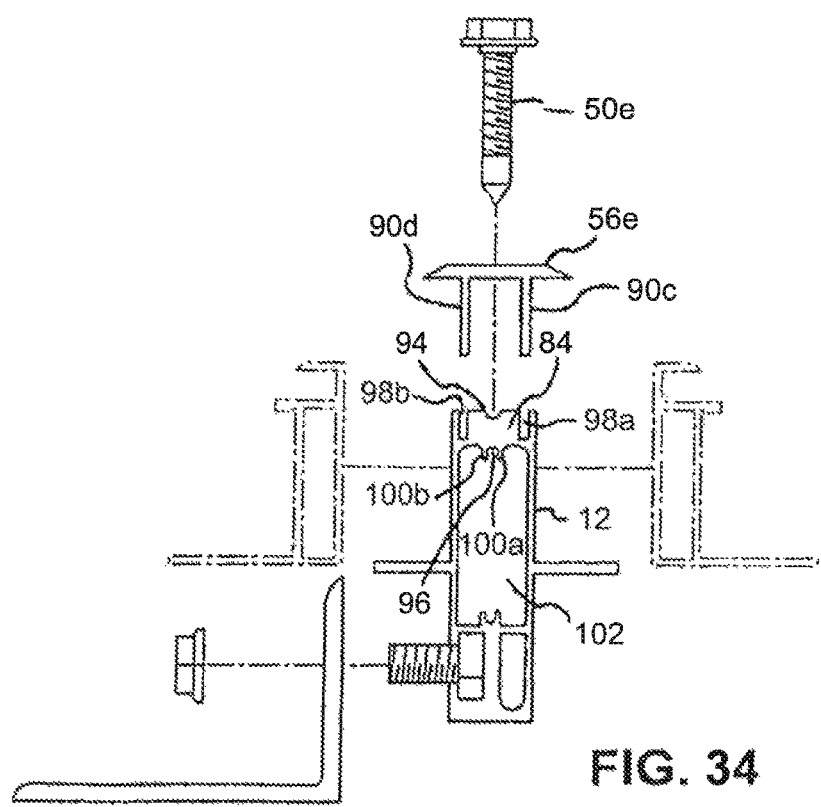
FIG. 34 is an exploded end view of the sixth embodiment of the low profile mounting system.

In the embodiment of low profile mounting system 10 illustrated in FIGS. 33 and 34, longitudinal cavity 82a is shown to be useful as a scribe guide 94 for inserting into rail 12 an attachment device 50 in the form of a screw 50e. As shown, receptor body 84 also includes a groove 96. As also shown, two detents 98a, b are formed in receptor body 84. A variation of clamp 56d, namely 56e, is provided with comparatively longer parallel nubs 90c, d that are insertable into two detents 98a, b in receptor body 84. Receptor body 84 also includes opposing fins 100a, b. Screw 50e is removably insertable through clamp 56e into receptor body 84. Screw 50e extends into the chamber 102 formed in rail 12. Screw 50e is held in place in part by opposing fins 100a, b.

In all embodiments shown in FIGS. 22 through 34, end plates 104, as best shown in FIG. 31, may be placed across low profile mounting system 10 to further add to the aesthetic appearance of an assembled low profile mounting system 10, and to preclude entry of water, wind, and other elements into low profile mounting system 10.

Although FIGS. 22 through 34 shows embodiments of low profile mounting system 10 in which components of low profile mounting system 10 are in certain positions in relationship to one another, the components may be located in any number of other positions. Although the number of alternative attachment devices and connectors are shown, other fasteners may be used. The low profile mounting system shown in drawing FIGS. 22 through 34 includes a number of non-exclusive embodiments that are merely illustrative of the disclosed low profile mounting system 10.

Rail-Less or Non-Rail-Based System Components

Figure 35B:
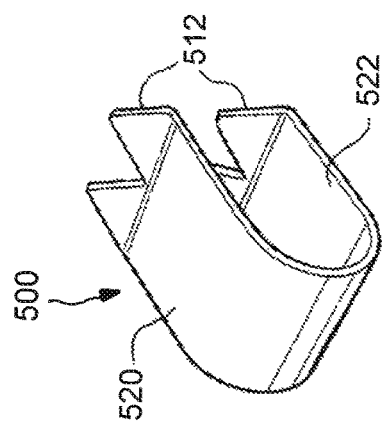
FIG. 35B is a perspective view of a bonding clip in accordance with an embodiment of the present invention.
Figure 35C:
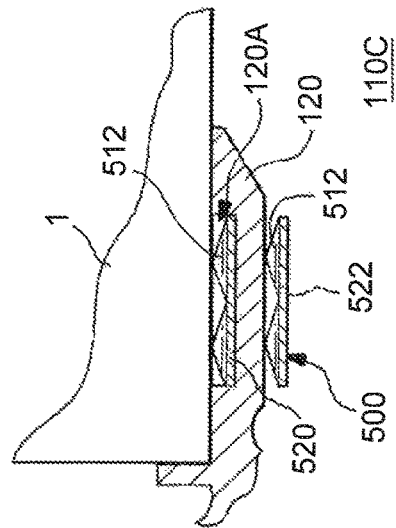
FIG. 35C is a cross-section of the bonding clip of FIG. 35B as positioned with respect to the bracket of the apparatus and a photovoltaic module.
Figure 35A:
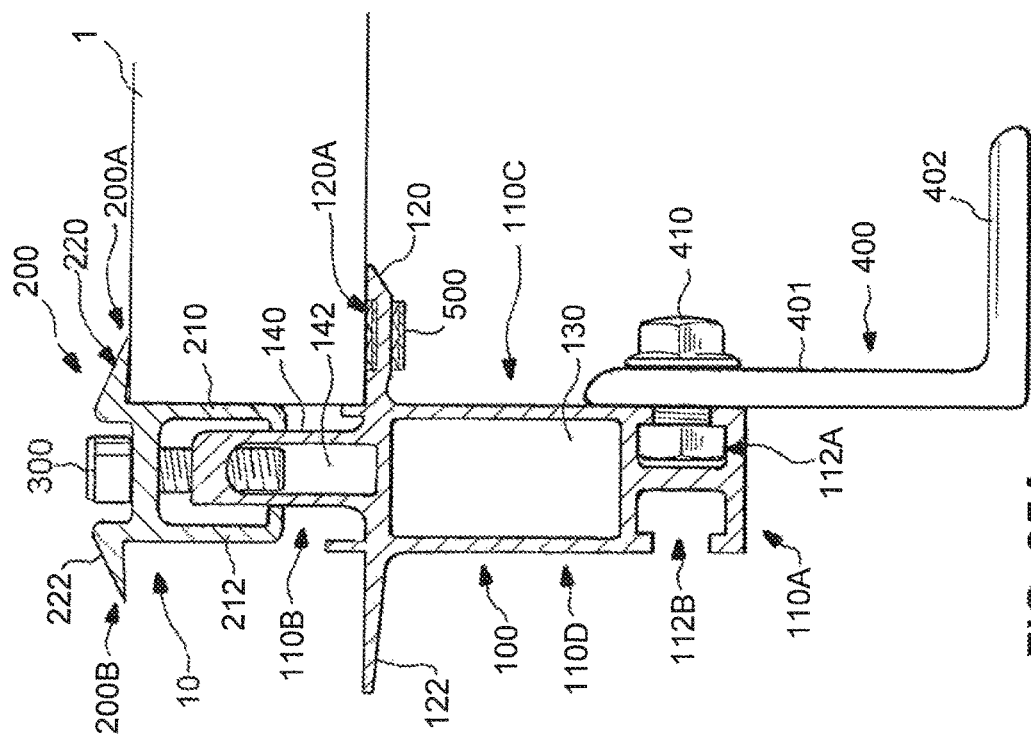
FIG. 35A is a cross-section of an apparatus for mounting photovoltaic modules with a mounted photovoltaic module in accordance with an embodiment of the present invention.

FIG. 35A is a cross-section of an embodiment of a rail-less or a non-rail-based system or apparatus 10 for mounting photovoltaic modules, with a photovoltaic module 1 mounted thereon, in accordance with an embodiment of the rail-less system. This embodiment of a rail-less or non-rail-based system is also disclosed in U.S. patent application Ser. No. 14/515,990, filed on Oct. 16, 2014, the disclosure of which is expressly incorporated by reference herein.

In FIG. 35A, the apparatus 10 includes a bracket 100 (micro-rail), a clamp 200, and a footer 400. An attachment mechanism 300 secures the clamp 200 to the bracket 100.

In FIG. 35A, the bracket 100 defines slots 112A and 112B on opposing sides of the bracket 100 in a lower portion 110A of the bracket 100. Slots 112A and 112B extend along an entire longitudinal length L of the bracket 100, as can be seen at least in FIG. 36.

In FIG. 35A, the bracket 100 includes a first ledge 120 on a first side 110C of the bracket 100 and a second ledge 122 on a second, opposing side 110D of the bracket 100. The opposing sides extend along the longitudinal length of the bracket 100 and between the lower portion 110A and an upper portion 110B of the bracket 100. The bracket 100 defines a cavity 130 between the upper portion 110B of the bracket 100 and the lower portion 110A of the bracket 100 and includes an extension member 140 on the upper portion 110B of the bracket 100. The extension member 140 defines a cavity 142 within the extension member 140.

Figure 36:
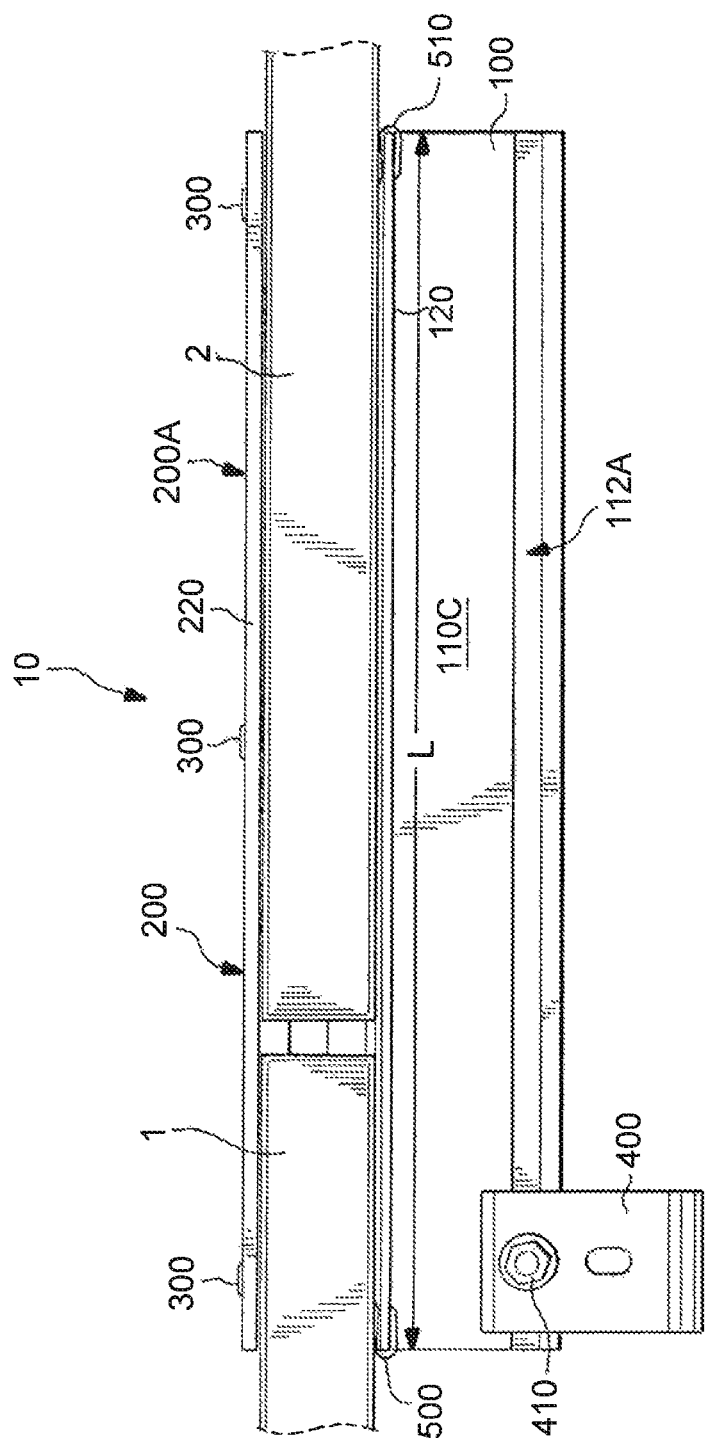
FIG. 36 is a side view of the apparatus for mounting photovoltaic modules of FIG. 35A with two adjacent photovoltaic modules mounted in the apparatus.

In FIG. 35A, as mentioned above, the apparatus 10 also includes a clamp 200 that is securable onto the bracket 100 and on the upper portion 110B of the bracket 100. The clamp 200 includes two opposing legs 210, 212 where the extension member 140 of the bracket 100 is disposed between the two opposing legs 210, 212 of the clamp 200 when the clamp 200 is secured to the bracket 100. A plurality of attachment mechanisms 300, as can be seen in FIG. 36, secure the clamp 200 to the bracket 100 on the upper portion 110B of the bracket 100. The attachment mechanisms may be bolts or screws.

In FIG. 35A, the clamp 200 also includes a first wing 220 on a first side 200A of the clamp 200 and a second wing 222 on a second side 200B of the clamp 200. As will be further discussed below, the wings 220, 222 cooperate with the ledges 120, 122 of the bracket 100, respectively, to secure multiple photovoltaic modules in the apparatus 10. Clamp 200 also extends along the entire longitudinal length L of the bracket 100, as can be seen in FIG. 36, and thus, along the entire longitudinal length of the apparatus 10.

In FIG. 35A, the apparatus 10 also includes a footer 400, as mentioned above. The footer 400 is variably positionable on the bracket 100 along either slot 112A or 112B, as can be further seen in FIGS. 36-42. The footer 400 is generally L-shaped with a first, upright leg 401 and a second, flat leg 402. The upright leg 401 is "upright" in the sense that it extends perpendicularly to the surface on which the footer 400 is mounted. The flat leg 402 is "flat" in the sense that it extends parallel to the surface on which the footer 400 is mounted. The upright leg contains at least one aperture, through which a securement mechanism 410, which may be a bolt and a nut, extends. As shown in FIG. 36, two, or more, apertures may be provided, such that the position of the bracket 100 with respect to the upright leg 401 of the footer 400 may be adjusted by use of the securement mechanism in the different apertures. The shaft of the bolt extends through an aperture of the upright leg 401 and the nut, or other structure, of the securement mechanism 410 is disposed within the slot 112A of bracket 100, or slot 112B if the footer 400 is placed on the opposing side of the bracket 100. As the bolt is threaded down on the nut, the footer 400 is secured at a position on the bracket 100 along the slot 112A. The flat leg 402 of the footer also contains an aperture, and an additional securement mechanism, which may be a lag bolt, extends through the aperture and into a roof structure, e.g., a rafter, to secure the flat leg 402, and thus the footer 400, to the roof structure.

Thus, in FIG. 35A, as discussed above, the footer 400 is variably positionable on the bracket 100 along the slot 112A via the securement mechanism 410 that is disposed through the footer 400 and is received in the slot 112A. By loosening the nut on the bolt, while the nut remains in slot 112A, the footer and securement mechanism may be moved and positioned anywhere along the longitudinal length of the bracket, and then tightened to secure the footer 400 on the bracket 100 at a desired positioned. This provides a benefit since, as will be further discussed later in this specification, the footer is not constrained to a single position on the bracket, but rather, it can be variably positioned on the bracket such that it can be co-located at the position of a roof structure, e.g., a rafter, to which the footer is to be mounted.

In FIG. 35A, further included in apparatus 10 are first bonding clip 500 and second bonding clip 510. First bonding clip 500, and first and second bonding clips 500, 510, can be seen in FIG. 35B and at least in FIG. 36. The first bonding clip 500 and the second bonding clip 510 are both disposed only on the first side 110C of the bracket 100 and are disposed on opposing longitudinal ends of the first ledge 120 of the bracket 100. Bonding clips 500, 510 include similar structure, and as can best be seen in FIGS. 1A and 1B, the first bonding clip 500, and thus second bonding clip 510, includes teeth 512 on an upper side 520 and a lower side 522 of the bonding clips. As can be particularly seen in FIG. 35B, the first bonding clip 500 and the second bonding clip 510 are each formed generally in a U-shape.

As can be seen at least in FIG. 35A and FIG. 35C, the first ledge 120 of the bracket 100 includes a depression 120A on its upper side and a portion of the first bonding clip 500 is disposed in the depression 120A. Similarly, a portion of the second bonding clip 510 is also disposed in the depression 120A at an opposite longitudinal end of the depression 120A. As will be further discussed below, bonding clips 500, 510 electrically bond the photovoltaic modules to the apparatus 10.

Figure 37:
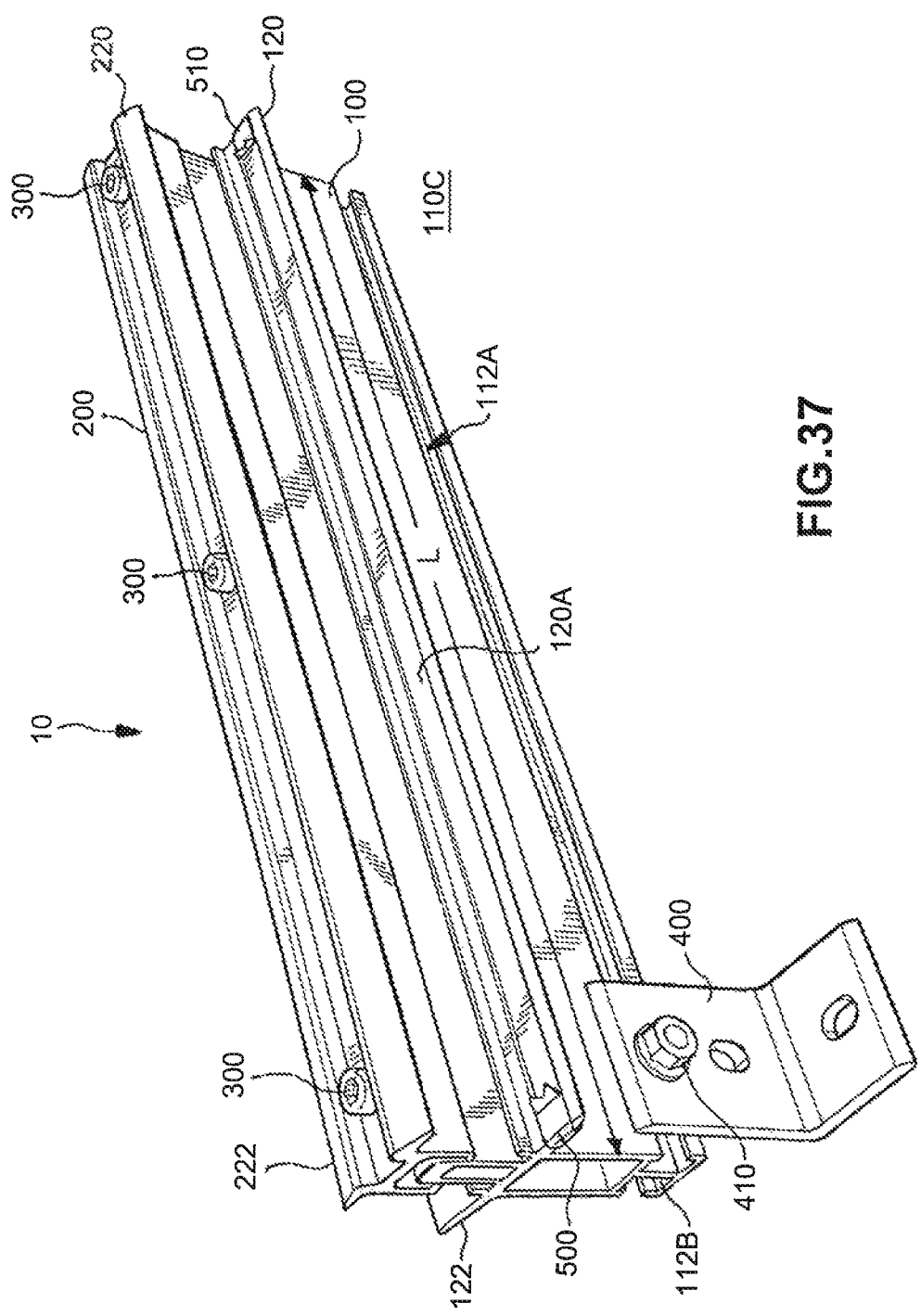
FIG. 37 is a perspective view of the apparatus for mounting photovoltaic modules of FIG. 35A in a first position of the footer with respect to the bracket.

As can be seen at least in FIG. 37, the first ledge 120 of the bracket 100, the second ledge 122 of the bracket 100, the first wing 220 of the clamp 200, and the second wing 222 of the clamp 200 each extend along the entire longitudinal length of the apparatus 10. With this structure of the apparatus 10, as can be seen when considering at least FIG. 35A, FIG. 36, and FIG. 44, a first photovoltaic module 1 and a second photovoltaic module 2 are mountable on the first side 110C of the bracket 100 and the first side 200A of the clamp 200 between the first ledge 120 of the bracket 100 and the first wing 220 of the clamp 200 where the first photovoltaic module 1 is adjacent to the second photovoltaic module 2.

In FIG. 35A, the he securement mechanisms 300 are threaded into respective apertures in clamp 200 and extension member 140 of bracket 100 to lower the clamp 200 with respect to bracket 100, and thus, clamp the photovoltaic modules 1, 2 between the first ledge 120 of bracket 100 and first wing 220 of clamp 200. Securement mechanisms 300 also electrically bond the clamp 200 to the bracket 100.

As can be understood when considering FIG. 36, when the first photovoltaic module 1 and the second photovoltaic module 2 are clamped between the first ledge 120 and first wing 220, the teeth 512 on the upper side 520 of bonding clip 500 engage with the first photovoltaic module 1 and the teeth 512 on the lower side 522 of bonding clip 500 engage with ledge 120. Similarly, the teeth 512 on the upper side 520 of bonding clip 510 engage with the second photovoltaic module 2 and the teeth 512 on the lower side 522 of bonding clip 510 also engages with ledge 120. As such, the photovoltaic modules 1, 2 are electrically bonded to the apparatus 10 through bonding clips 500, 510.

Figure 43:
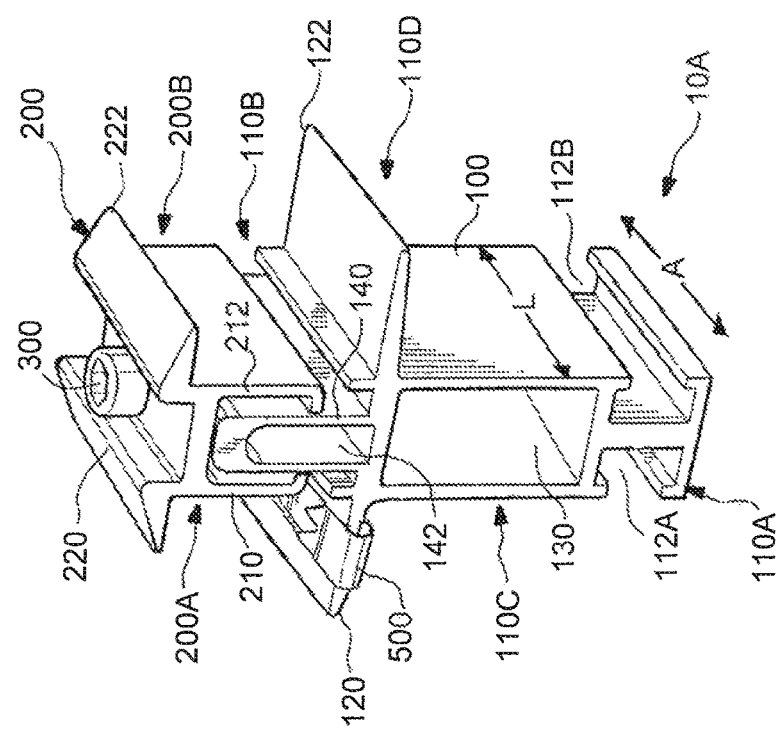
FIG. 43 is a perspective view of a second embodiment of an apparatus for mounting photovoltaic modules in accordance with the principles of the present invention.
Figure 44:
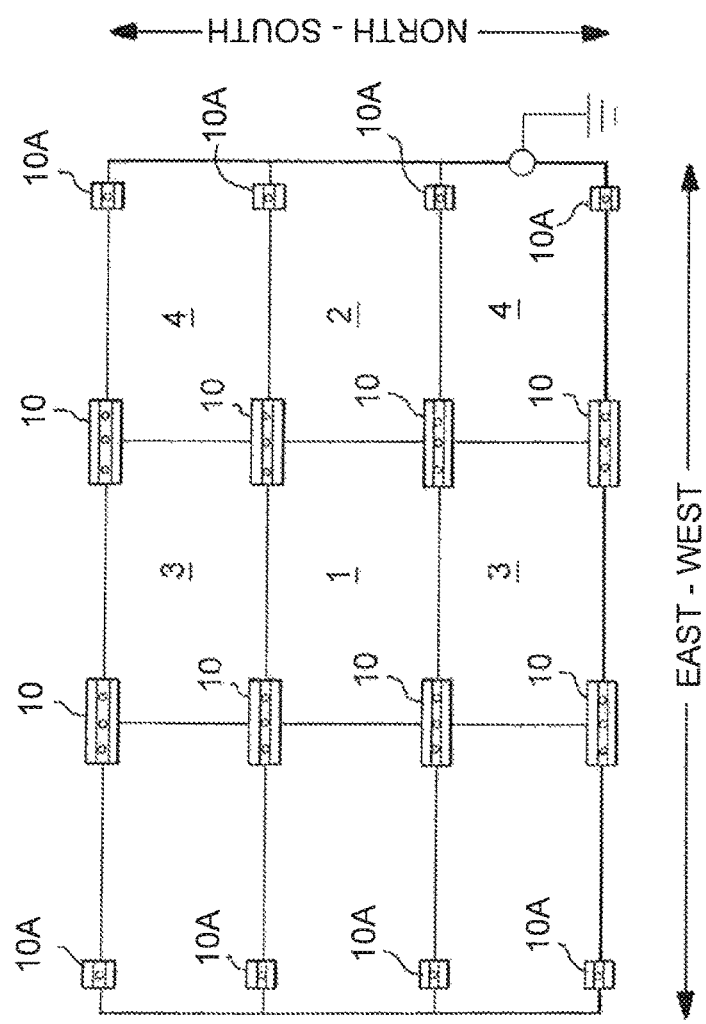
FIG. 44 is a top view of the apparatuses of FIGS. 35A and 43 as used to mount photovoltaic modules.

As can also be understood particularly when considering FIGS. 43 and 44, on the opposing, second side 110D of the bracket 100 and the opposing, second side 200B of the clamp 200, a third photovoltaic module 3 and a fourth photovoltaic module 4 are mountable on the second side 110D of the bracket 100 and the second side 200B of the clamp 200 between the second ledge 122 of the bracket 100 and the second wing 222 of the clamp 200, where the third photovoltaic module 3 is adjacent to the fourth photovoltaic module 4.

As such, the apparatus 10 can be disposed between 3 or 4 photovoltaic modules of an array of photovoltaic modules to mount the 3 or 4 photovoltaic modules to a roof structure. Thus, respective corners of the 3 or 4 photovoltaic modules are secured in the apparatus 10. If the apparatus 10 is used on the edge of the array, only 2 photovoltaic modules are mounted in the apparatus on one side of the apparatus.

FIG. 37 is a perspective view of the apparatus 10 for mounting photovoltaic modules of FIG. 35A in a first position of the footer 400 with respect to the bracket 100. As discussed above, the footer 400 is variably positionable on the bracket 100 along the slot 112A. As shown in FIG. 37, the footer 400 is positioned at the far left side of the bracket 100 along slot 112A in this Figure.

Figure 38:
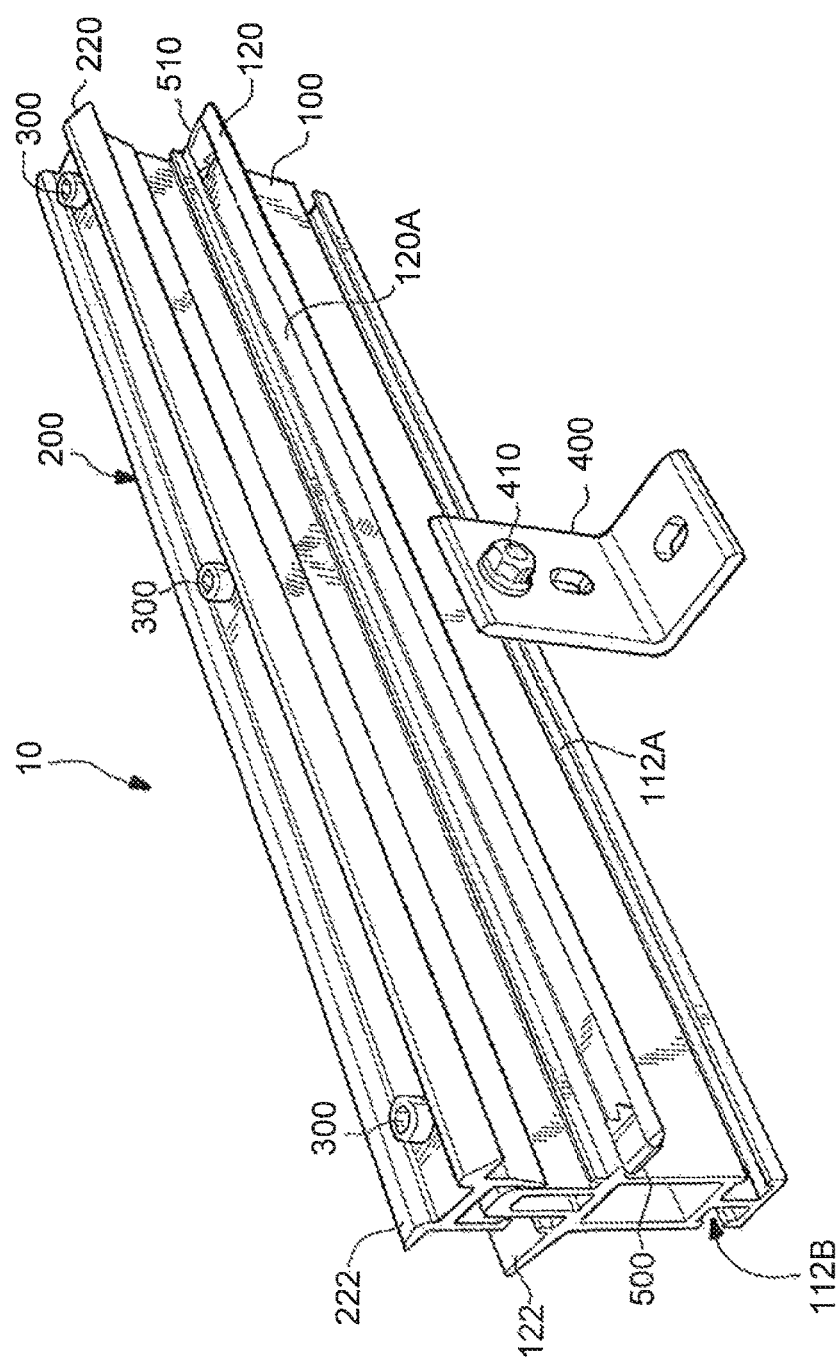
FIG. 38 is a perspective view of the apparatus for mounting photovoltaic modules of FIG. 35A in a second position of the footer with respect to the bracket.
Figure 39:
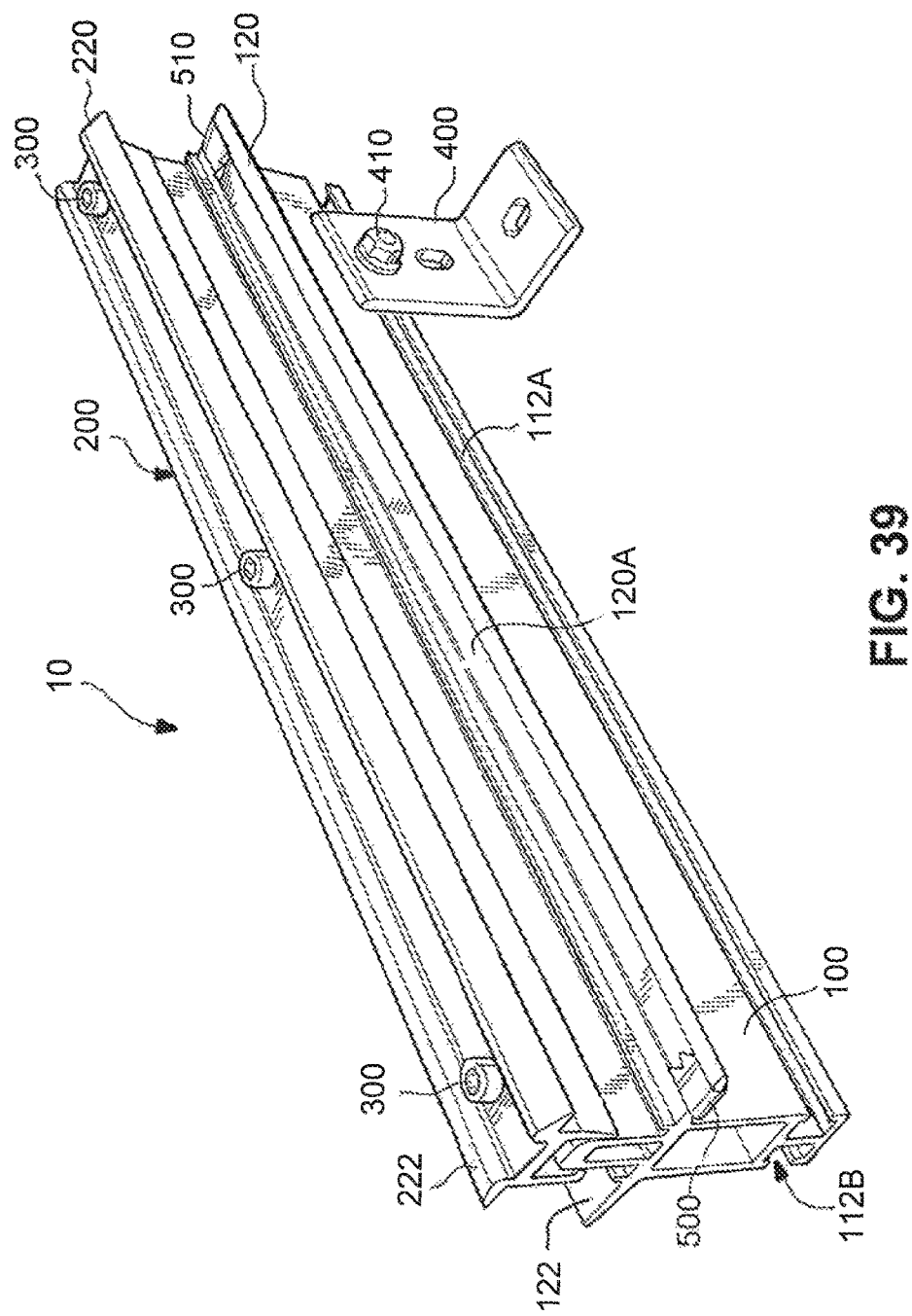
FIG. 39 is a perspective view of the apparatus for mounting photovoltaic modules of FIG. 35A in a third position of the footer with respect to the bracket.

FIGS. 38 and 39 show the footer 400 positioned at other locations on the bracket 100 along the slot 112A. In FIG. 38, the footer 400 is positioned in the middle of the bracket 100 along slot 112A and in FIG. 39 the footer 400 is positioned at the far right side of the bracket 100 along slot 112A. It is only required that one footer be used in the apparatus 10.

Figure 40:
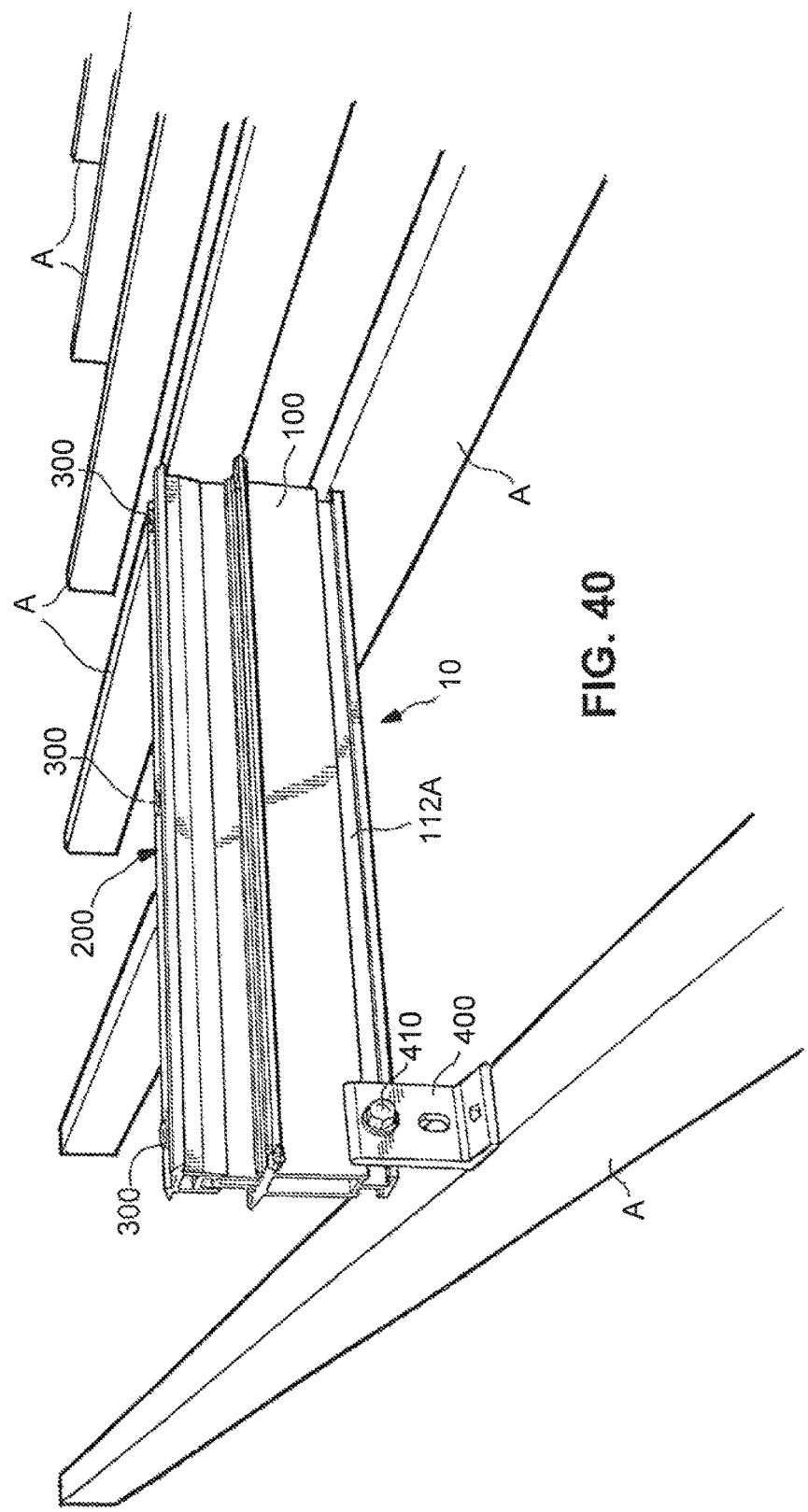
FIG. 40 is a perspective view of the apparatus for mounting photovoltaic modules of FIG. 37 in the first position of the footer with respect to the bracket and the footer attached to a roof support.
Figure 41:
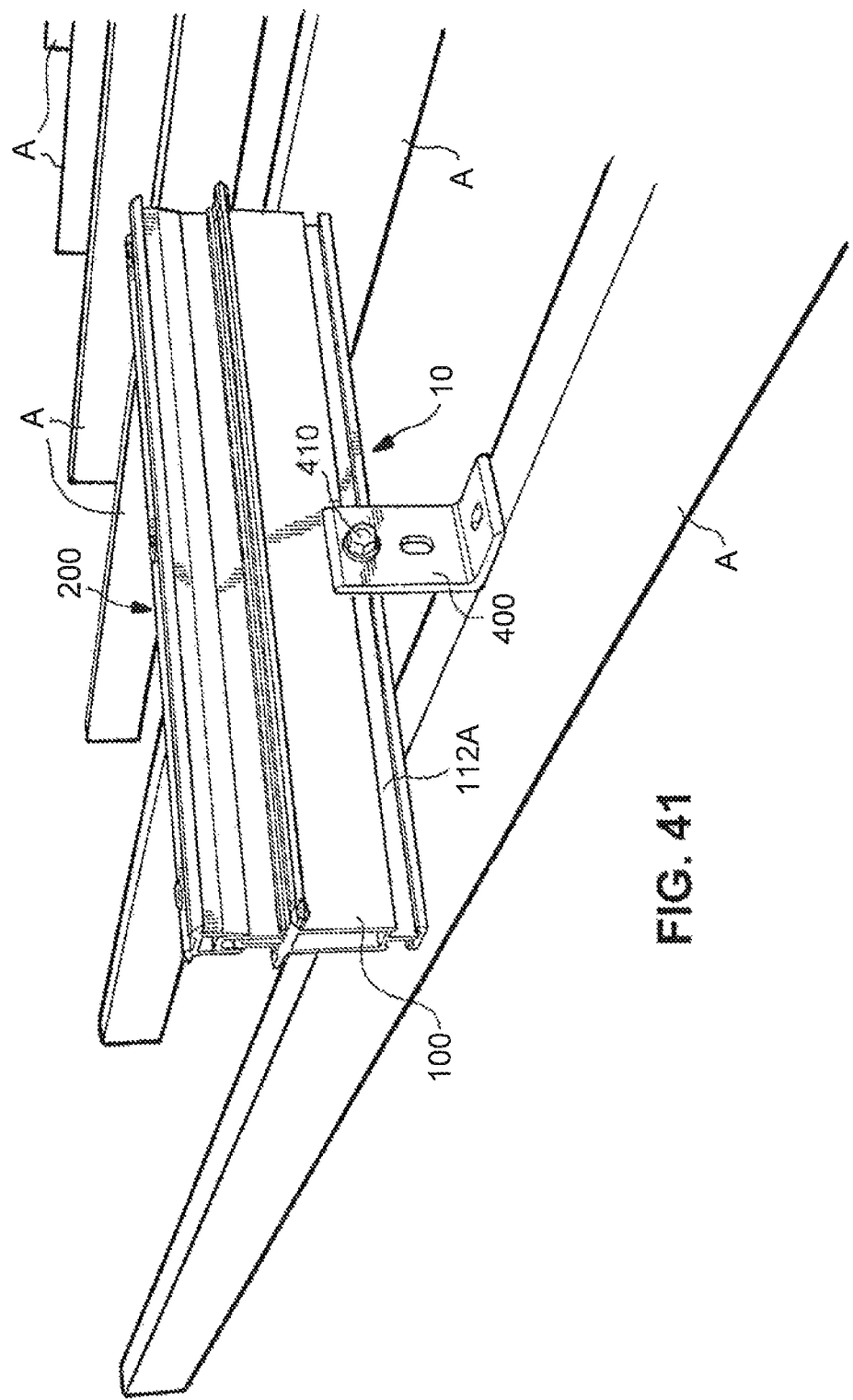
FIG. 41 is a perspective view of the apparatus for mounting photovoltaic modules of FIG. 38 in the second position of the footer with respect to the bracket and the footer attached to a roof support.
Figure 42:
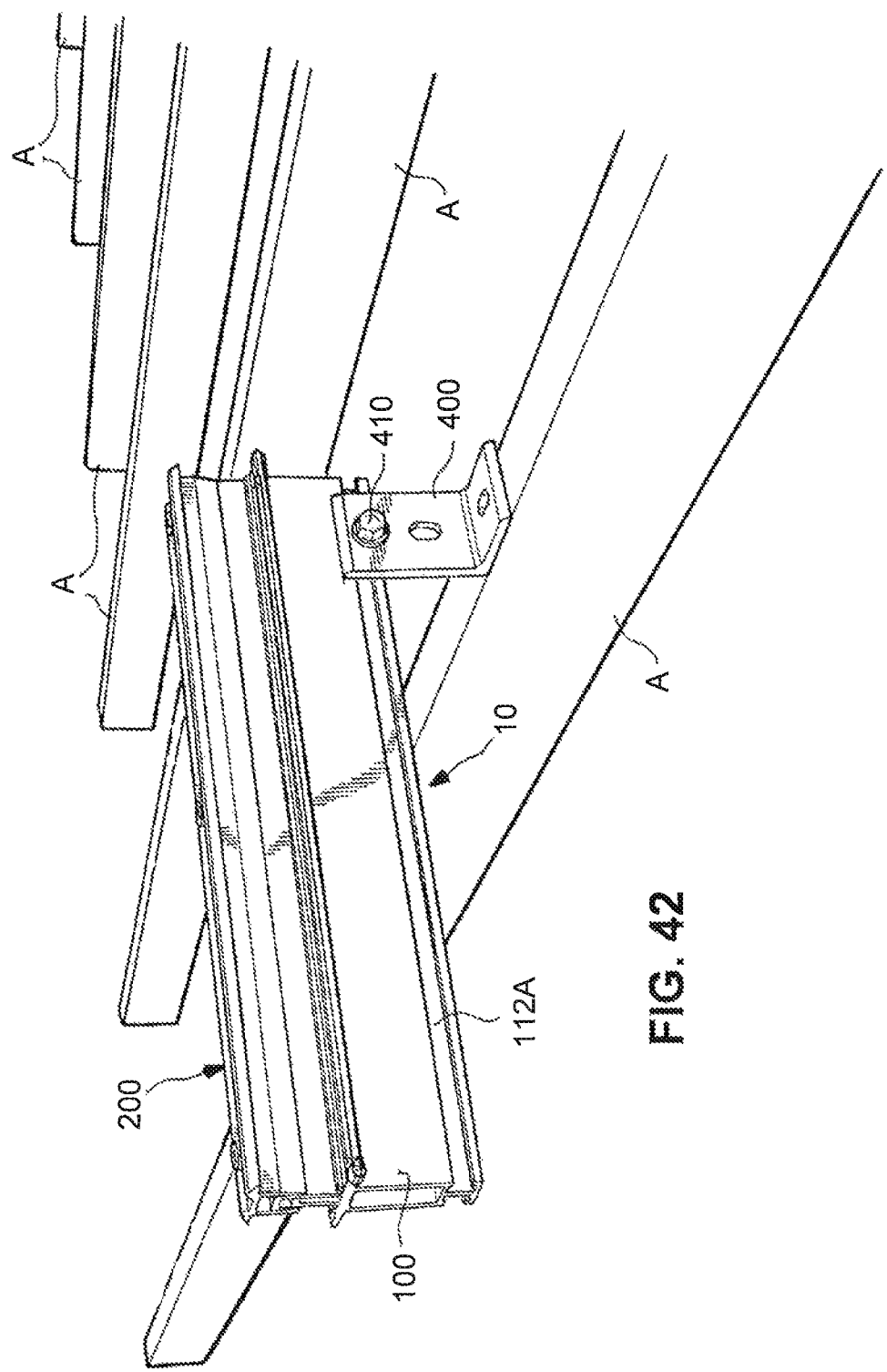
FIG. 42 is a perspective view of the apparatus for mounting photovoltaic modules of FIG. 39 in the third position of the footer with respect to the bracket and the footer attached to a roof support.

FIGS. 40-42 correlate to FIGS. 37-39, respectively, regarding the positioning of the footer 400 with respect to the bracket 100. As can be understood, when the apparatus is used on a roof to mount photovoltaic modules on the roof, the bracket 100 may not always align with a rafter A of the roof at the same position on the bracket 100. Thus, with the present invention, the footer 400 is variably positionable on the bracket 100 such that the position of the footer 400 can be co-located with the position of the rafter A.

FIG. 43 illustrates an alternative embodiment of an apparatus 10A for mounting photovoltaic modules in accordance with the principles of the present invention. The same reference characters are used for the same elements for the embodiments of FIGS. 35A and 43.

As can be seen, the apparatus 10A of FIG. 43 includes the same elements as the apparatus 10 of FIG. 35A. A difference between the embodiments is the longitudinal length A of the apparatus of the two embodiments. In the embodiment of FIG. 43, the longitudinal length A of apparatus 10A is much shorter than the longitudinal length of apparatus 10, thus it can generally be referred to as including a "short micro-rail", which can be about 3" long. This is because, as can be seen in FIG. 44, and as discussed above, apparatus 10 (with a micro-rail) can be used to mount three-four photovoltaic modules in both the East-West (E-W) direction and the North-South (N-S) direction. Apparatus 10A (with a short micro-rail) is only used to mount at-most two photovoltaic modules in the N-S direction at the E-W ends of the photovoltaic array. Thus, the apparatus 10 is longer (e.g., 17.5 inches) than apparatus 10A (e.g., 3 inches) to provide greater support for the mounted photovoltaic modules. Another difference is that apparatus 10A may only include a single bonding clip 500.

As discussed above, in FIG. 43, the apparatus 10A includes the same elements as apparatus 10. Thus, apparatus 10A includes a short bracket 100 (short micro-rail), a clamp 200, and a footer 400 (not shown in FIG. 43). An attachment mechanism 300 secures the clamp 200 to the bracket 100.

In FIG. 43, the bracket 100 defines slots 112A and 112B on opposing sides of the bracket 100 in a lower portion 110A of the bracket 100. Slots 112A and 112B extend along an entire longitudinal length L of the bracket 100.

In FIG. 43, the bracket 100 includes a first ledge 120 on a first side 110C of the bracket 100 and a second ledge 122 on a second, opposing side 110D of the bracket 100. The bracket 100 defines a cavity 130 between the upper portion 110B of the bracket 100 and the lower portion 110A of the bracket 100 and includes an extension member 140 on the upper portion 110B of the bracket 100. The extension member 140 defines a cavity 142 within the extension member 140.

In FIG. 43, the clamp 200 includes two opposing legs 210, 212 where the extension member 140 of the bracket 100 is disposed between the two opposing legs 210, 212 of the clamp 200 when the clamp 200 is secured to the bracket 100. An attachment mechanism 300 secures the clamp 200 to the bracket 100 on the upper portion 110B of the bracket 100.

In FIG. 43, the clamp 200 also includes a first wing 220 on a first side 200A of the clamp 200 and a second wing 222 on a second side 200B of the clamp 200.

As can be further seen in FIG. 44, a plurality of apparatuses 10 and 10A can be used to mount an array of photovoltaic modules.

As can be seen in FIGS. 45-48, the apparatus 10, and 10A, may further include a trim assembly 600. The trim assembly 600 includes trim 610 and a trim mounting bracket 620. The trim mounting bracket 620 is mountable on the bracket 100 and the trim 610 is mountable on the trim mounting bracket 620.

Figure 45:
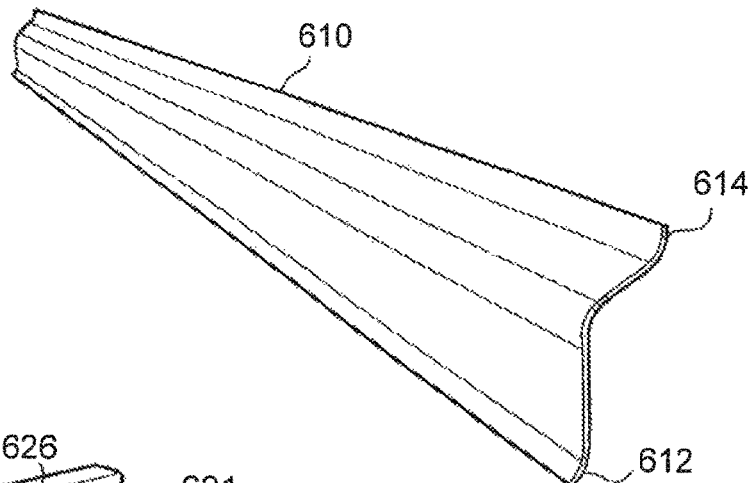
FIG. 45 is a perspective view of a trim in accordance with the principles of the present invention.

As shown in FIG. 45, the trim 610 is an elongated structure with a curved form.

Figure 46:
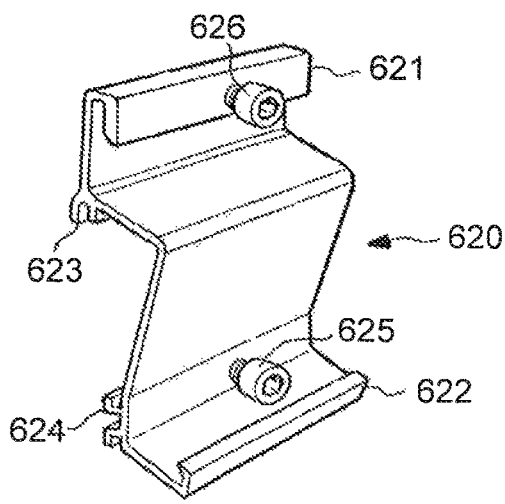
FIG. 46 is a perspective view of a trim mounting bracket in accordance with the principles of the present invention.
Figure 47:
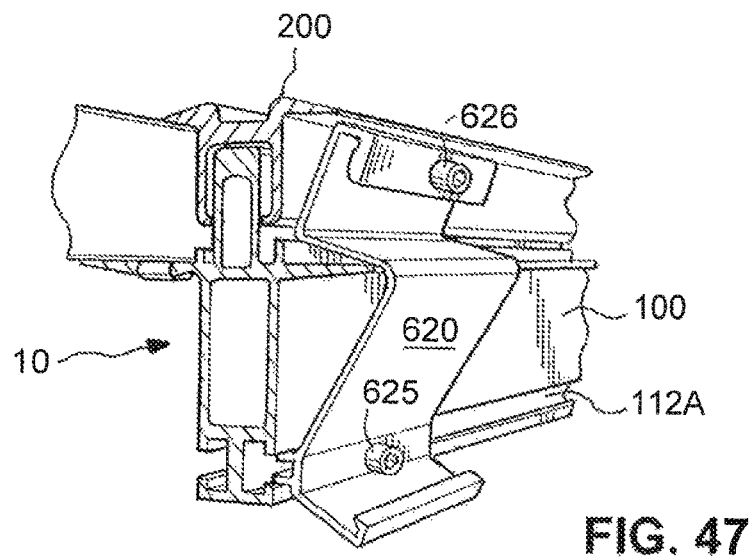
FIG. 47 is a perspective view of the trim mounting bracket of FIG. 46 as secured to the bracket of the mounting apparatus.
Figure 48:
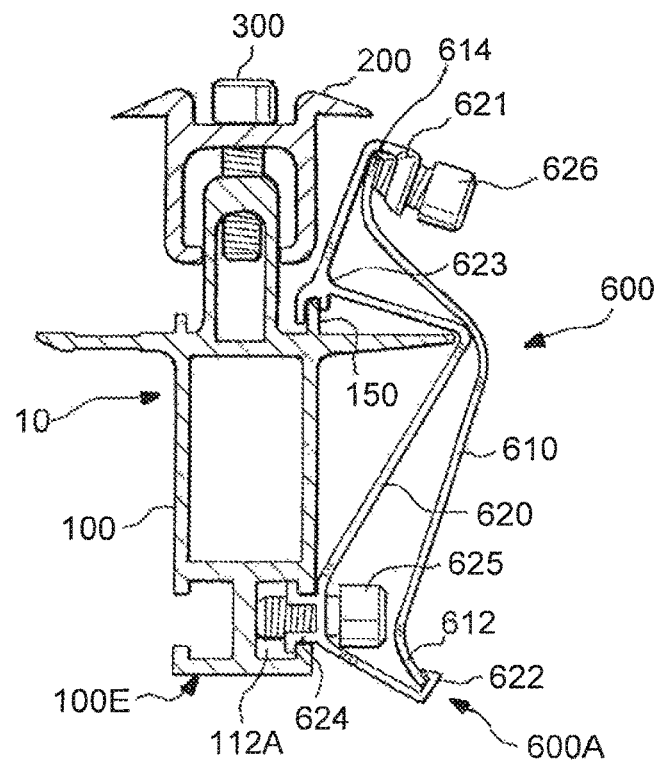
FIG. 48 is a side view of the trim mounting bracket and trim as secured to the bracket of the mounting apparatus.

As shown in FIG. 46, the trim mounting bracket 620 includes two trim mounting structures 621, 622. Both of these mounting structures 621, 622 are generally U-shaped. Trim mounting bracket 620 also includes two bracket mounting structures 623, 624. Mounting structure 623 is generally U-shaped and mounting structure 624 includes two legs that both have an outwardly extending tab on the ends of the legs. As can be seen in FIGS. 47 and 48, trim mounting bracket 620 is mounted on bracket 100 by engaging bracket mounting structure 623 on a ridge 150 of the bracket 100 and by engaging bracket mounting structure 624 in the slot 112A of the bracket 100. The outwardly extending tabs on the ends of the legs of mounting structure 624 engage behind structure of the bracket that defines slot 112A. As such, the trim mounting bracket 620 may be easily positioned at different positions on the bracket 100, i.e., adjusted East-West on the apparatuses, along slot 112A.

In FIG. 48, an attachment device 625, which may be a screw with a pointed end, is disposed through an aperture in trim mounting bracket 620 and within slot 112A to engage with bracket 100 internal to the slot 112A. The screw cuts into the bracket 100 to electrically bond the trim mounting bracket 620 to the bracket 100.

In FIG. 48, the trim 610 is mounted in the trim mounting bracket 620 by placing a lower portion 612 of the trim 610 in the lower trim mounting structure 622 and by placing an upper portion 614 of the trim 610 in the upper trim mounting structure 621. Thus, the trim 610 can be snapped into the trim mounting bracket 620 and no attachment holes are required in the trim 610, thus aesthetically enhancing the trim.

In FIG. 48, an attachment device 626, which may also be a screw with a pointed end, is disposed through an aperture in trim mounting bracket 620 and in engagement with the upper portion 614 of trim 610 that is disposed within trim mounting structure 621. The screw cuts into the trim 610 to electrically bond the trim 610 to the trim mounting bracket 620, and thus the bracket 100.

In FIG. 48, a lowest-most portion 600A of the trim assembly 600 extends below a lowest-most portion 100E of the bracket 100. As such, the trim assembly provides for a fire protection mechanism since the flow of air under the mounting apparatus 10, 10A, and thus under the photovoltaic modules that are mounted on the mounting apparatus 10, 10A, is restricted by the trim assembly 600 which extends below the bracket 100.

In FIGS. 45-48, a longitudinal length of the trim 610 is much longer than the longitudinal length A of the apparatus 10. As such, a single trim 610 can extend across numerous apparatuses 10, 10A, and thus, be mounted across numerous adjacently mounted apparatuses. Further, the position of trim 610 is East-West adjustable in the trim mounting bracket 620 depending upon the area it is to cover and can be cut to size depending upon the area to be covered. Also, due to the curved form of the trim 610, adjacent trims 610 may overlap each other in a nestable/telescoping manner when installed, or during storage and shipping of the trims. The nestable/telescoping feature allows one size trim to fit a variety of photovoltaic module lengths regardless of portrait or landscape module orientation, without the need for cutting the trim to length; only positioning is required.

Further, in FIGS. 45-48, the East-West adjustability of the trim mounting bracket 620 on the apparatuses and the E-W adjustability of the trim 610 within the trim mounting bracket 620 are also benefits. Further yet, the trim 610 helps to provide alignment of a plurality of apparatuses 10, 10A that may be installed in a line, e.g., during installation of a first row of photovoltaic modules in an array.

Figure 49:
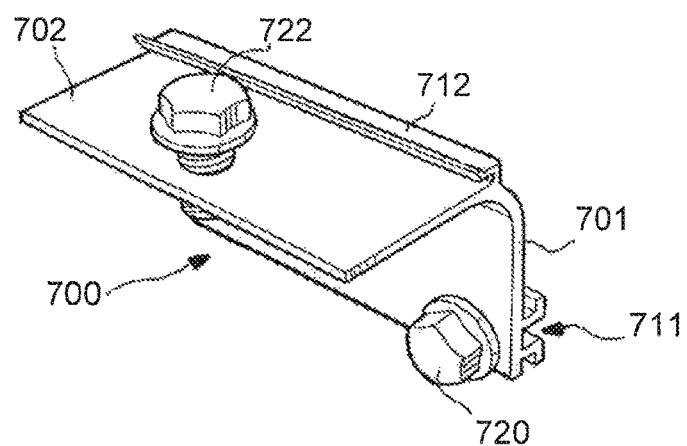
FIG. 49 is a perspective view of a micro-inverter mounting bracket in accordance with the principles of the present invention.
Figure 50:
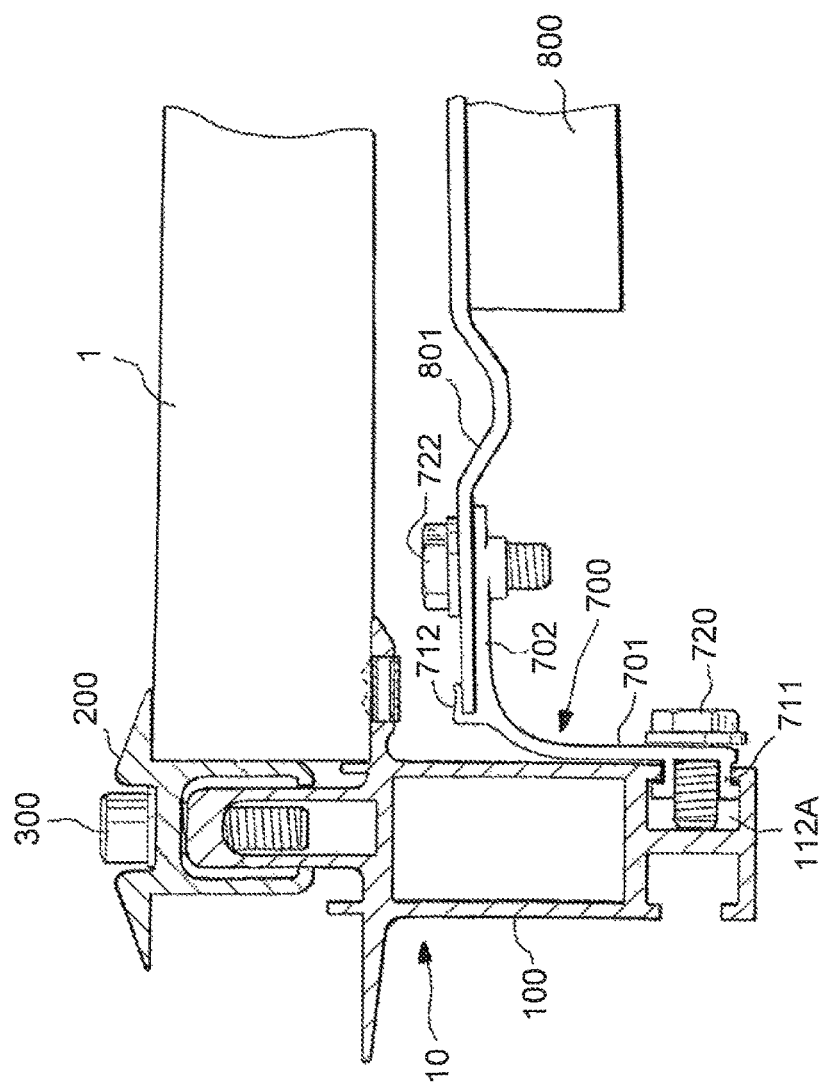
FIG. 50 is a side view of the micro-inverter mounting bracket as secured to the bracket of the mounting apparatus and with a micro-inverter.

Additionally, in FIG. 49, the apparatus 10 may also include a micro-inverter mounting bracket 700, where the micro-inverter mounting bracket 700 is mountable on the bracket 100. As can be seen in FIGS. 49 and 50, the micro-inverter mounting bracket 700 is generally L-shaped with a first, upright leg 701 and a second, flat leg 702. The upright leg 701 is generally perpendicular to the flat leg 702.

In FIG. 49, the micro-inverter mounting bracket 700, like trim mounting bracket 620, is also mountable in the slot 112A of the bracket 100. The upright leg 701 of micro-inverter mounting bracket 700 has a micro-inverter mounting bracket mounting structure 711 at its lower end. This structure 711 is similar to structure 624 of trim mounting bracket 620 for mounting in slot 112A. As such, mounting structure 711 also includes two legs that both have an outwardly extending tab on the ends of the legs.

As can be seen in FIG. 50, micro-inverter mounting bracket 700 is mounted on bracket 100 by engaging micro-inverter mounting bracket mounting structure 711 in the slot 112A of the bracket 100. The outwardly extending tabs on the ends of the legs of mounting structure 711 also engage behind the structure of the bracket that defines slot 112A. As such, the micro-inverter mounting bracket 700, like trim mounting bracket 620, may be easily positioned at different positions on the bracket 100, i.e., adjusted East-West on the apparatus.

In FIG. 49, an attachment device 720, which may be a screw with a pointed end, is disposed through an aperture in leg 701 of micro-inverter mounting bracket 700 and within slot 112A to engage with bracket 100 internal to the slot 112A. The screw cuts into the bracket 100 to electrically bond the micro-inverter mounting bracket 700 to the bracket 100.

In FIG. 49, the flat leg 702 of micro-inverter mounting bracket 700 includes a flange 712 that receives within it an end of a mounting plate 801 that is associated with a micro-inverter 800. When the end of the mounting plate 801 is received within the flange 712, the plate 801 rests on flat leg 702. An attachment device 722, which may be a screw or a bolt, is disposed through respective apertures in flat leg 702 and plate 801 to mount the micro-inverter 800 on the bracket 100, and thus, apparatus 10. This structure also serves to keep the micro-inverter at a proper height location relative to the roof, the apparatus, and the photovoltaic module that the micro-inverter is associated with. The attachment device 722 also electrically bonds the mounting plate 801 of micro-inverter 800 to the micro-inverter mounting bracket 700.

In FIG. 49, also similar to trim mounting bracket 620, micro-inverter mounting bracket 700 is East-West adjustable on bracket 100. Further, the micro-inverter mounting bracket 700 may be installed on either side of mounting bracket 100, i.e., either the North or South side.

Hybrid Solar Panel Mounting Assembly

As discussed above, the present invention provides a hybrid assembly for removably and adjustably mounting solar panels on a surface.

The hybrid assembly consists of components of a "rail-based" system and components of a "rail-less" or "non-rail-based" system. As discussed, utilizing a rail-based system component, e.g., a rail, in the front row of a solar panel array provides a benchmark or baseline to construct the remaining solar array with the modules being in a more stable position and it is easier to align and square the array and the modules.

By using rail-less or non-rail-based system components in the rest of the array, this allows the installer the flexibility to work around obstructions, e.g., vents, skylights, etc., without needing to cut/modify a rail. This also allows for mixing of the orientation of the solar panel modules within a row.

Thus, in the hybrid solar panel mounting assembly of the present invention, a combination of rail-based system components and rail-less system components are used to mount a plurality of solar panels in a solar panel array to a surface.

Figure 51:
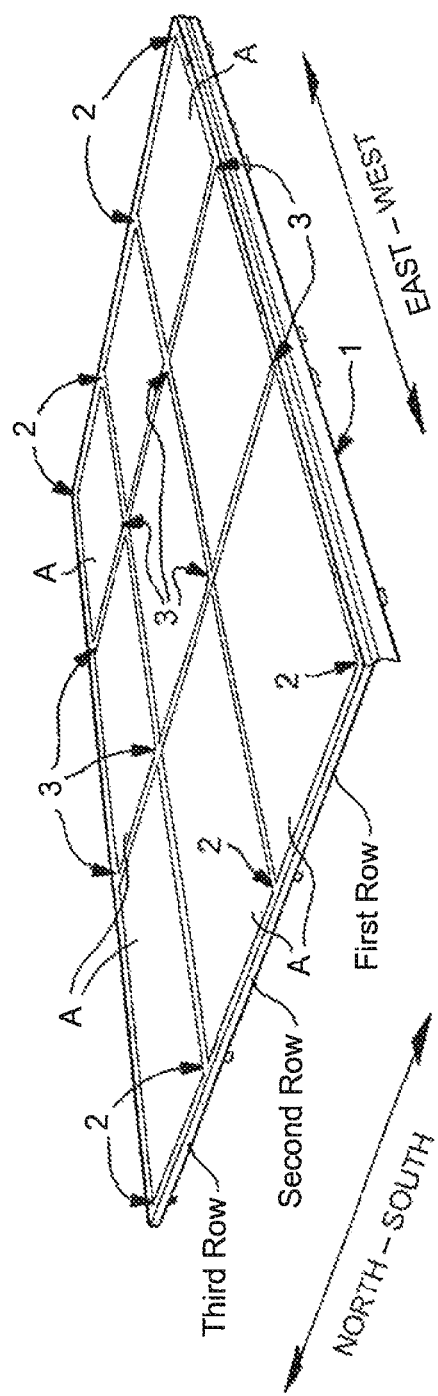
FIG. 51 illustrates a known configuration of a rail-less or non-rail-based system.

FIG. 51 illustrates a known configuration of a rail-less or non-rail-based system. As can be seen, a plurality of photovoltaic modules A are disposed in a solar panel array. A skirt 1 is disposed on the first row of the modules. However, this skirt is not capable of supporting the modules on a surface because the skirt is merely attached only to the modules, and not to the surface. The skirt is used for aesthetic purposes and for providing for a fire protection mechanism by restricting the flow of air under the photovoltaic modules on which the trim is attached.

Further in the known configuration of the rail-less or non-rail-based system of FIG. 51, the system includes short micro-rails 2 (short brackets 100 discussed previously, e.g., in FIG. 43) and micro-rails 3 (brackets 100 also discussed previously, e.g., in FIG. 41), in addition to any other hardware described above for mounting the solar panels to the short micro-rails and micro-rails. As described above, two adjacent solar panel modules are mounted on the short micro-rails 2 and either two or four solar panel modules are mounted on the micro-rails 3. Thus, only rail-less or non-rail-based system components are used in the known configuration of FIG. 51. Because the various rail-less or non-rail-based, and rail-based, system components have been described previously, and since the components are generally fully disposed under the solar panels of the solar panel array, the reference characters and reference lines that are associated with these components point to the locations of these components in the array in the various embodiments.

FIGS. 52-59 disclose various configurations for the components of the hybrid solar panel mounting assembly of the present invention.

Figure 52:
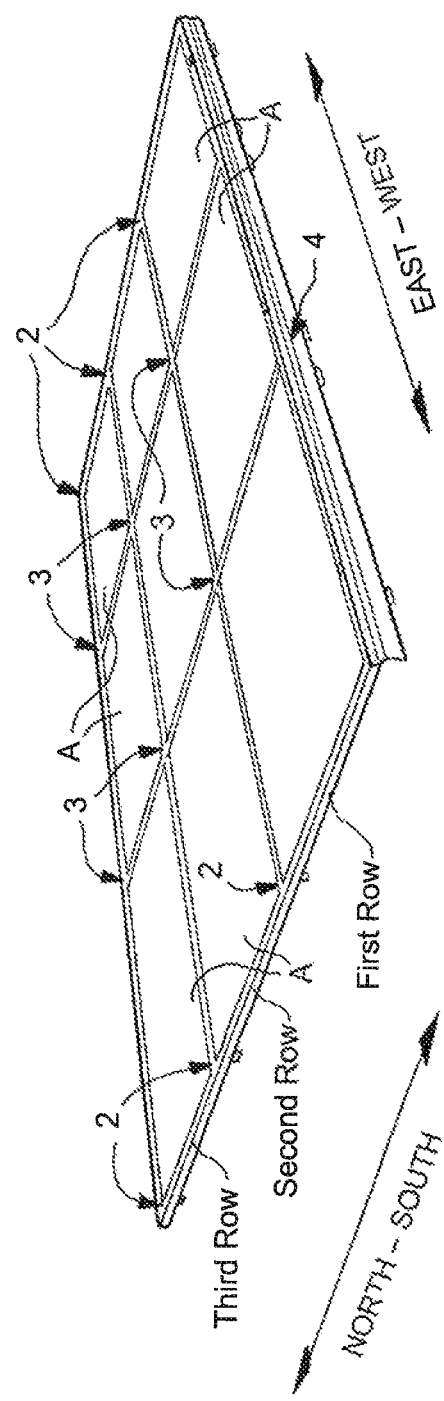
FIGS. 52-59 disclose various configurations for the components of the hybrid solar panel mounting assembly of the present invention.

As shown in FIG. 52, the hybrid mounting assembly also includes short micro-rails 2 and micro-rails 3. Two adjacent solar panel modules are mounted on the short micro-rails 2 and either two or four solar panel modules are mounted on the micro-rails 3. However, the hybrid mounting assembly of the present invention also includes components of a rail-based system. In this embodiment, the component of the rail-based system is the trim-rail 100 described earlier in this specification in FIG. 1, and represented in FIG. 52 by reference character 4. As such, the trim-rail 4 is used as the front-most rail in the hybrid solar panel mounting assembly of FIG. 52, and thus, on the first row of solar panels in the array to mount the first row of solar panels. As such, trim-rail 4 provides a benchmark or baseline to construct the remaining solar array with the modules A being in a more stable position and it is easier to align and square the array and the modules. Use of the trim-rail 4 in the hybrid mounting assembly also provides the other benefits discussed previously in this patent application.

In the context of the present invention, a rail, as defined above, is a component of a rail-based system. A micro-rail and a short micro-rail, as also defined above, are not components of a rail-based system since they are not rails. As such, the micro-rail and the short micro-rail, even though they contain the word "rail" in the names given in this specification for these components of a rail-less or non-rail-based system, are not components of a rail-based system, but rather, are components of a rail-less or non-rail-based system.

Figure 53:
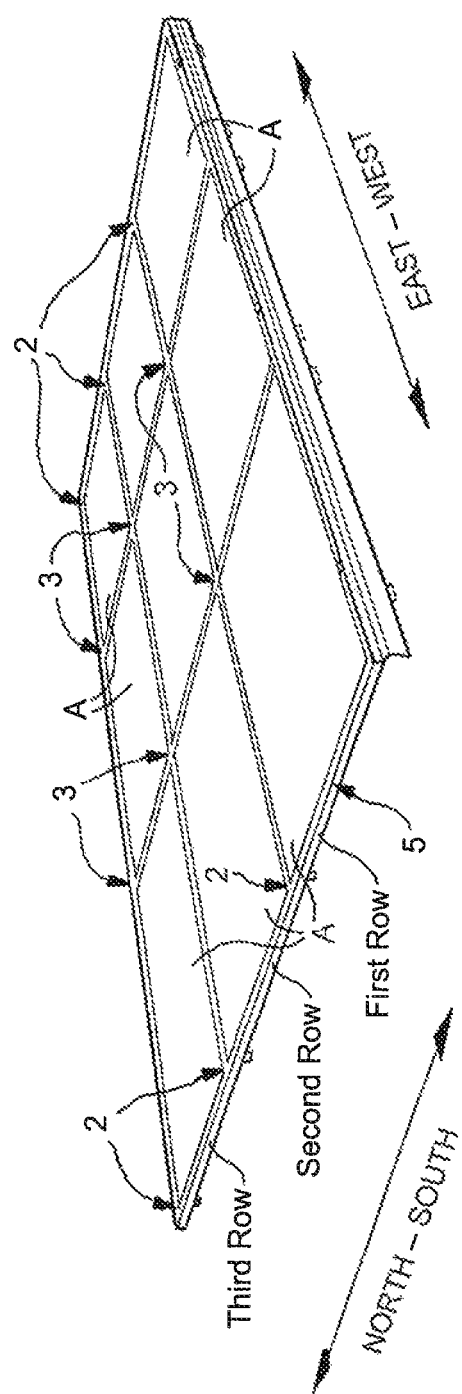

As shown in FIG. 53, the hybrid mounting assembly also includes short micro-rails 2 and micro-rails 3, as used in the embodiment of FIG. 52. However, the hybrid mounting assembly of this embodiment also includes a rail 5 of a rail-based system, in addition to any other hardware described above for mounting the solar panels to the rail, as described in embodiments earlier in this specification, or which can be embodied as other embodiments of a rail. The rail 5 is only used to mount solar panels A that are disposed on one side of the rail 5. Rail 5 extends the entire width of the solar panel array, encompassing three solar panels in this embodiment, and thus, three rows of solar panels, and is disposed on a North-South extending edge of the array. A trim on the front of the array is optional.

Figure 54:
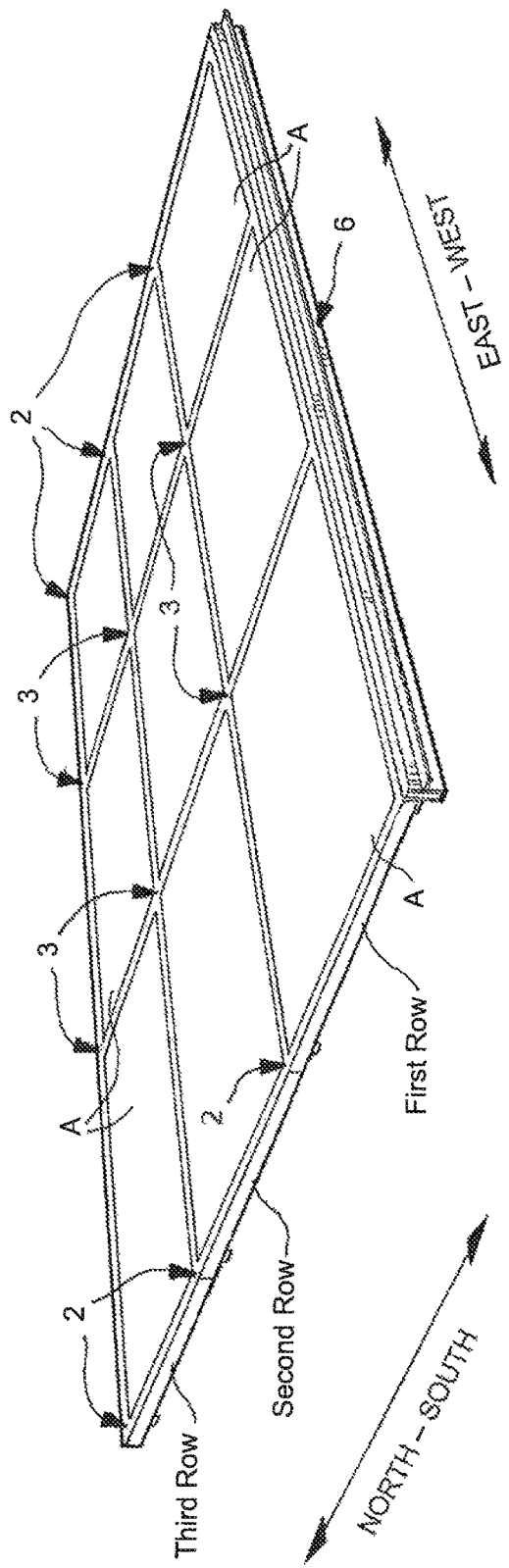

The embodiment of FIG. 54 uses a shared rail 6 on the first row of solar panels and also includes short micro-rails 2 and micro-rails 3, as shown.

Figure 55:
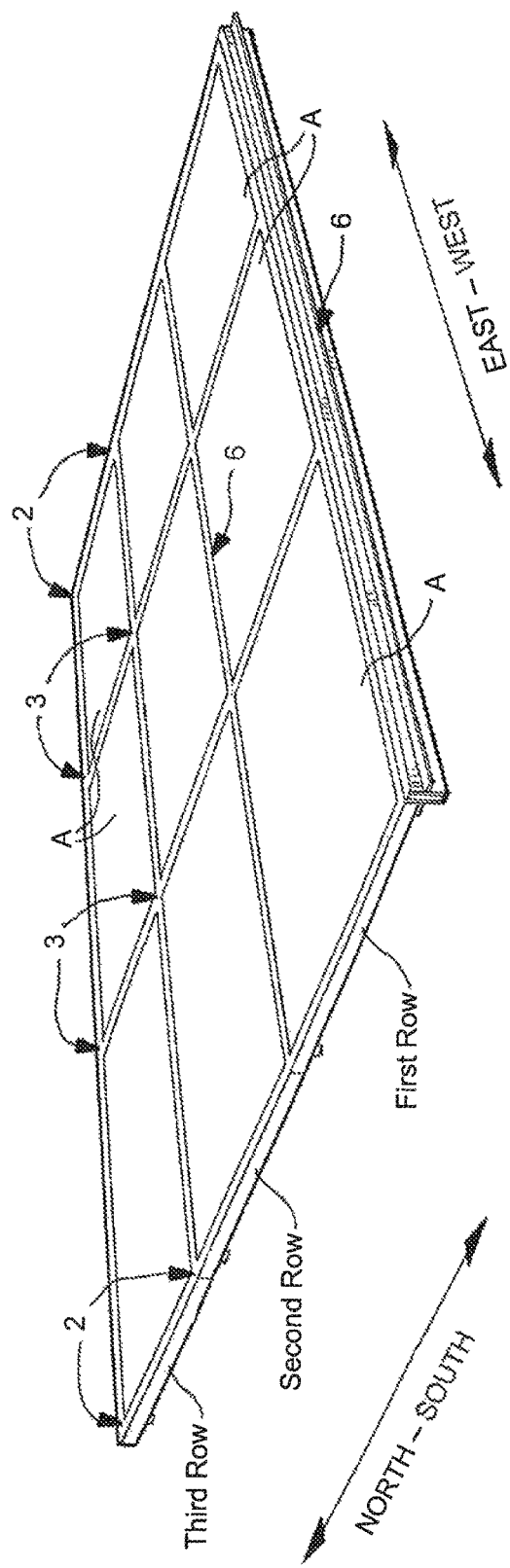

The embodiment of FIG. 55 uses two shared rails 6 on the first two rows of solar panels and also includes short micro-rails 2 and micro-rails 3. Thus, the adjacent solar panels of the first two rows are mounted on the second rail 5.

Figure 56:
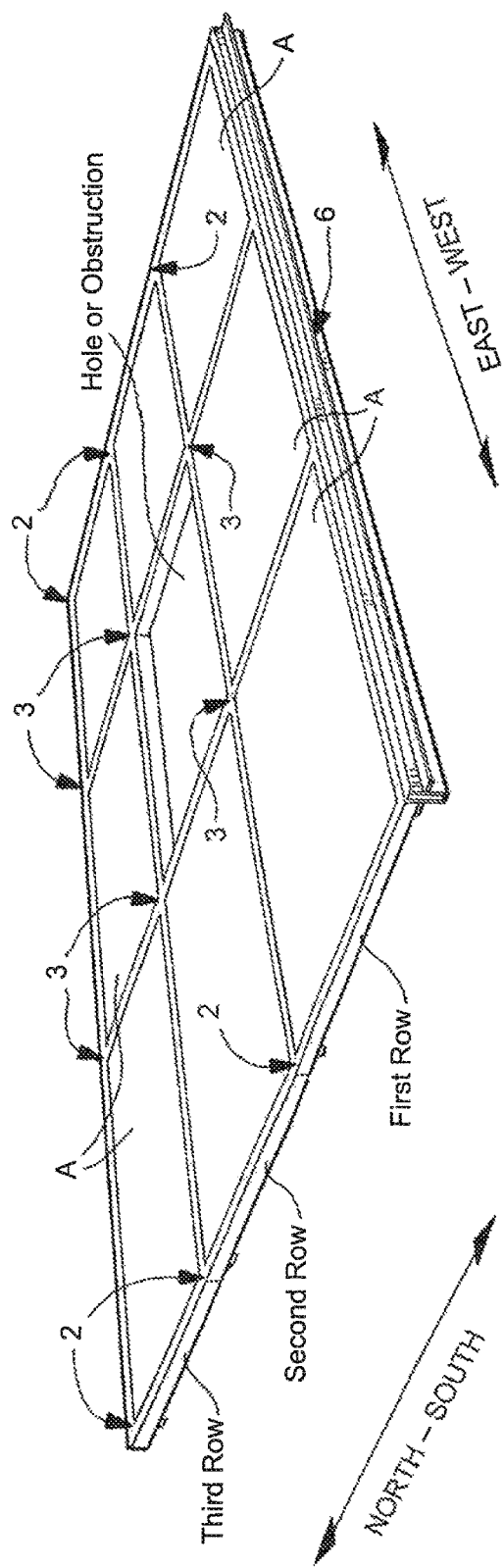

The embodiment of FIG. 56 uses a shared rail 6 on the first row of solar panels and also includes short micro-rails 2 and micro-rails 3 at the corners of a hole or obstruction in the solar panel array. Thus, here, the use of the micro-rails 3 allows the installer the flexibility to work around the hole or obstruction without needing to cut/modify any rails. However, the rail is still used in the assembly, as discussed above.

Figure 57:
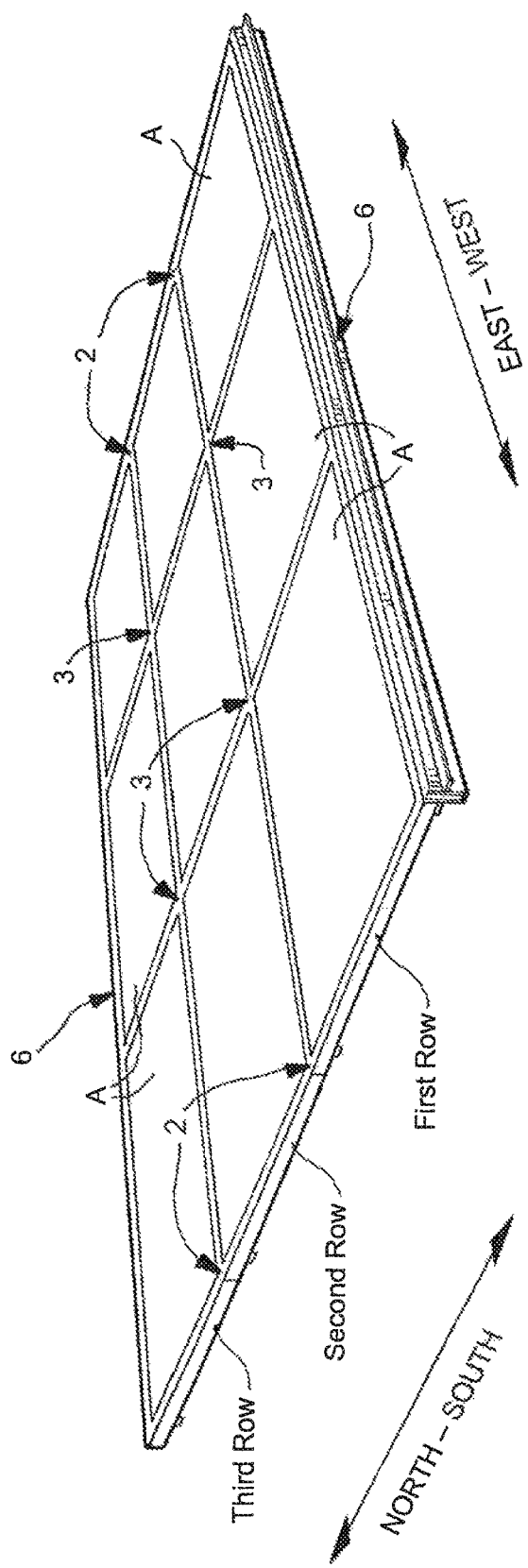

The embodiment of FIG. 57 uses shared rails 6 on the front edge of the first row of solar panels and on the back edge of the last row (at the North end) of solar panels. A trim-rail is used on the front edge of the first row of solar panels. The rails again extend across the three solar panels of the respective row. The assembly also includes short micro-rails 2 and micro-rails 3.

Figure 58:
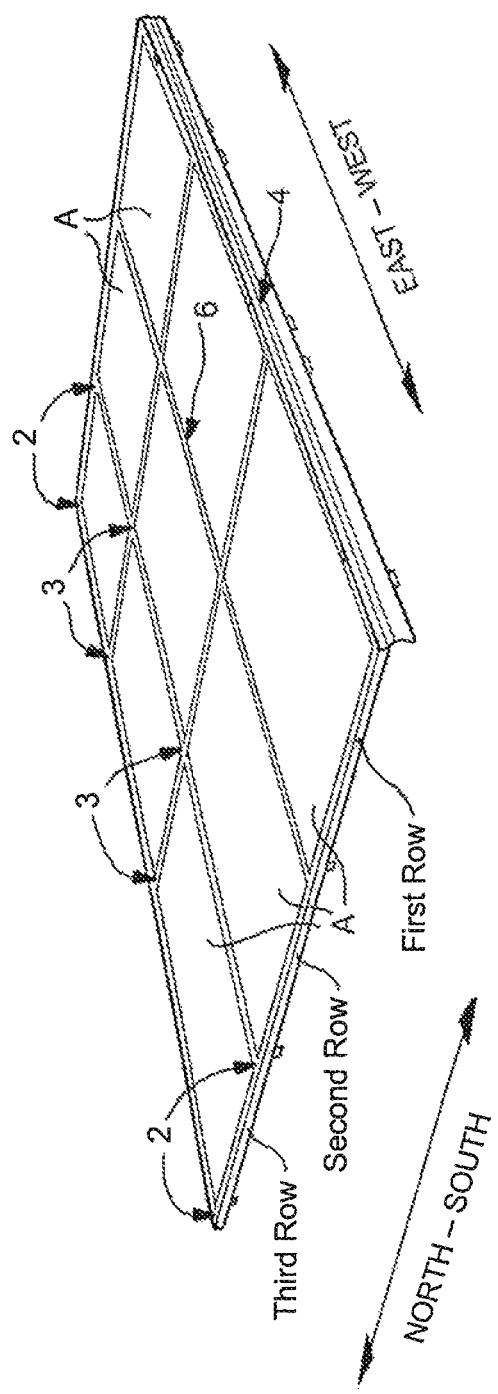

The embodiment of FIG. 58 uses a shared rail 6 between the first two rows of solar panels and uses a trim-rail 4 on the front edge of the first row of solar panels. Thus, the adjacent solar panels of the first two rows are mounted on the rail 5. Short micro-rails 2 and micro-rails 3 are also used.

Figure 59:
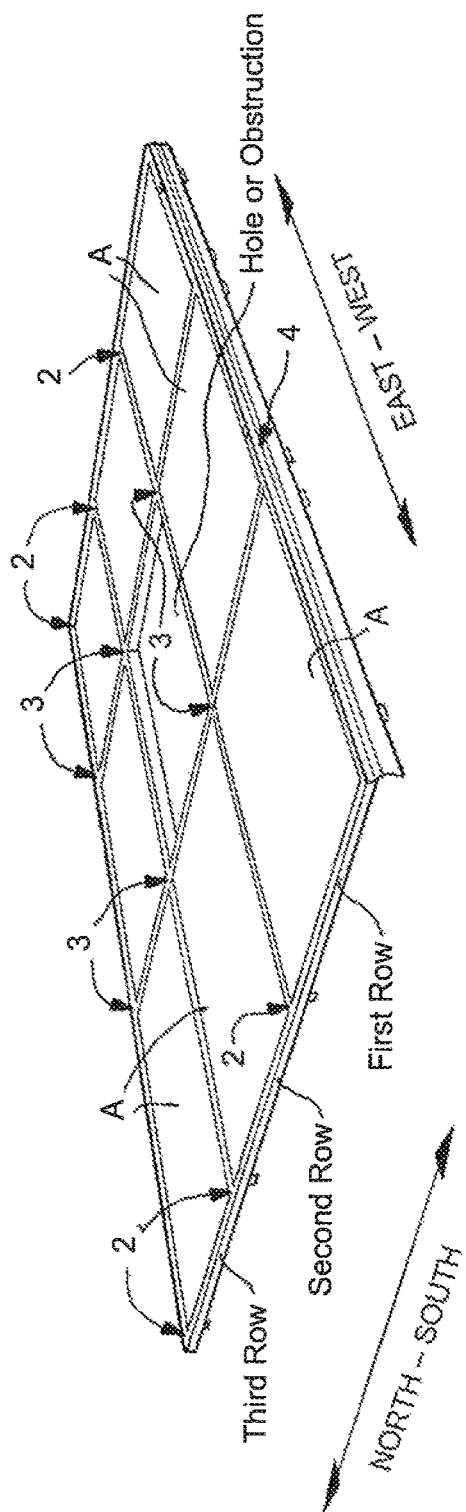

The embodiment of FIG. 59 uses a trim-rail 4 on the first row of solar panels and also includes short micro-rails 2 and micro-rails 3 at the corners of a hole or obstruction in the solar panel array.

Of course, other embodiments of combinations of components of a rail-based mounting system and a rail-less mounting system can be contemplated within the scope of the present invention.

Additional Rail-Less or Non-Rail-Based System Components

Figure 60:
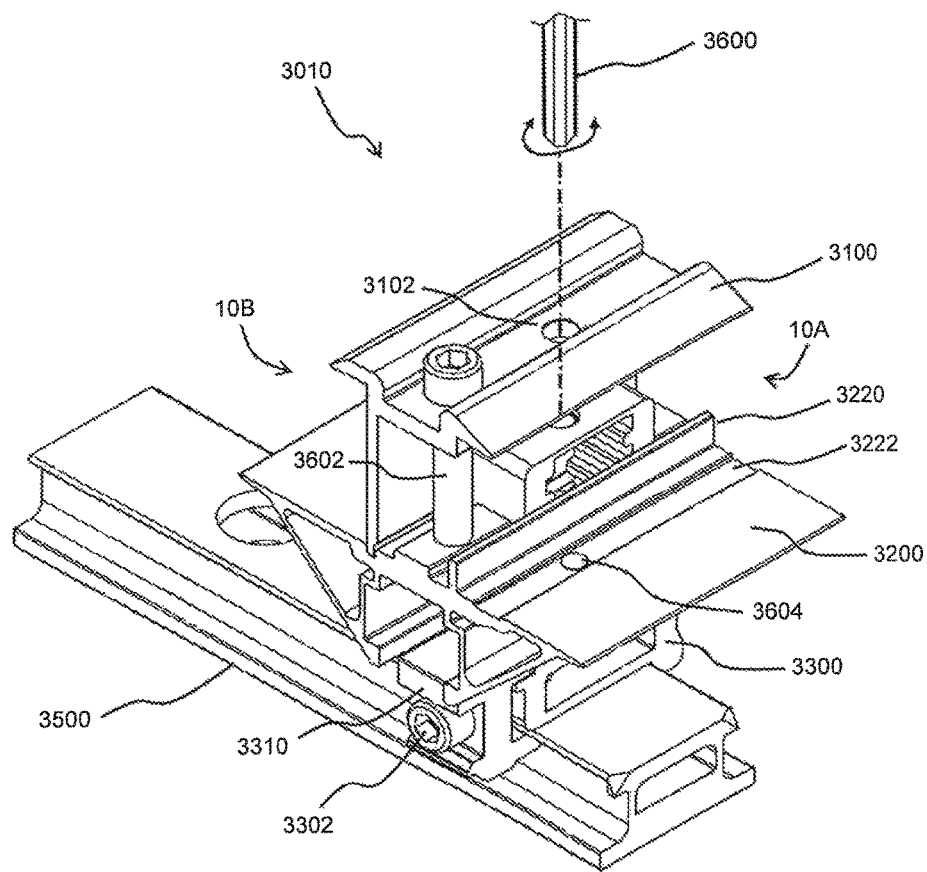
FIGS. 60-61 are perspective views of an embodiment of a height adjustable solar panel mounting assembly in accordance with the principles of the present invention.
Figure 61:
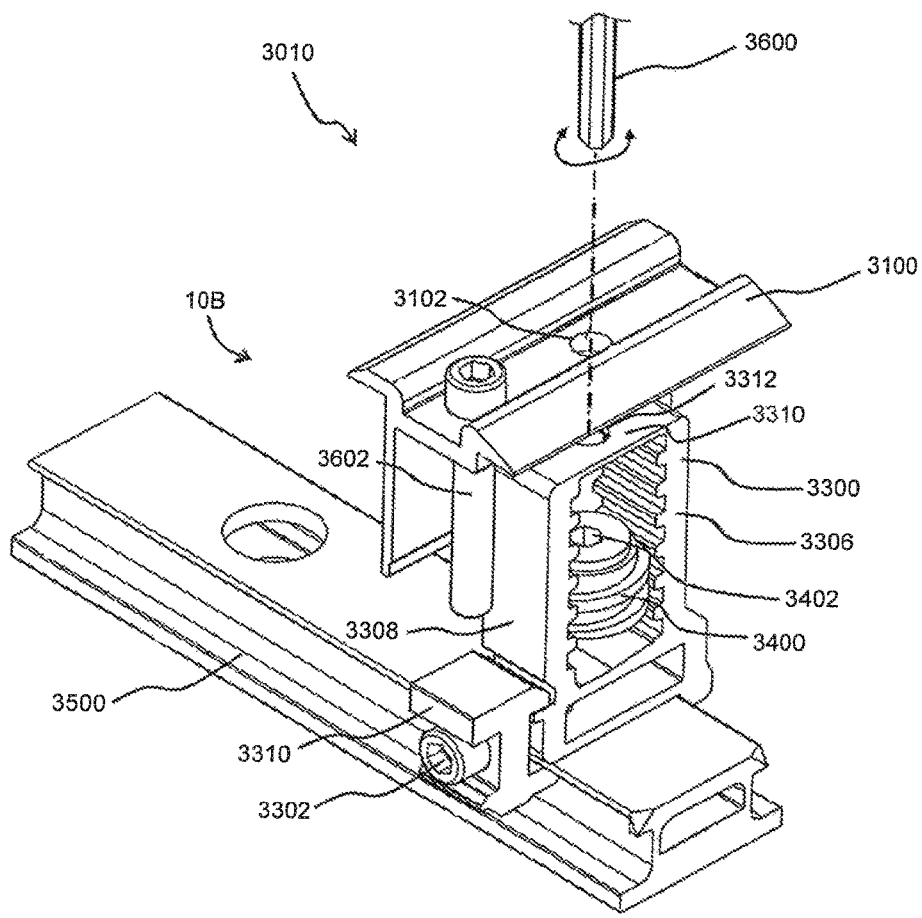
Figure 62:
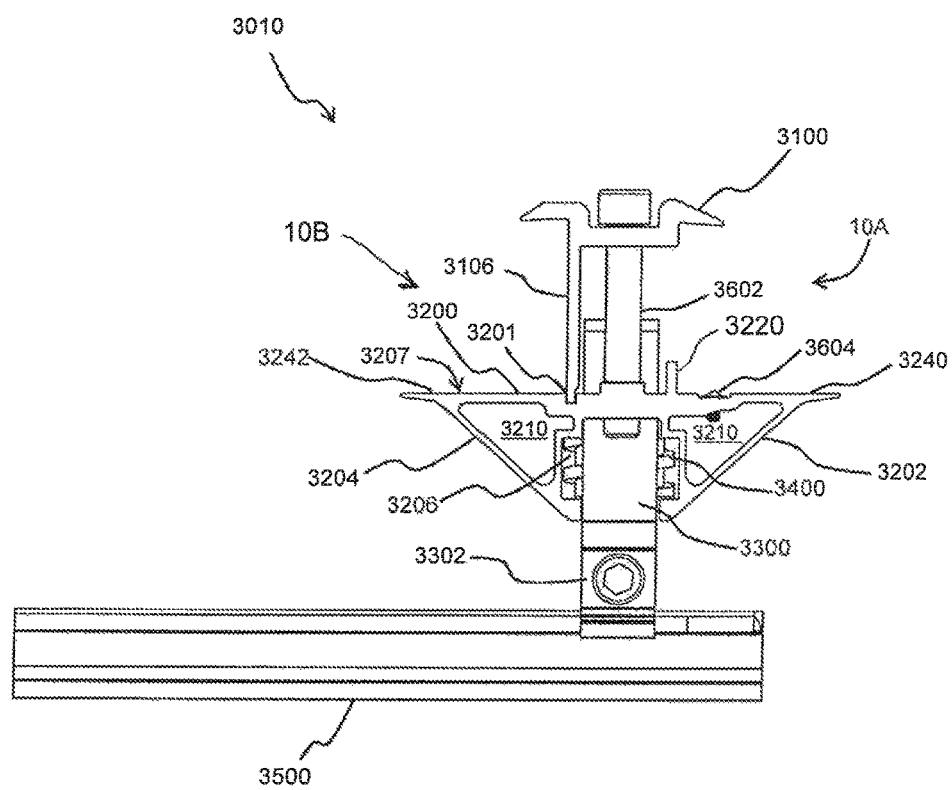
FIG. 62 is a side view of the assembly of FIGS. 60-61.

FIGS. 60-62 illustrate an embodiment of a height adjustable solar panel mounting assembly in accordance with the principles of the present invention. This height adjustable mounting assembly can be used as a micro-rail 3 and a short micro-rail 2, i.e., brackets, of the present invention. As can be seen, the assembly 3010 includes an upper bracket 3100, a lower bracket 3200 (which together form a mounting bracket for mounting solar panels), a stanchion 3300, a helical drive 3400, and a base (track) 3500. First clamping bolt 3602 clamps the upper bracket 3100 down to lower bracket 3200 when one or more solar panels are installed in slots 10A, 10B. Second clamping bolt 3302 provides a clamping force to secure an "I"-shaped side clamp 3310 to a bottom portion of stanchion 3300, i.e., when stanchion 3300 is secured onto base 3500. Stop bar 3220 runs sideways across the width of lower bracket 3200 and serves as a stop to abut against, and align, the solar panel(s) when installed in slot 10A. Stop bar 3220 also prevents the solar panel(s) from touching the upper portion of stanchion 3300. Bonding pin 3604 is disposed in a hole located in recessed channel 3222 in lower bracket 3200. Bonding pin 3604 serves to pierce the anodized aluminum coating on the solar panel and electrically interconnect (ground) the solar panel to the lower bracket 3200 of assembly 3010.

In FIG. 61, the lower bracket 3200 has been removed from the view to more clearly illustrate helical drive 3400 disposed within stanchion 3300. Stanchion 3300 includes two vertical arms: first arm 3306 and second arm 3308. Disposed across the tops of arms 3306 and 3308 is an integral bridge segment 3310 which connects across the two tops. Second aperture 3312, located below a clamping wing of upper bracket 3100 and having a centerline that is co-linear with first aperture 3102, is disposed within bridge 3310 and provides vertical access for tool 3600, e.g., an Allen wrench, to engage with a patterned, e.g., hexagonal, aperture 3402 in helical drive 3400.

FIG. 62 is a side view of the embodiment of the height adjustable solar panel mounting assembly 3010 shown in FIGS. 60-61. Upper bracket 3100 includes a vertical wall 3106 that has a lower end that engages with a slot 3201 that is disposed within, and lays across the width of, lower bracket 3200. Lower bracket 3200 includes an integral pair of symmetric stiffening ribs 3202, 3204 disposed underneath the mounting plane 3207 of lower bracket 3200, which serve to respectively stiffen the distal extents, i.e., wings 3240, 3242, of lower bracket 3200. Hollow space 3210 is disposed (on both sides) in-between stiffening rib 3202, 3204 and the horizontal plane (mounting plane 3207) of lower bracket 3200. Disposed in-between the two stiffening ribs 3202, 3204 is an integral, rectangular "box" 3206 that mechanically surrounds, engages, and supports, i.e., couples, helical drive 3400 to lower bracket 3200. The upper and lower interior horizontal ledges of box 3206 rest on, i.e., couple to, the upper and lower horizontal surfaces of drive 3400, respectively. Support box 3206 transfers vertical motion of helical drive 3400 to vertical motion of lower bracket 3200.

In contrast to the embodiment of FIG. 62, in embodiments of the present invention, the upper bracket 3100 and the lower bracket 3200 can be manufactured as a single, monolithic, integral part. This can be manufactured as a single extrusion, for example.

Additional Trim-Rail Assembly

Figure 63:
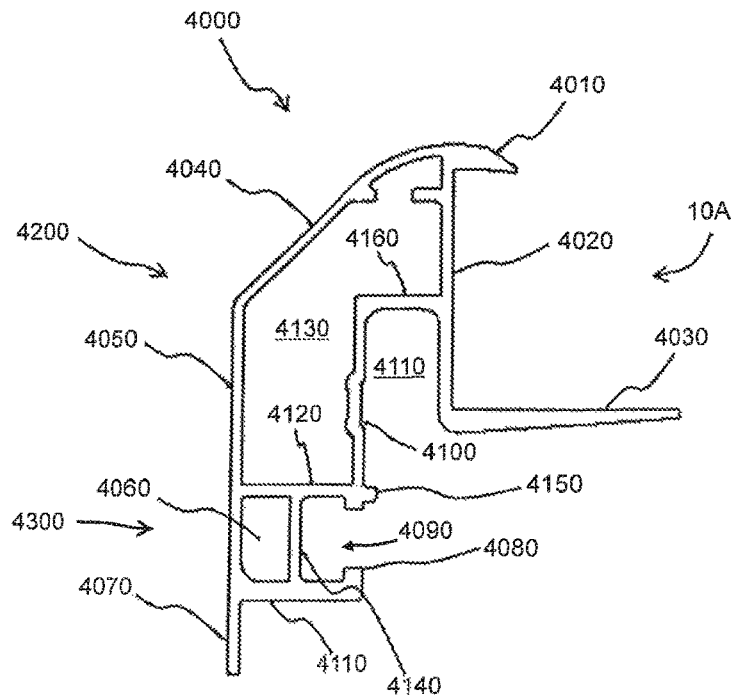
FIG. 63 is a side view of a second embodiment of a trim-rail of the trim-rail assembly in accordance with the principles of the present invention.

FIG. 63 illustrates a second embodiment of a trim-rail 4000 of the trim-rail assembly of the present invention with integrated clamping. Trim-rail 4000 includes both a rail 4300 and a trim 4200 and integrated clamping ledges 4010, 4030 where the rail 4300, trim 4200, and clamping ledges 4010, 4030 are integrated as a single, monolithic structure. Thus, the trim-rail 4000 includes a rail 4300 that extends an entire length or width of at least one solar panel of a plurality of solar panels that are utilized in a solar panel array. The rail 4300 of the trim-rail 4000 mounts the solar panel(s) to a surface, such as the roof of a home or building, via connection to a footer (not shown). Since the rail 4300 extends the entire length or width of at least one solar panel of a plurality of solar panels that are utilized in a solar panel array, so does the trim 4200. Rail 4300 can have an "I-beam" shape in cross-section including a horizontal lower flange 4110 and a horizontal upper flange 4120, both connected by a vertical web 4140.

In FIG. 63, trim 4200 has a generally curved exterior surface 4040 that extends downwardly and outwardly from the top of the trim-rail 4000 to a lower vertical portion 4050 of the trim-rail 4000 and then downwardly to a lowest-most vertical portion 4070 of the rail 4300. Trim-rail 4000 is a hollow beam, including a hollow interior volume (hollow chamber) 4130. Trim-rail 4000 can be manufactured as an extruded product. The top portion of trim-rail 4000 is smoothly rounded over and it makes a smooth transition with upper ledge 4010.

Thus, in FIG. 63, the trim 4200 can provide for an aesthetically-pleasing front surface for the trim-rail 4000 when the trim-rail 4000 is used as the front-most rail in the hybrid solar panel mounting assembly of the present invention. Additionally, the trim-rail 4000 can also assist in providing for a fire protection mechanism by further restricting the flow of air under the rail portion 4300, and thus under the photovoltaic module(s) that are mounted on the trim-rail 4000. Lower vertical extension 4070 of rail 4300 aids in restricting airflow underneath trim-rail 4000.

Thus, in FIG. 63, because the rail portion 4300 and the trim portion 4200 of the trim-rail 4000 are a single, monolithic, integrated structure, there is no need to mount a trim piece 4200 on a separate rail. The integrated structure of the trim-rail 4000 design provides for both mounting a solar panel(s) to a surface by the rail 4300 and providing a trim 4200 for the rail. Further yet, because the trim 4200 and the rail 4300 are a single integrated structure, the trim 4200 is part of the rigid structure of the trim-rail 4000, and thus, it is also a rigid structure itself. As such, the trim 4200 also directly supports the solar panel modules. In some embodiments, the wall thickness of trim portion 4200 can be the same as the wall thickness of rail portion 4300.

In FIG. 63, the rail 4300 includes a first track 4090 formed between the upper flange 4120 and the lower flange 4110. The bottom flange 4110 of the rail 4300 is the portion of the rail 4300 that is closest to the mounting surface, e.g., the roof. As will be further discussed below, the track 4090 is able to receive within it mounting hardware, e.g., the head of a bolt, that is used to mount the rail 4300 and thus trim-rail 4000, on a footer (see FIGS. 65-66). The track 4090 is provided on one side of the rail 4300 so that the footer may be mounted on the inside of the rail 4300. Opposite of the track 4090, on the other side of web 4140, is a small hollow volume 4060. Lower flange 4110 contains a raised outside lip 4080 which is used to constrain the head of a bolt inserted into track 4090. On the outer edge of upper flange 4120 is a horizontally extending flange 4150 that extends along the longitudinal length of trim-rail 4000 and which serves to lock into a horizontal groove (not shown) of an attached footer (see FIGS. 65-66).

In FIG. 63, a vertical wall 4100, i.e., vertical with respect to the surface on which the trim-rail 4000 is mounted, is provided extending upwards from the top flange 4120 of the rail 4300. Next, extending perpendicularly, i.e., horizontally, from the vertical wall 4100 is horizontal segment 4160 which intersects with vertical wall section 4020 on the right-hand side of trim-rail 4000 (as viewed in FIG. 63). Vertical wall section 4020 extends downwardly from the top portion of trim 4040. Extending horizontally from vertical section 4020 is a lower ledge (shelf) 4030 and an upper ledge (wing) 4010. The gap between the upper ledge 4010 and lower ledge 4030 defines a slot 10A into which a solar panel (or panels) is inserted. Lower ledge 4030 extends considerably further outwards from vertical wall 4020 than upper ledge 4010. An edge of a solar panel(s) that is mounted on trim-rail 4000 is positioned between ledges 4030 and 4010. The bottom of the solar panel is supported on lower ledge 4030 and the top of the solar panel is disposed under, and in engagement with, upper ledge 4010. Thus, the edge of the solar panel is secured on trim-rail 4000 between lower ledge 4030 and upper edge 4010 of trim section 4200.

In FIG. 63, trim-rail 4000 also includes a hollow chamber 4130 which is bounded on six sides by trim walls 4040 and 4050, vertical walls 4100 and 4020, and bottom walls 4120 and 4160. Chamber 4130 receives splice 5000 within it (see FIG. 64)

Figure 64:
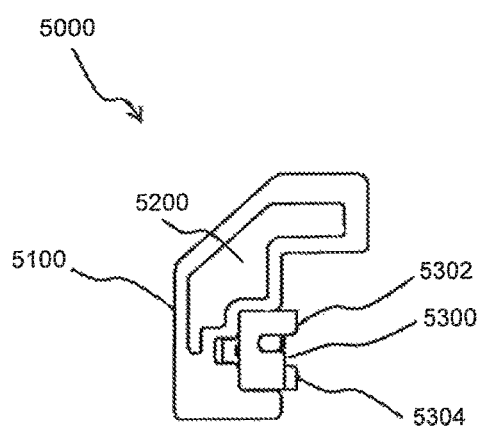
FIG. 64 is a side view of a second embodiment of a splice of the trim-rail assembly in accordance with the principles of the present invention.

FIG. 64 illustrates an embodiment of splice 5000. Splice 5000 is used to splice together two adjacent trim-rails 4000. A first end of the splice 5000 is securely received within hollow chamber 4130 of a first adjacent trim-rail 4000. A second end of the splice 5000 would be securely received within a hollow chamber 4130 of a second adjacent trim-rail 4000. Thus, the splice 5000 rigidly joins and aligns a first trim-rail 4000 to a second adjacent trim-rail 4000 by firmly engaging within respective hollow chambers 4130 of adjacent trim-rails 4000.

In FIG. 64, the structure of splice 5000 has a geometry that is complementary and close-fitting to that of trim-rail 4000. Thus, the splice 5000 has a trim-like portion 5100 that has a contour (profile) that is complementary to trim walls 4040, 4050 of trim section 4200. Thus, when splice 5000 is received within hollow chamber 4130 of a trim-rail 4000, the trim-like portion 5100 of splice 5000 generally engages with the inside wall of trim 4200 of trim-rail 4000. Splice 5000 has a hollow chamber 5200 and a connector 5300.

In FIG. 64 splice 5000 can be further secured within the adjacent trim-rails 4000 by use of spring connector (interlock) 5300. As such, splice 5000 also has an internal structure that receives within it a portion of connector 5300 (see FIG. 4 for details of a similar connector 300). Connector 5300 includes a pair of outwardly-bent spring straps, i.e., tabs, 5302, 5304 that are bent such that they are received with splice 5000 and firmly engage into splice 5000 to secure connector 5300 on splice 5000. At least portions of connector 5300 engage into both trim-rail 4000 and splice 5000 to electrically bond the trim-rail 4000 to the splice 5000 and, hence, to an adjoining trim-rail 4000. These portions can be the respective straps 5302 and 5304.

Figure 65:
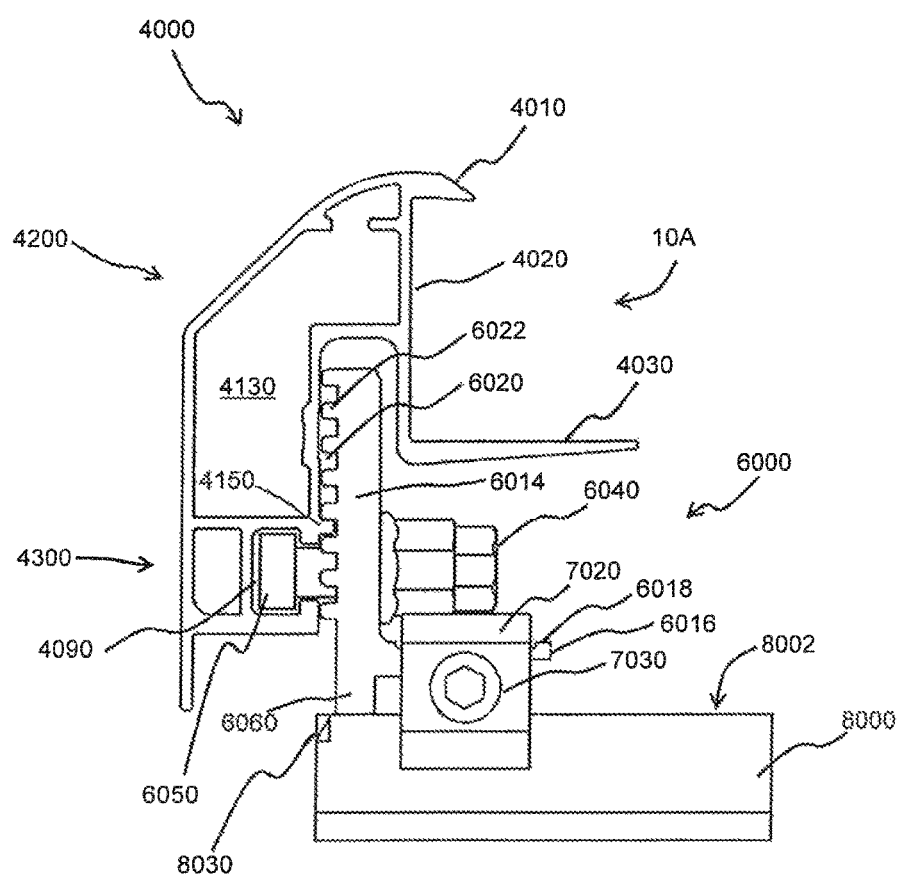
FIG. 65 is a side view of the second embodiment of the trim-rail and a footer assembly according to the principles of the present invention.
Figure 66:
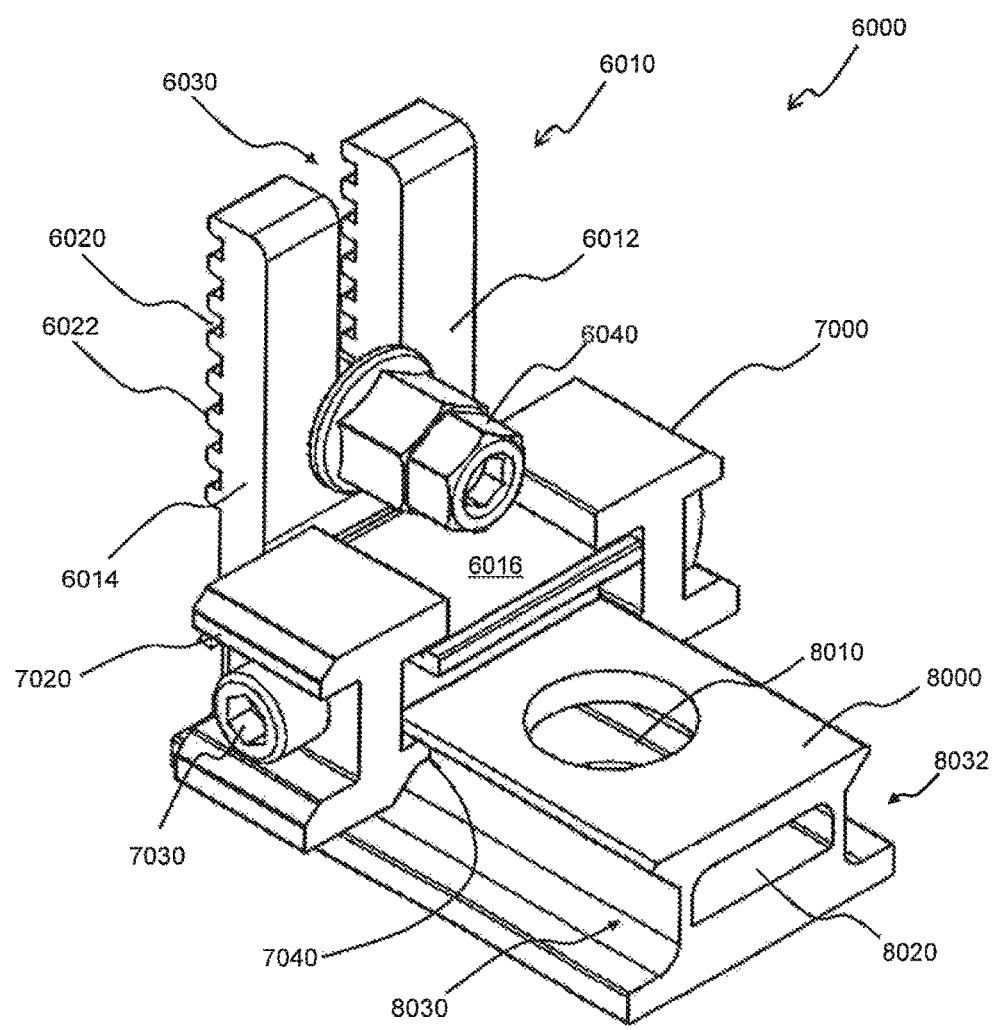
FIG. 66 is a perspective view of the footer assembly of FIG. 65.

FIG. 65 is a side view of the second embodiment of the trim-rail 4000 mounted to a footer and a base, hereinafter referred to as a footer assembly 6000. FIG. 66 is a perspective view of the footer assembly. Trim-rail 4000 is removably mounted to footer assembly 6000 using fastener 6050 with the fastener's head mounted in track 4090. Footer mounting assembly 6000 includes a footer bracket 6010 which includes a pair of vertical arms 6012 and 6014 which each include a plurality of horizontal ledges (teeth) 6022. For example, arm 6014 can include 8 levels of ledges 6022. The grooves, i.e., slots, 6020 that are disposed in-between adjacent ledges 6022 engage and interlock with horizontally protruding flange 4150 on trim-rail 4000. The distance between adjacent ledges 6022 can be, for example, ⅛", which gives a total vertical height adjustment capacity of 2". In FIG. 66, an open vertical slot 6030 is disposed in-between vertical arms 6012 and 6014. The shank of fastener (bolt) 6050 passes through slot 6030 and engages with a tri-drive nut 6040 on the distal side of arms 6012, 6014. As will be further explained later in this specification, the tri-drive nut 6040 can be driven by three different sized tools: (a) a large hexagonal socket wrench, e.g., ⅝", (b) a smaller socket wrench, e.g., ½", and (c) an Allen wrench tool. Use of three alternative drive tools gives the installer large flexibility for selecting and using a single tool during installation.

Referring still to FIGS. 65 and 66, footer bracket 6010 further includes an integral horizontal flat leg 6016 which gives the footer 6010 an "L-shape." Flat leg 6016 further includes an upwards-facing horizontal lip 6018. Flat leg 6016 is disposed within, and is captured by, a pair of "I"-shaped side clamps 7000, 7020. Clamps 7000, 7020 are compressed by a fastener, e.g., bolt, 7030, which provides a clamping and locking force onto horizontal leg 6016. The lower lip 7040 of side clamp 7020 engages in a side groove 8030 that is horizontally-disposed along the longitudinal length of base (track) 8000. Side clamp 7000 clamps onto base 8000 through engagement in side groove 8032. Base 8000 is rigidly fixed to a roof with a lag screw (not shown) that is disposed through aperture 8010. A hollow chamber 8020 is disposed along the length of base 8000. Footer bracket 6010 further includes a lower leg 6060, the bottom of which rests on the upper surface 8002 of base 8000.

Figure 67:
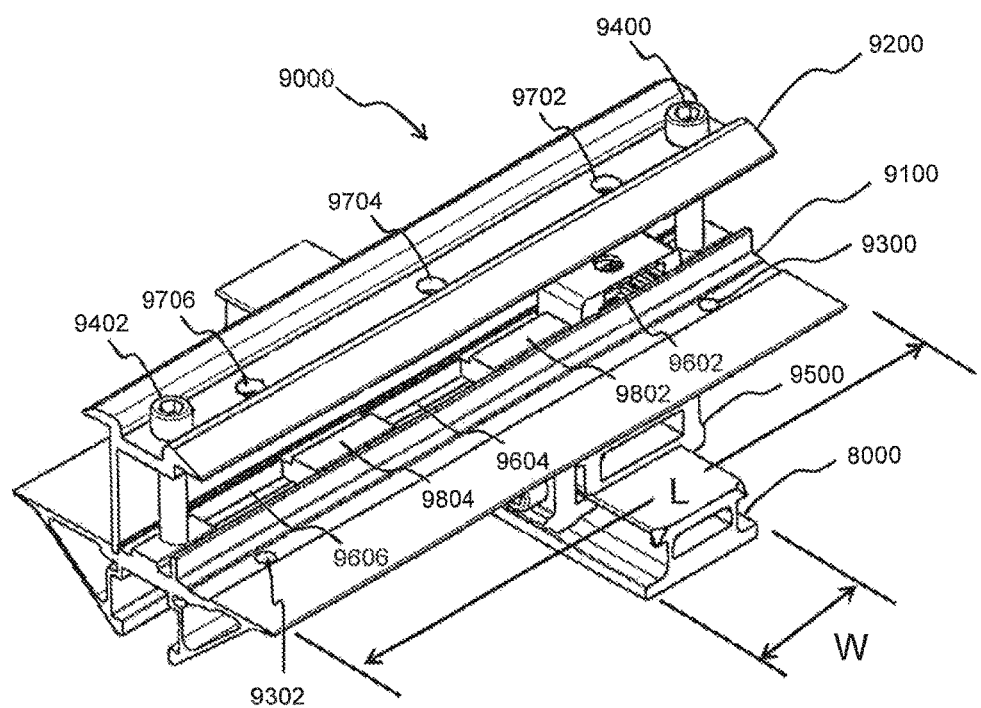
FIG. 67 is a perspective view of an apparatus for mounting photovoltaic modules according to another embodiment of the present invention.
Figure 68:
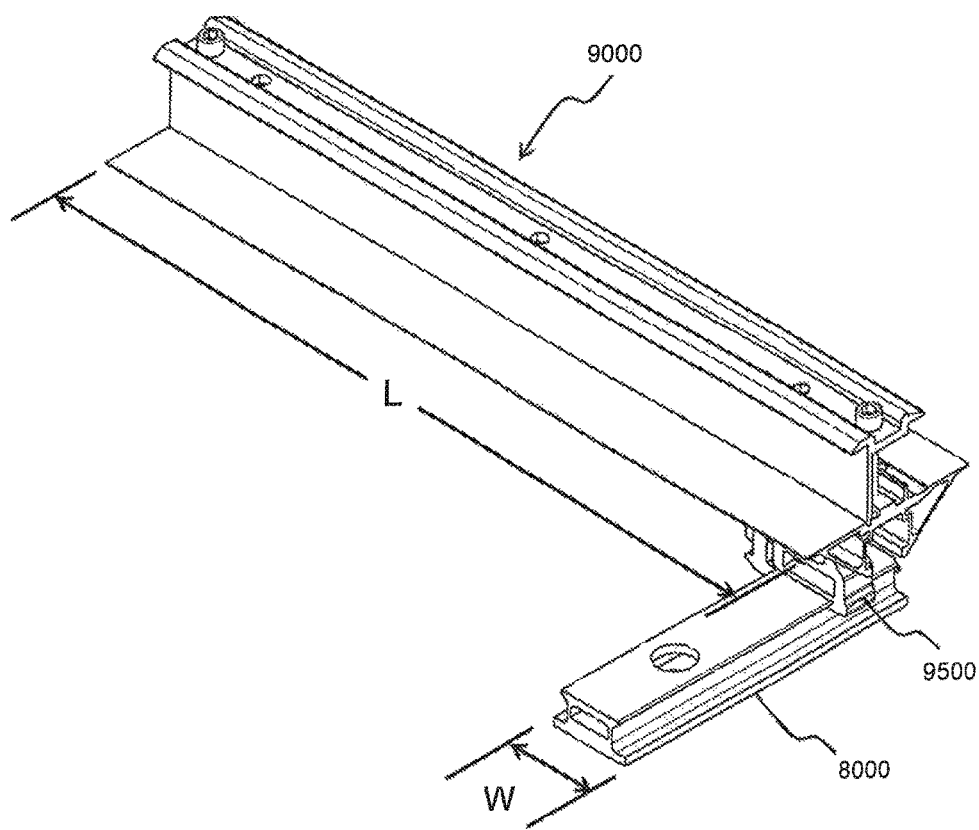
FIG. 68 is a perspective view of the embodiment of FIG. 67.

FIGS. 67 and 68 are perspective views of another embodiment of a solar panel mounting bracket according to the present invention. This embodiment is generally the same as that illustrated in FIGS. 60-62, except that the overall length, L, is much greater in FIGS. 67 and 68 than in FIGS. 60-62. In one example, the length L of micro-rail bracket 9000 can be 17.5" long, which is approximately equal to ½ of a maximum expected rafter spacing, e.g., 24", plus 5.5", where the extra length equates to 2.5"-3.0" of overhang at either end of the bracket 9000. The width, W, of base track 8000 can be, for example, 1.5" wide. In FIGS. 67 and 68, the length, L, of micro-rail bracket 9000 is much longer than the width, W, of base track 8000. In some embodiments, the aspect ratio, L/W, of the bracket's length (L) to the width (W) of the base track can be greater than 10. Alternatively, the aspect ratio L/W can be greater than 10 and less than 15. Alternatively, the aspect ratio L/W can equal approximately 12~(17.5/1.5). Alternatively, the length, L, can be less than or equal to (½ of the spacing between adjacent roof rafters)+5.5 inches. Micro-rail bracket 9000 can include a pair of threaded fasteners, e.g., cap screws, 9400 and 9402, disposed at opposite ends of bracket 9000. Micro-rail bracket 9000 can also include a pair of bonding pins 9300, 9302 disposed at opposite ends of bracket 9000 and located on the clamping side of bracket 9000.

Referring to FIG. 67, micro-rail bracket 9000 includes an upper clamping portion 9200 and a lower base supporting member 9100. Disposed within base supporting member 9100 is a series of three rectangular-shaped apertures 9602, 9604, and 9606, located at the east end, middle, and west end of the bracket 9000, respectively. These apertures 9602, 9604, and 9606 are sized to accept a single vertical structural support tower (stanchion) 9500 of the height adjustable mounting assembly, which engages with the helical drive and which is attached to base track 8000. In between each aperture 9602, 9604, 9606 is a solid bridge segment 9802, 9804, respectively, which separates each aperture. Depending on where the micro-rail bracket 9000 is positioned with respect to the underlying roof rafters (Central location, West end, or East end), the support tower 9500 can be variably-discretely placed within one of the three apertures 9602, 9604, and 9606. For example, FIG. 68 shows the support tower 9500 being located in aperture 9606 at the West end of micro-rail bracket 9000. In this way, the support tower 9500 is variably-discretely positionable with respect to the longitudinal axis of bracket 9000, i.e., in one of three fixed positions. In general, a plurality of discrete locations can be used to provide variable-discrete positioning of the support tower 9500 in bracket 9000. The number of discrete locations can be, for example, 1, 2, 3, 4, or 5, depending on the length of bracket 9000. Bracket 9000 further includes three tool-access holes 9702, 9704, and 9706 that are located directly above each of the three rectangular-shaped apertures 9602, 9604, and 9606, respectively, for providing easy access to adjust the helical vertical drive mechanism (and, thus, adjust the PV module height off the deck). In this way, the base track 8000 is not confined to a single position on bracket 9000, but, rather, can be variably positioned at three different discrete locations along the length of bracket 9000 in order to co-locate the position of the base track 8000 with an underlying rafter on the roof structure.

Figure 69:
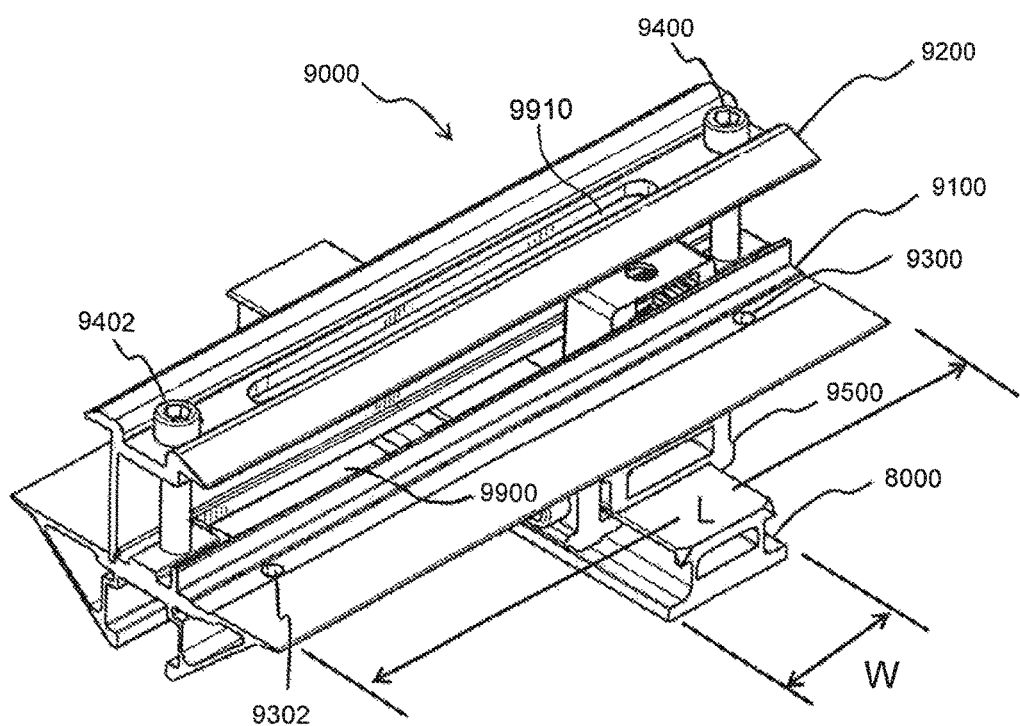
FIG. 69 is a perspective view an apparatus for mounting photovoltaic modules according to another embodiment of the present invention.

In another embodiment, with reference to FIG. 69, bridge segments 9802 and 9804 are eliminated and replaced with open space. In this embodiment, then, apertures 9602, 9604 and 9606 are merged into one single continuous open slot

9900, as shown in FIG. 69, within which tower 9500 can be continuously variably-positioned in the East-West direction. As such, as can be seen, the tower is movable within the slot and along a length of the slot, where the length of the slot is at least two times the length of the tower. In addition, discrete tool-access holes 9702, 9704, 9706 are replaced by a single, continuous access slot 9910 that runs in the East-West direction.

Further Rail-Less or Non-Rail-Based System Components

Figure 70:
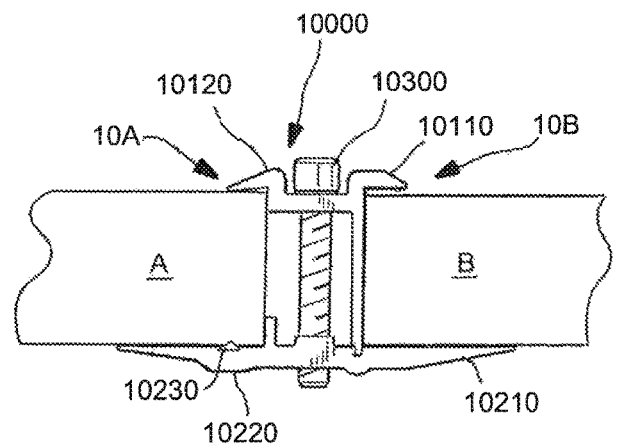
FIG. 70 is a side view an apparatus for mounting photovoltaic modules according to another embodiment of the present invention.
Figure 71:
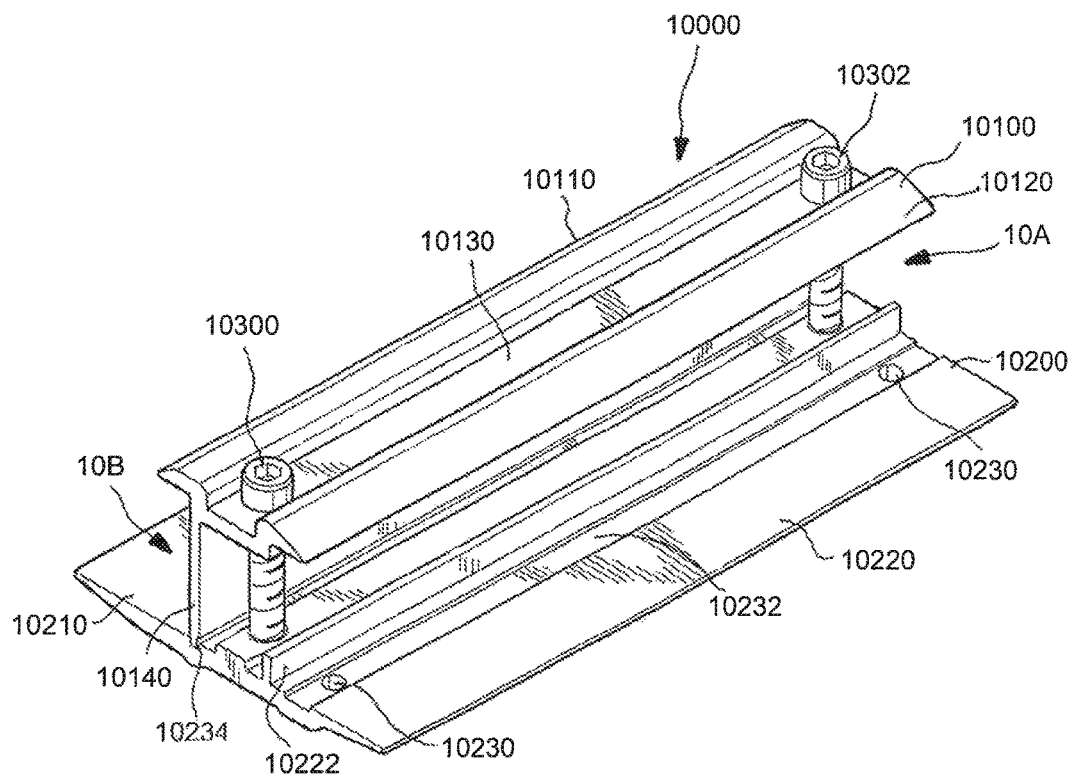
FIG. 71 is an isometric view of the embodiment of FIG. 70.

FIGS. 70-71 illustrate an apparatus for mounting photovoltaic modules according to another embodiment of the present invention. A floating clamp assembly 10000 for holding solar panels together is disclosed, which can also be a bracket of a rail-less or non-rail-based system. The floating clamp assembly 10000 basically includes the same structure of an upper bracket 10100 and a lower bracket 10200 as per the upper bracket 3100 and lower bracket 3200 of the bracket of the embodiment of FIGS. 60-62, with the exceptions that, as can be seen, the lower bracket 10200 does not include the lower structure of the lower bracket 3200 and does not includes apertures for a stanchion and a tool.

Thus, as can be seen, the assembly 10000 includes an upper bracket 10100 and a lower bracket 10200 (which together form a mounting bracket for mounting solar panels). Upper bracket 10100 includes a first arm 10110, a second arm 10120, a base 10130, and a bottom wall 10140 that has a lower end that engages with a slot 10234 that is disposed within, and lays across the width of, lower bracket 10200. Lower bracket 10200 includes a first arm 10210 and a second arm 10220.

First and second clamping bolts 10300, 10302 clamp the upper bracket 10100 down to lower bracket 10200 when one or more solar panels are installed in each of slots 10A, 10B, which are defined between the respective arms of the upper and lower brackets. Stop bar 10222 runs sideways across the width of lower bracket 10200 and serves as a stop to abut against, and align, the solar panel(s) when installed in slot 10A. Bonding pins 10230 are disposed in respective holes located in recessed channel 10232 in lower bracket 10200. Bonding pins 10230 serves to pierce the anodized aluminum coating on the solar panel(s) and electrically interconnect (ground) the solar panel(s) to the lower bracket 10200 of assembly 10000.

As can be seen in FIG. 70, when solar panels A and B are respectively disposed in slots 10A and 10B, solar panel B is loosely captured within slot 10B when the clamping bolts 10300, 10302 are tightened. The gap between solar panel B and the first arm 10110 of upper bracket 10100 is approximately 1 mm.

The assembly 10000 is referred to as a "floating splice" since the assembly is supported above the surface on which the solar panels are otherwise mounted, and thus, the splice only contacts the solar panels and does not contact the surface.

In an installation, slot 10A is a South-facing side of the assembly and slot 10B is a North-facing side of the assembly. The bonding pins make an electrical connection to the frames of clamped solar panels with a steady-state electrical resistance less than or equal to 0.010 Ohms, as measured per the Bonding Path Resistance Test specification described in UL 2703.

In an embodiment, the upper bracket and the lower bracket are a single-piece, continuous, integral object.

Multi-Drive Nut

Figure 72:
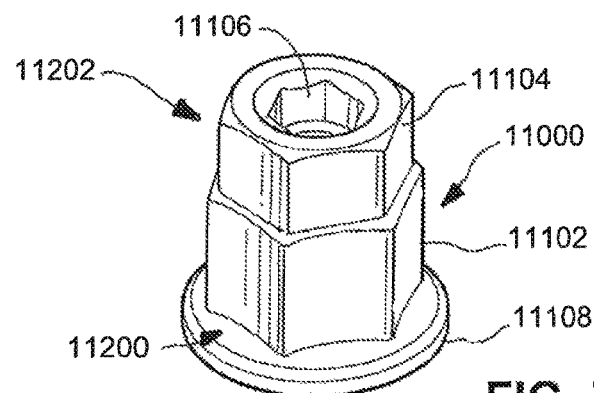
FIG. 72 is a perspective view of a drive in accordance with the principles of the present invention.
Figure 73:
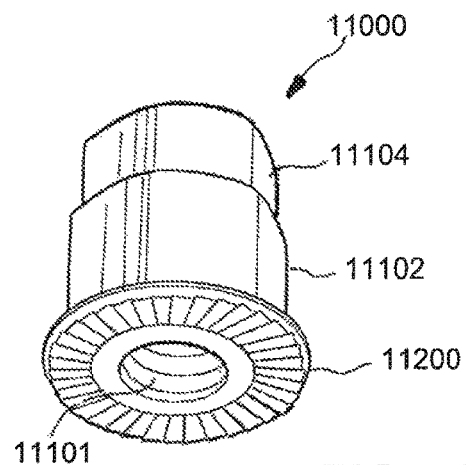
FIG. 73 is another perspective view of the drive of FIG. 72.
Figure 74:
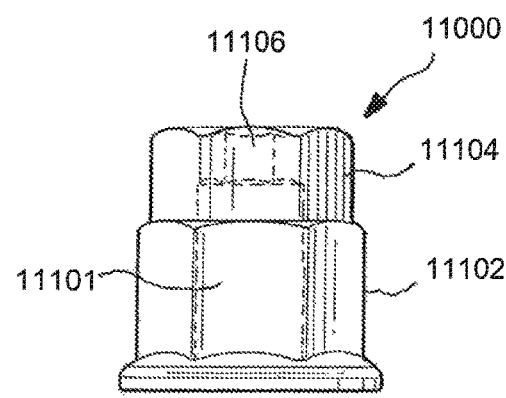
FIG. 74 is a side view of the drive of FIGS. 72 and 73.

FIGS. 72-74 illustrate a first embodiment of a multi-drive nut for attaching to a fastener, as discussed previously. A multi-drive bolt or screw includes a head and a threaded shank. The head is a multi-drive nut 11000 with a body, internal threads, a proximal end 11200 and a distal end 11202, and three concentric drive mechanisms for driving the nut. The three concentric drive mechanisms are disposed on an outside of the body and include a first external drive 11102 and a second external drive 11104. Thus, the multi-drive nut 11000 can be driven, i.e., rotated, by two differently sized, externally applied tools. For example, a large hexagonal socket wrench, e.g., ⅝", can be used with first external drive 11102 and a smaller hexagonal socket wrench, e.g., ½", can be used with second external drive 11104. The larger diameter external drive 11102 is disposed near the proximal end 11200 of the nut and the smaller diameter external drive 11104 is disposed near the distal end 11202 of the nut.

Further, the multi-drive nut includes a third drive mechanism, which is disposed inside the body and is an internal drive 11106, which may be driven by, for example, an Allen wrench tool. The internal drive 11106 is disposed at the distal end 11202 of the nut. Optionally, the hollow shaft of the internal drive 11106 may extend along the entire length of the multi-drive nut, with openings at both the proximal and distal ends.

The multi-drive nut also includes a flanged base 11108 which includes a plurality of angled, radial serrations that are disposed around the circumference of the flanged base. A threaded aperture 11101 is included at the proximal end 11200 for receiving a threaded shank.

Figure 75:
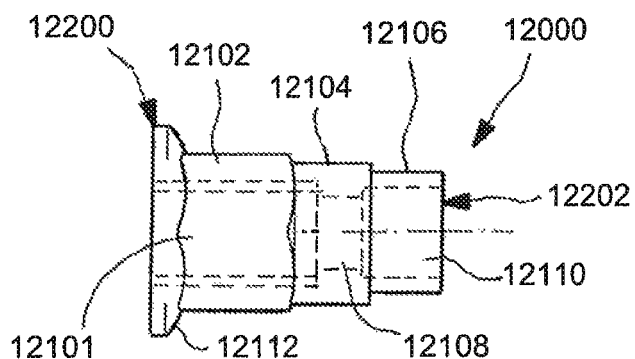
FIG. 75 is a side view of another embodiment of a drive in accordance with the principles of the present invention.
Figure 76:
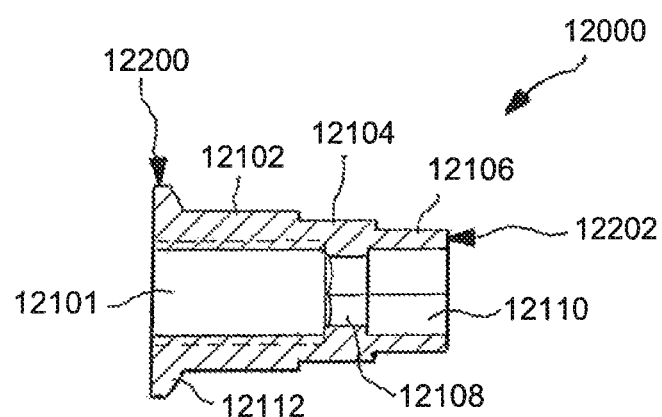
FIG. 76 is a cross-sectional view of the drive of FIG. 75.

FIGS. 75-76 illustrate a second embodiment of a multi-drive nut for attaching to a fastener, as discussed previously. The head is also a multi-drive nut 12000 with a body and including internal threads, a proximal end 12200 and a distal end 12202, and five concentric drive mechanisms for driving the nut. The five concentric drive mechanisms include a first external drive 12102, a second external drive 12104, and a third external drive 12106. Thus, the multi-drive nut 11000 can be driven, i.e., rotated, by three differently sized, externally applied tools. The largest diameter external drive 12102 is disposed near the proximal end 12200 of the nut and the smallest diameter external drive 12106 is disposed near the distal end 12202 of the nut, and the drive 12104 that is sized between the largest and smallest drives is disposed between the largest 12102 and smallest 12106 drives.

Further, the multi-drive nut includes fourth and fifth drive mechanisms, which are internal drives 12108 and 12110, which may be driven by, for example, differently sized Allen wrench tools (hex socket). The internal drive 12110 is disposed at the distal end 12202 of the nut and the internal drive 12108 is disposed intermediate the distal end 12202 and the proximal end 12200. Internal drive 12110 is larger than internal drive 12108. As such, internal drive 12110 has a larger radius from the centerline of the nut than does internal drive 12108.

The multi-drive nut 12000 also includes a flanged base 12112 which also can include a plurality of angled, radial serrations that are disposed around the circumference of the flanged base. A threaded aperture 12101 is included at the proximal end 12200 for receiving a threaded shank.

In other embodiments, the multi-drive nut can be an un-threaded cap end of a multi-drive bolt or a multi-drive screw.

Whereas the external drives are disclosed as being hexagonal in shape, they may also be a square or triangular drive. The internal drives may be a hex drive, or a Torx™ drive, a star drive, a square drive, or a triangular drive, or combinations thereof.

Use of these alternative drive tools gives the installer large flexibility for selecting and using a single tool during installation. The disclosed number of external drives and internal drives may be used in any combination, separately, or in any number.

Further Rail-Less or Non-Rail-Based System Components

Figure 77:
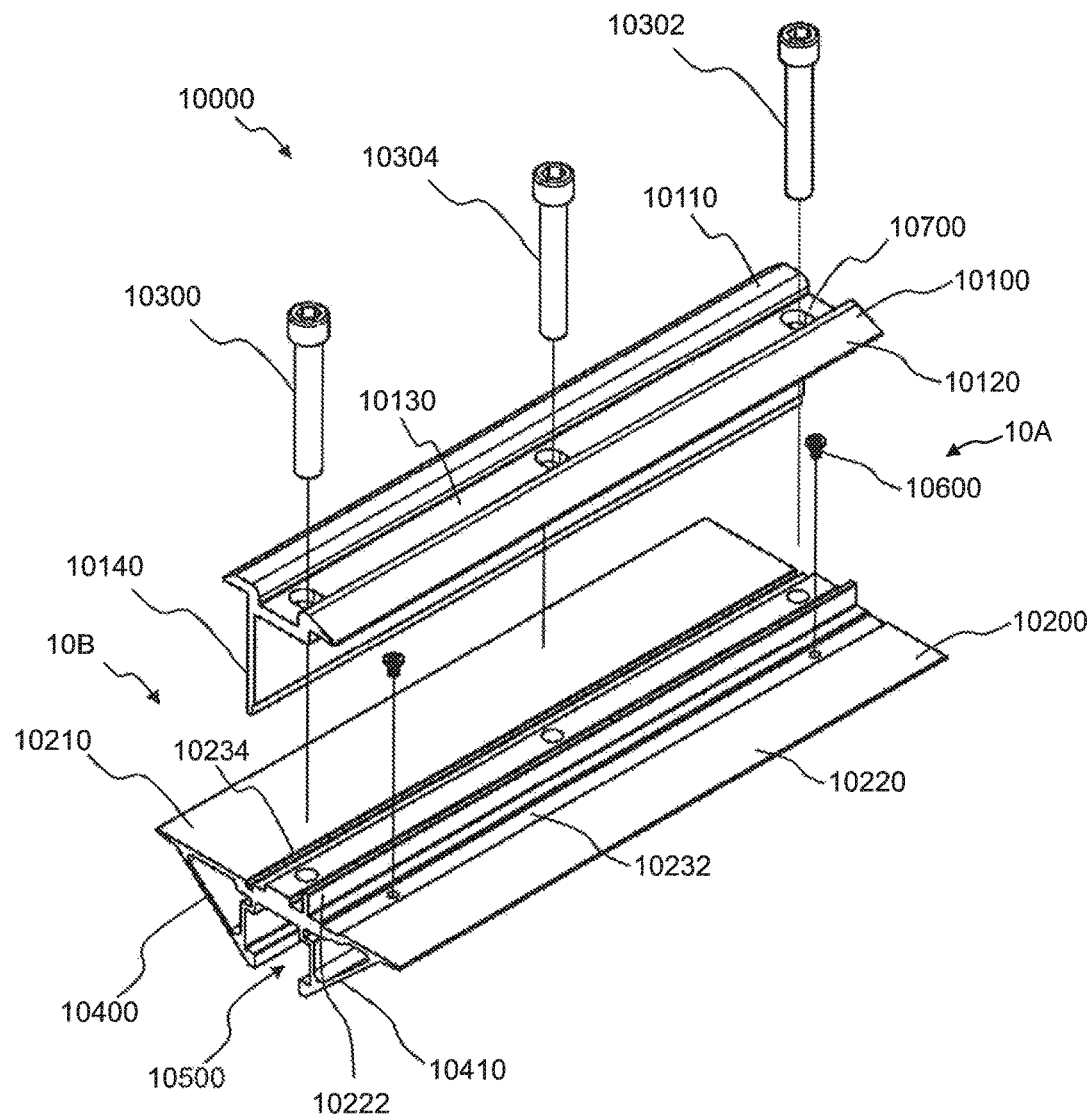
FIG. 77 is a perspective view of an apparatus for mounting photovoltaic modules according to another embodiment of the present invention.

FIG. 77 shows an exploded perspective view of another embodiment of a floating splice assembly according to the present invention. This embodiment is similar to what is shown previously in FIGS. 70 and 71, and whereas otherwise noted, uses the same reference numbers for the same parts. In FIG. 77, the lower bracket 10200 further includes a symmetric pair of stiffening ribs (wings) 10400 and 10410 and adjoining pair of vertical walls, disposed underneath the horizontal arms 10210 and 10220, respectively. These stiffening ribs serve to stiffen the lower bracket and to increase its bending strength along the long axis. A slot 10500 is defined between the adjoining pair of vertical walls.

Floating clamp assembly 10000 further includes three slots 10700 for receiving fastening cap bolts 10300, 10302, and 10304. A pair of bonding pins 10600 can be seen, which are press-fit into respective holes. The length of floating splice 10000 can be about 9 inches, in some embodiments. Upper bracket 10100 is a "clamp and capture/catch" type of attachment bracket, where 1 or 2 solar panels are clamped on side 10A and where 1 or 2 solar panels are captured (catched) on the opposite side 10B.

Trim-Rail with a Tilted Ledge

Figure 78:
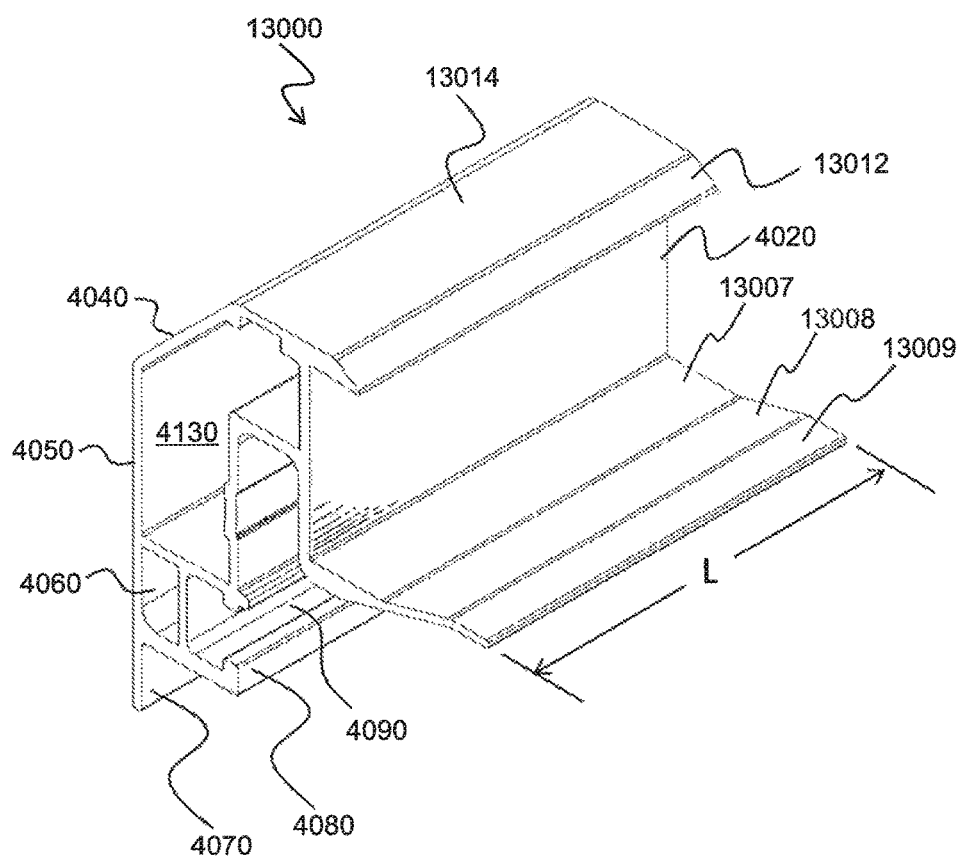
FIG. 78 is a perspective view of an embodiment of a trim-rail with a tilted ledge in accordance with the principles of present invention.

FIG. 78 is a perspective view of another embodiment of a trim-rail according to the principles of the present invention. The trim-rail of this embodiment has a tilted ledge. Trim-rail 13000, which may be an extrusion, can have any length L and is similar to the trim-rail of the embodiment of FIG. 63. The primary difference is shown in FIG. 78, where the trim-rail has a tilted portion 13008 that is tilted upwards at an angle, θ, with respect to horizontal, i.e., a horizontal plane. The tilt angle, θ, which can be particularly seen in FIG. 79, can range from 10 to 30 degrees and, thus, can be equal to 20 degrees. Attached to the tilted portion 13008 is a distal portion 13009 which is horizontal. The tilted spring support ledge 13006 includes, then, a combination of the tilted portion 13008 and the horizontal distal portion 13009. The tilted spring ledge 13006, then, in an embodiment, extends outwardly from an inner (proximal) horizontal portion 13007, which has a thicker cross-section than the tilted spring ledge 13006. The thickness of the proximal support portion 13007 can be at least 3 times greater than the thickness of the tilted spring support ledge 13006. If proximal portion 13007 is not used, the tilted spring support ledge 13006 would extend from the vertical wall section 4020 of the trim-rail. The remainder of trim-rail 13000 is similar to the trim-rail shown in FIG. 63 and for the same components, the same reference numbers are used in both Figures.

Figure 79:
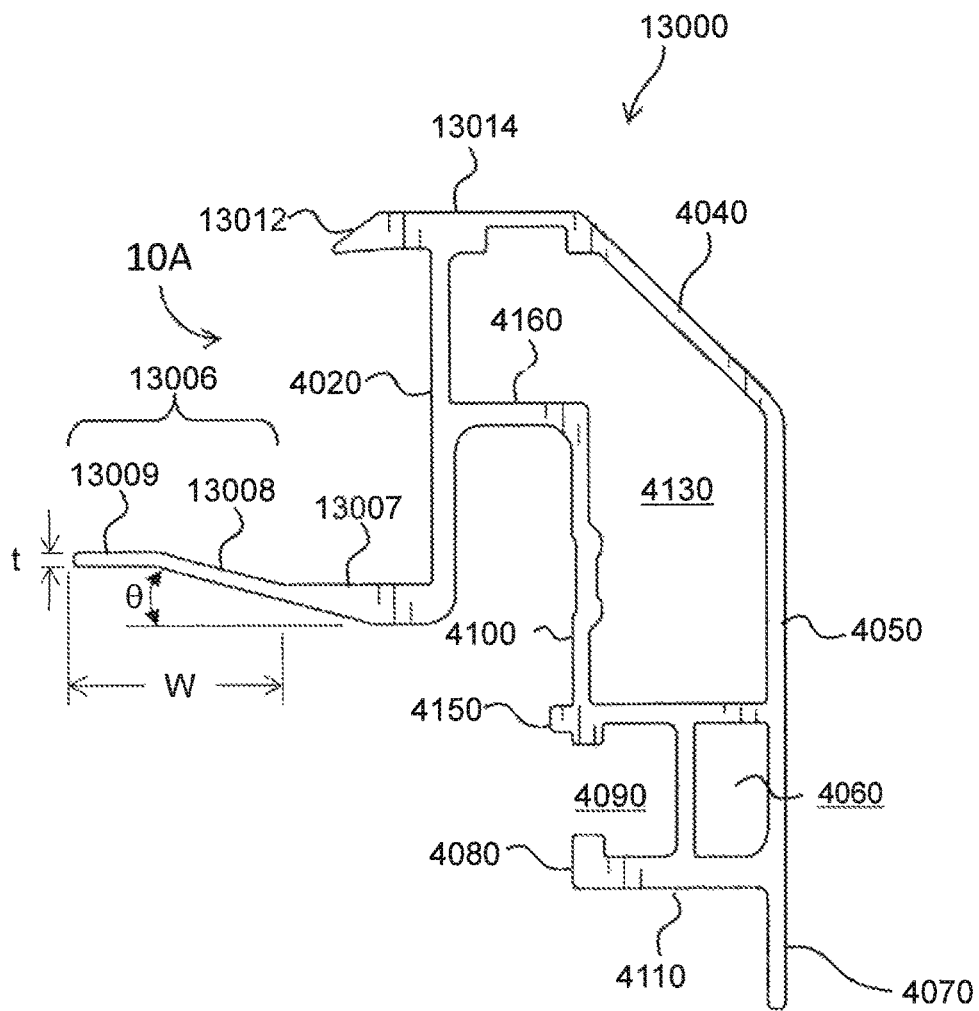
FIG. 79 is a right end view of the embodiment of the trim-rail with a tilted ledge of FIG. 78.

FIG. 79 is a right end view of the trim-rail with the tilted spring ledge. The tilted spring ledge 13006 forms a cantilevered beam that is long and thin. It has a thickness (t) and width (W) where the aspect ratio of W/t is greater than or equal to 10. In another embodiment, the aspect ratio of W/t is greater than or equal to 15. The cantilevered design of the tilted spring support ledge 13006 means that the ledge acts as a cantilevered, elastic beam that deflects vertically when loaded by a photovoltaic module (not shown) when installed/mounted in slot 10A. Tilted spring ledge 13006 provides an elastic, spring-like action, which generates a reaction (supporting) force that reacts elastically in a vertical direction, pushing up against the underside of the photovoltaic module when the module is inserted and rotated down against the tilted spring ledge 13006, thereby reducing any vertical clearance gap between the photovoltaic module and the upper ledge/wing 13012 of the upper bracket 13014 of the trim-rail to essentially zero.

The proximal horizontal portion 13007, if used, is shorter and thicker, hence it does not deflect as much as the thinner and longer tilted spring ledge 13006.

Figure 80:
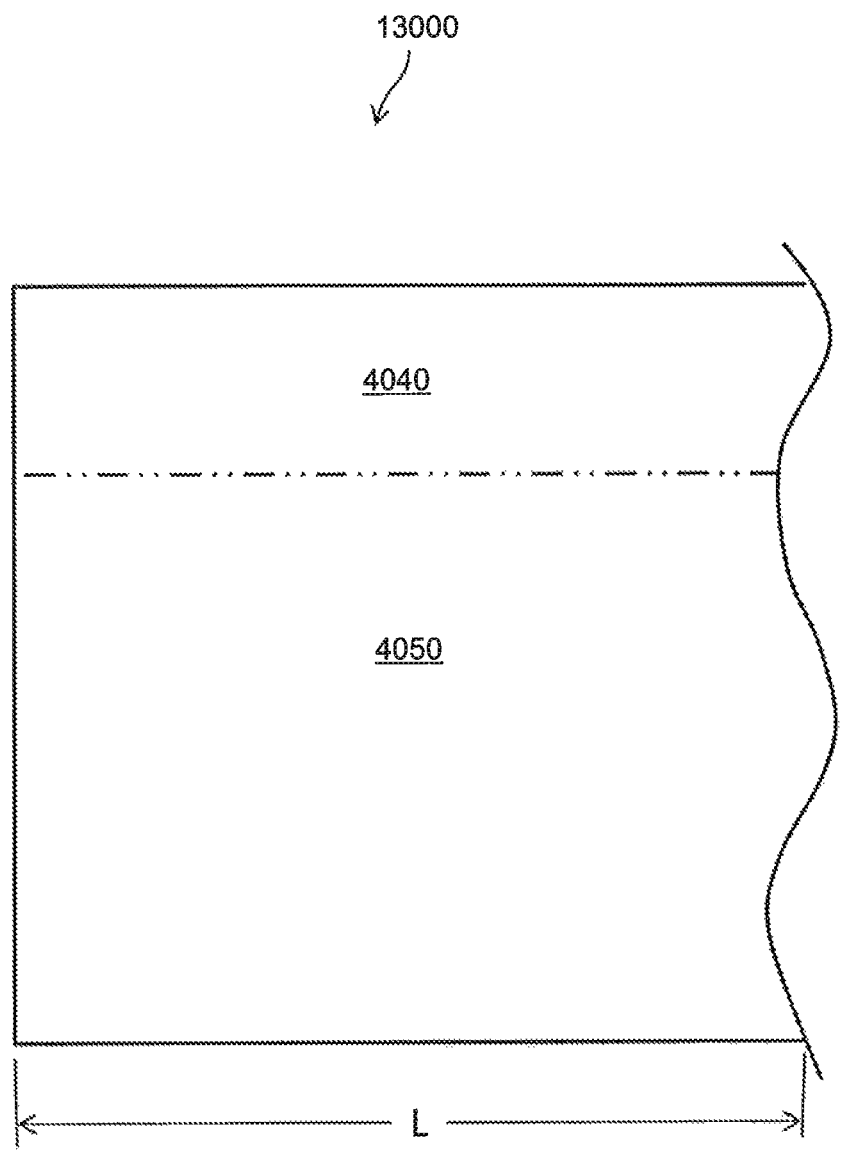
FIG. 80 is a front view of the embodiment of the trim-rail with a tilted ledge of FIG. 78.
Figure 81:
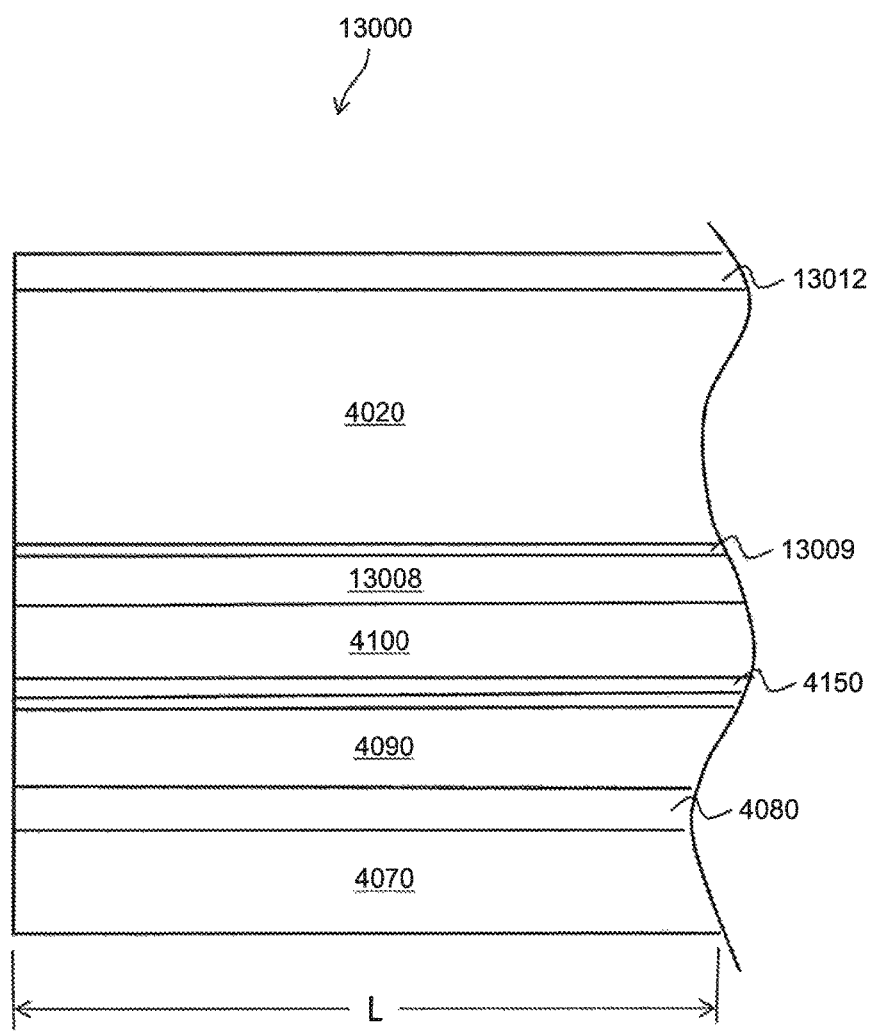
FIG. 81 is a rear view of the embodiment of the trim-rail with a tilted ledge of FIG. 78.
Figure 82:
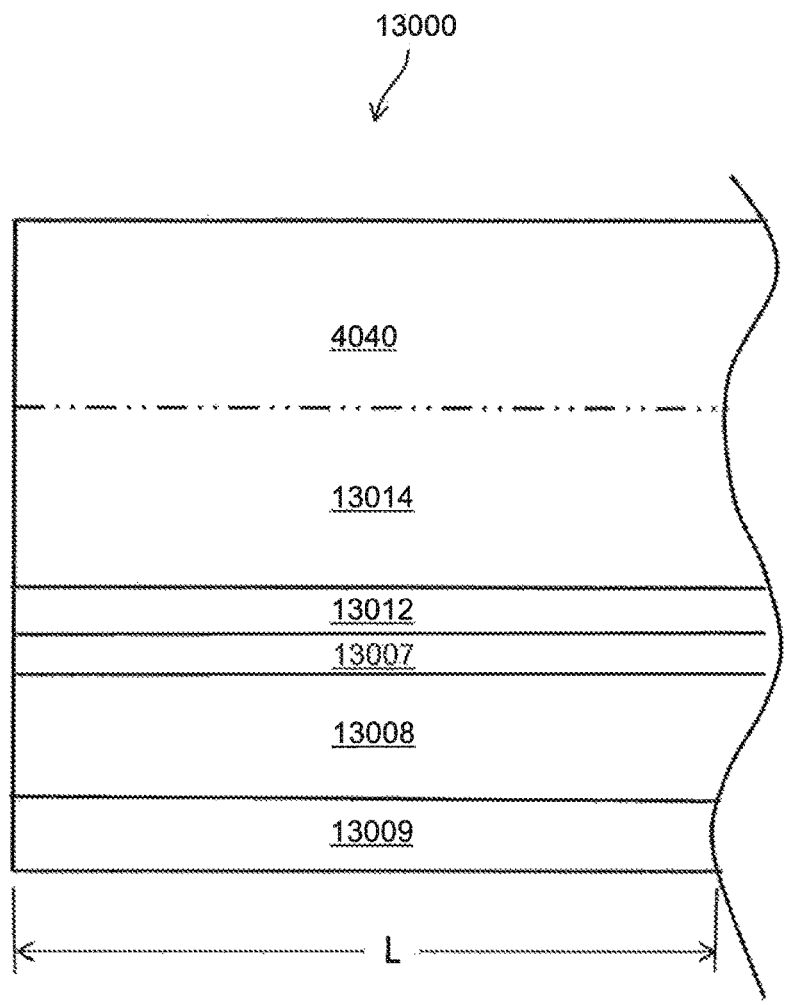
FIG. 82 is a top view of the embodiment of the trim-rail with a tilted ledge of FIG. 78.
Figure 83:
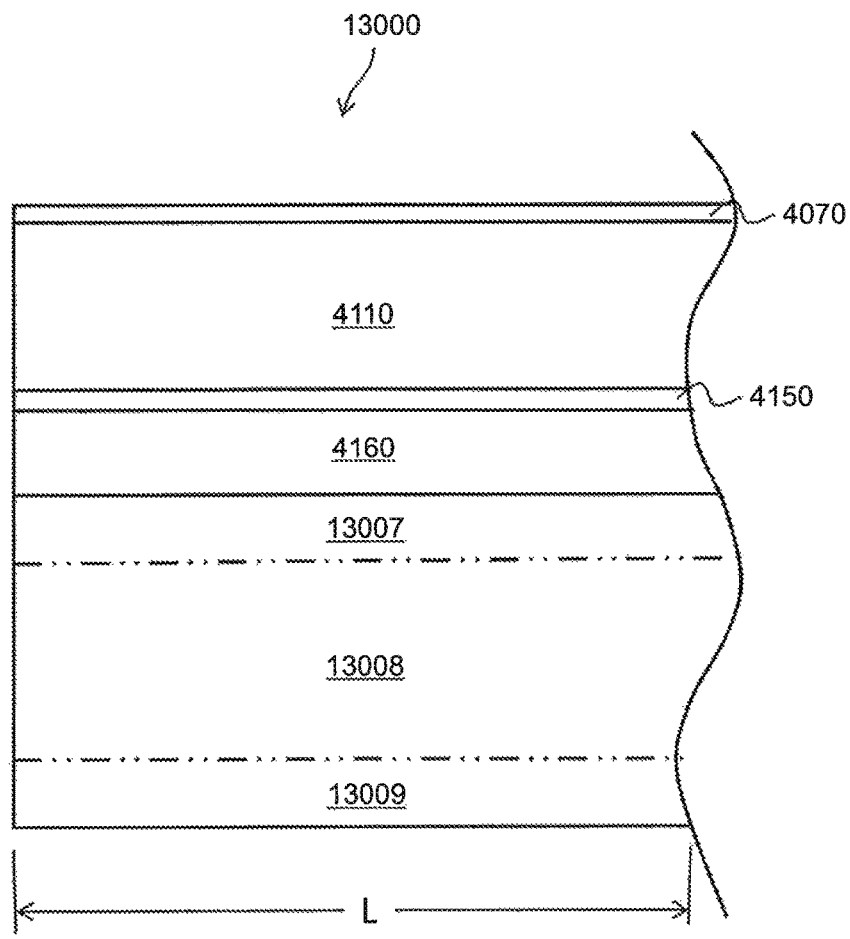
FIG. 83 is a bottom view of the embodiment of the trim-rail with a tilted ledge of FIG. 78.

FIG. 80 is a front view of the trim-rail 13000. FIG. 81 is a rear view of the trim-rail 13000. FIG. 82 is a top view of the trim-rail 13000. FIG. 83 is a bottom view of the trim-rail 13000.

Figure 84A:
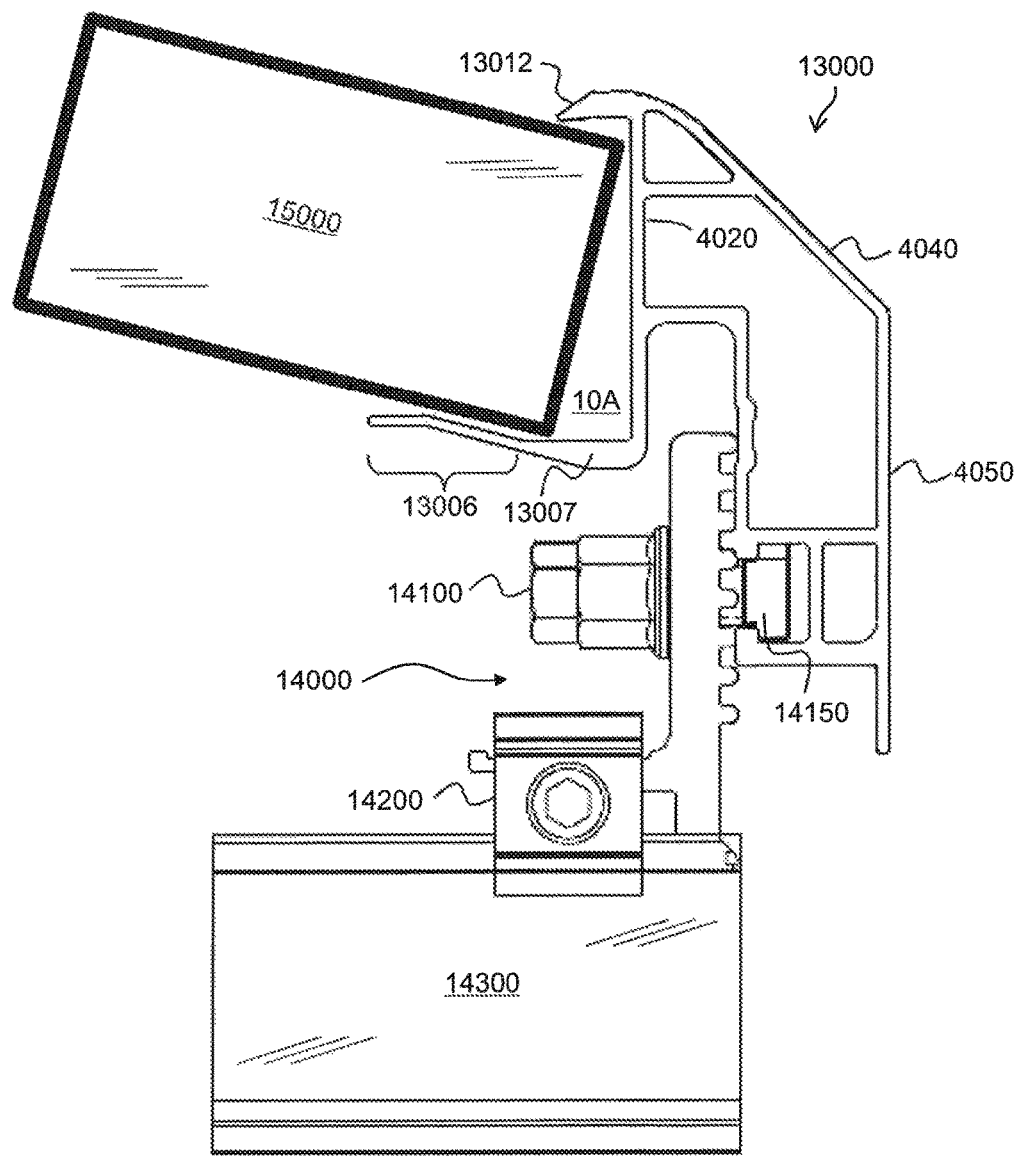
FIGS. 84A and 84B are right end views of an embodiment of a solar panel mounting assembly with the trim-rail with a tilted ledge of FIG. 78.
Figure 84B:
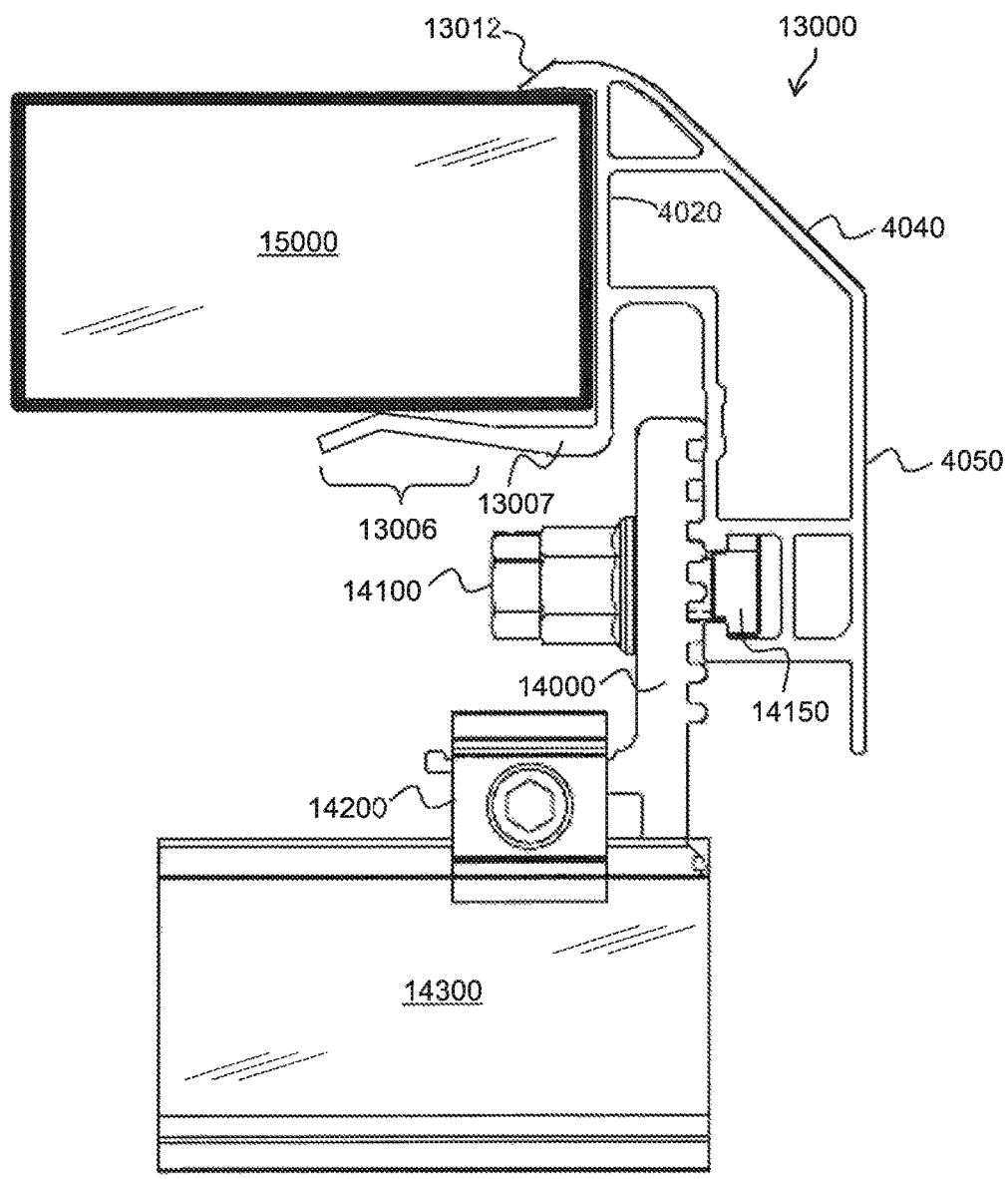

FIGS. 84A and 84B are right end views of an embodiment of a solar panel mounting assembly for mounting a photovoltaic module 15000 to trim-rail 13000 with the tilted spring support ledge 13006. FIG. 84A shows trim-rail 13000 with upper wing 13012, tilted spring support ledge 13006, proximal horizontal portion 13007, footer assembly 14000, tri-drive nut 14100, fastener (t-bolt) 14150, side clamp 14200, and base track 14300. During installation, photovoltaic module 15000 is inserted at an angle (approximately 20-30 degrees) into the open slot 10A defined by the tilted spring support ledge 13006 and the proximal horizontal portion 13007 on a lower side and the upper wing 13012 on an upper side. Slot 10A is further defined by the integral vertical wall section 4020 on a middle portion of the slot 10A. Upper wing 13012 clamps onto one or more photovoltaic modules 15000.

Once the photovoltaic module 15000 has been inserted into slot 10A and makes contact with the tilted spring support ledge 13006, the photovoltaic module 15000 is rotated back downwards to a horizontal position, thereby deflecting the spring-like, cantilevered portion 13008 of tilted spring support ledge 13006 back down to a substantially horizontal position (see FIG. 84B). However, as can be seen in FIG. 84B, when deflected back down, the tilted portion 13008 does not completely become horizontal (flatten out). Rather, it remains partially tilted up at a smaller angle, e.g., less than 5 degrees, which reduces any gap between the upper portion of photovoltaic module 15000 and the upper wing 13012 to essentially zero by action of the tilted spring support ledge 13006 pushing up on the bottom portion of photovoltaic module 15000. By the action of the tilted spring support ledge 13006 pushing up on the photovoltaic module 15000, when properly assembled, no rattling of the assembly occurs when it is subjected to vibration, e.g., shaken. Thus, tilted spring support ledge 13006 acts as an "anti-rattle" feature.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A trim-rail for use in a solar panel mounting assembly, comprising:
   a first vertical wall;
   a horizontal wall intersecting with the first vertical wall;
   a second vertical wall intersecting with the horizontal wall and extending downwardly from the horizontal wall, the second vertical wall having a free end that terminates a distance apart from the horizontal wall, and the second vertical wall being spaced apart from the first vertical wall such that a gap exists therebetween, the gap sized to receive a portion of a footer;

a proximal support portion extending horizontally from the free end of the second vertical wall in a direction away from the gap; and a tilted spring support ledge integrally joined to, and cantilevered from, the proximal support portion, wherein a photovoltaic module is elastically supportable on the tilted spring support ledge when the photovoltaic module is installed on the tilted spring support ledge.

2. The trim-rail of claim 1, wherein the tilted spring support ledge is tilted at an angle ranging from 10-30 degrees to a horizontal plane when the photovoltaic module is not mounted on the tilted spring support ledge.

3. The trim-rail of claim 1, wherein the tilted spring support ledge is tilted at an angle of approximately 20 degrees to a horizontal plane when the photovoltaic module is not mounted on the tilted spring support ledge.

4. The trim-rail of claim 1, wherein the tilted spring support ledge includes a tilted portion and a horizontal distal portion.

5. The trim-rail of claim 1, wherein a thickness of the proximal support portion is at least 3 times greater than a thickness of the tilted spring support ledge.

6. The trim-rail of claim 1, wherein the tilted spring support ledge has a width (W) and a thickness (t) sufficient to provide an elastic, spring-like force that pushes upward on a photovoltaic module when the photovoltaic module is installed on the tilted spring support ledge so as to minimize a gap between an upper bracket of the trim-rail and the photovoltaic module.

7. The trim-rail of claim 6, wherein a ratio of the width to the thickness (W/t) is greater than or equal to 10.

8. The trim-rail of claim 6, wherein a ratio of the width to the thickness (W/t) is greater than or equal to 15.

9. A solar panel mounting assembly, comprising:
   a trim-rail including:
      a first vertical wall,
      a horizontal wall intersecting with the first vertical wall,
      a second vertical wall intersecting with the horizontal wall and extending downwardly from the horizontal wall, the second vertical wall having a free end that terminates a distance apart from the horizontal wall, and the second vertical wall being spaced apart from the first vertical wall such that a gap exists therebetween, the gap sized to receive a portion of a footer,
      a proximal support portion extending horizontally from the free end of the second vertical wall in a direction away from the gap, and
      a tilted spring support ledge integrally joined to, and cantilevered from, the proximal support portion, and
      a slot defined by the tilted spring support ledge on a lower side of the slot, the second vertical wall on a middle portion of the slot, and a wing on an upper side of the slot.

10. The solar panel mounting assembly of claim 9, wherein the tilted spring support ledge is tilted at an angle ranging from 10-30 degrees to a horizontal plane when the photovoltaic module is not supported on the tilted spring support ledge.

11. The solar panel mounting assembly of claim 9, wherein the tilted spring support ledge is tilted at an angle of approximately 20 degrees to a horizontal plane when the photovoltaic module is not supported on the tilted spring support ledge.

12. The solar panel mounting assembly of claim 9, wherein the tilted spring support ledge includes a tilted portion and a horizontal distal portion.

13. The solar panel mounting assembly of claim 9, further comprising a photovoltaic module configured to be mounted in the slot upon installation of the solar panel mounting assembly.

14. The solar panel mounting assembly of claim 13, wherein the tilted spring support ledge is deflected when the photovoltaic module is installed in the slot, and
   wherein the deflected tilted spring support ledge provides a vertical force that pushes upward on the installed photovoltaic module so as to minimize a gap between the wing and the photovoltaic module.

15. The solar panel mounting assembly of claim 9, wherein the tilted spring support ledge has a width (W) and a thickness (t) and wherein a ratio of the width to the thickness (W/t) is greater than or equal to 10.

16. The solar panel mounting assembly of claim 9, wherein the tilted spring support ledge has a width (W) and a thickness (t) and wherein a ratio of the width to the thickness (W/t) is greater than or equal to 15.

17. The solar panel mounting assembly of claim 9, further comprising:
   a footer assembly including the footer, the footer being configured to be clamped in the gap by a tri-drive nut when installed; and
   a base track configured to be clamped to the footer assembly when installed.

18. The solar panel mounting assembly of claim 17, further comprising a photovoltaic module configured to be is mounted in the slot upon installation of the solar panel mounting assembly.

19. A method of mounting a photovoltaic module in a trim-rail, the trim-rail including:
   a vertical wall intersecting with, and extending downwardly from, a horizontal wall, the vertical wall having a free end terminating a distance apart from the horizontal wall
   a proximal support portion extending from, and transversely to, the free end of the vertical wall,
   a tilted spring support ledge integrally joined to, and cantilevered from, the proximal support portion, a thickness of the proximal support portion being greater than a thickness of the tilted spring support ledge, and
   a slot defined by the tilted spring support ledge on a lower side of the slot, the vertical wall on a middle portion of the slot, and a wing on an upper side of the slot;
   the method comprising steps of:
   inserting the photovoltaic module into the slot at an angle with respect to a horizontal plane; and
   rotating the photovoltaic module back to the horizontal plane and deflecting the tilted spring support ledge by the photovoltaic module,
   wherein the deflecting generates a vertical upward force on the photovoltaic module by the tilted spring support ledge so as to minimize a gap between the wing and the photovoltaic module.

* * * * *